US012485977B2

(12) United States Patent
Steben et al.

(10) Patent No.: US 12,485,977 B2
(45) Date of Patent: Dec. 2, 2025

(54) TRACKED VEHICLE ARRANGEMENT INCLUDING MAIN VEHICLE AND TRAILER

(71) Applicants: Prinoth Ltd., St. John (CA); Prinoth AG, Sterzing (IT)

(72) Inventors: Eric Steben, St. John (CA); Patrick Hebert, St. John (CA); Alberto Paoletti, Sterzing (IT)

(73) Assignees: Prinoth Ltd., St. John (CA); Prinoth AG, Sterzing (IT)

( * ) Notice: Subject to any disclaimer, the term of this patent is extended or adjusted under 35 U.S.C. 154(b) by 945 days.

(21) Appl. No.: 17/597,590

(22) PCT Filed: Jul. 19, 2019

(86) PCT No.: PCT/CA2019/050999
§ 371 (c)(1),
(2) Date: Jan. 12, 2022

(87) PCT Pub. No.: WO2021/012030
PCT Pub. Date: Jan. 28, 2021

(65) Prior Publication Data
US 2022/0266928 A1    Aug. 25, 2022

(51) Int. Cl.
*B62D 55/065*   (2006.01)
*B62D 11/00*    (2006.01)
(Continued)

(52) U.S. Cl.
CPC ........ *B62D 55/0655* (2013.01); *B62D 11/003* (2013.01); *B62D 11/02* (2013.01); *B62D 12/02* (2013.01)

(58) Field of Classification Search
CPC .. B62D 11/003; B62D 12/02; B62D 55/0655; B62D 11/02–186
See application file for complete search history.

(56) References Cited

U.S. PATENT DOCUMENTS 3,245,488 A   4/1966   Peterson
5,632,350 A   5/1997   Gauvin
(Continued)

FOREIGN PATENT DOCUMENTS

CA   2679780        4/2010
CA   3112145 C     11/2022
(Continued)

OTHER PUBLICATIONS

PC, International Report on Patentability issued Oct. 15, 2021 in connection with International Patent Application No. PCT/CA2019/050999, 29 pages, Oct. 15, 2021.
(Continued)

Primary Examiner — Phutthiwat Wongwian
Assistant Examiner — Mark L. Greene
(74) Attorney, Agent, or Firm — Woodard, Emhardt, Henry, Reeves & Wagner LLP

(57) ABSTRACT

A new tracked vehicle arrangement with a main vehicle and a trailer, where each of the main vehicle and the trailer have a track assembly on either side, and the tracks of the trailer are driven by the prime mover of the main vehicle. In the longitudinal direction of the main vehicle, only a small fraction (less than 25%) of the length of the main vehicle's cab, which is mounted above the frame, overlies the main vehicle's track assemblies, whereas the fuel tank is located between the cab and the prime mover. In a widthwise direction of the tracked vehicle, the fuel tank at least partly overlies the right and left track assemblies. This provides a counterbalance for the trailer, which has a platform attached by a first pivotable connection to the frame of the main vehicle and by a second pivotable connection to the frame of the trailer.

15 Claims, 58 Drawing Sheets

(51) Int. Cl.
B62D 11/02 (2006.01)
B62D 12/02 (2006.01)

(56) References Cited

U.S. PATENT DOCUMENTS

| | | | |
|---|---|---|---|
| 6,007,166 | A | 12/1999 | Tucker et al. |
| 6,129,426 | A | 10/2000 | Tucker |
| 6,336,558 | B1 | 1/2002 | Douglas |
| 9,212,466 | B2 | 12/2015 | Yokota et al. |
| 10,576,944 | B2 * | 3/2020 | Fujiki ............... B60T 7/12 |
| 2001/0007234 | A1 | 7/2001 | Scheetz |
| 2008/0208416 | A1 | 8/2008 | Yuet et al. |
| 2010/0045093 | A1 | 2/2010 | Foisie |
| 2010/0084908 | A1 | 4/2010 | Montocchio |
| 2018/0111537 | A1 | 4/2018 | Baldys et al. |
| 2019/0242092 | A1 | 8/2019 | Peloquin et al. |
| 2020/0353931 | A1 | 11/2020 | Romer et al. |
| 2022/0396191 | A1 | 12/2022 | Hebert et al. |

FOREIGN PATENT DOCUMENTS

| | | |
|---|---|---|
| CA | 3171952 C | 8/2023 |
| CN | 102410042 | 4/2012 |
| CN | 106427727 | 2/2017 |
| DE | 102018120161 A1 | 5/2019 |
| EP | 2604495 A1 | 6/2013 |
| EP | 3999403 A1 | 5/2022 |
| EP | 4051533 A1 | 9/2022 |
| GB | 2545452 A | 6/2017 |
| JP | 2011194950 | 10/2011 |
| JP | 7590423 B2 | 11/2024 |
| WO | 2011049509 A1 | 4/2011 |
| WO | 2011067652 | 6/2011 |
| WO | 2018014133 A1 | 1/2018 |
| WO | 2021012030 | 1/2021 |
| WO | 2021081655 A1 | 5/2021 |

OTHER PUBLICATIONS

PC, International Report on Patentability issued on May 3, 2022 in connection with International Patent Application No. PCT/CA2020/051463, 9 pages, May 3, 2022.
CA, Notice of Allowance issued by the Canadian Intellectual Property Office in connection with Canadian Patent application No. 3112145, 1 page, Jun. 17, 2022.
CA, Examiners Report issued on Dec. 9, 2022 in connection with Canadian Patent Application No. 3171952, 4 pages, Dec. 9, 2022.
CA, Notice of Allowance issued by the Canadian Intellectual Property Office on Feb. 23, 2023 in connection with Canadian Patent application No. 3171952, 1 page, Feb. 23, 2023.
EP, Supplementary European Search Report for EP App. No. 19938744.0 mailed Mar. 6, 2023. 10 pages., Mar. 6, 2023.
EP, European Patent Application No. 20880944.2 European Search Report, 8 pages, Oct. 24, 2023.
CA, Canada Application No. 3,147,652, Examiners Report, 4 pages, Nov. 8, 2023.
EP, European Application No. 20880944.2 Communication under rules 70(2) and 70a(2) EPC, 1 page, Nov. 10, 2023.
JP, Japanese Patent Application No. 2022-521006 Office Action, 4 pages, May 8, 2024.
JP, Japanese Patent Application No. 2022-521006 Decision to Grant, 3 pages, Nov. 5, 2024.
Written Opinion and International Search Results issued by WIPO in connection with PCT/CA2019/050999 on Apr. 7, 2020, 7 pages.
Written Opinion and International Search Results issued by WIPO in connection with PCT/CA2020/051463 on Jan. 15, 2021, 13 pages.

* cited by examiner

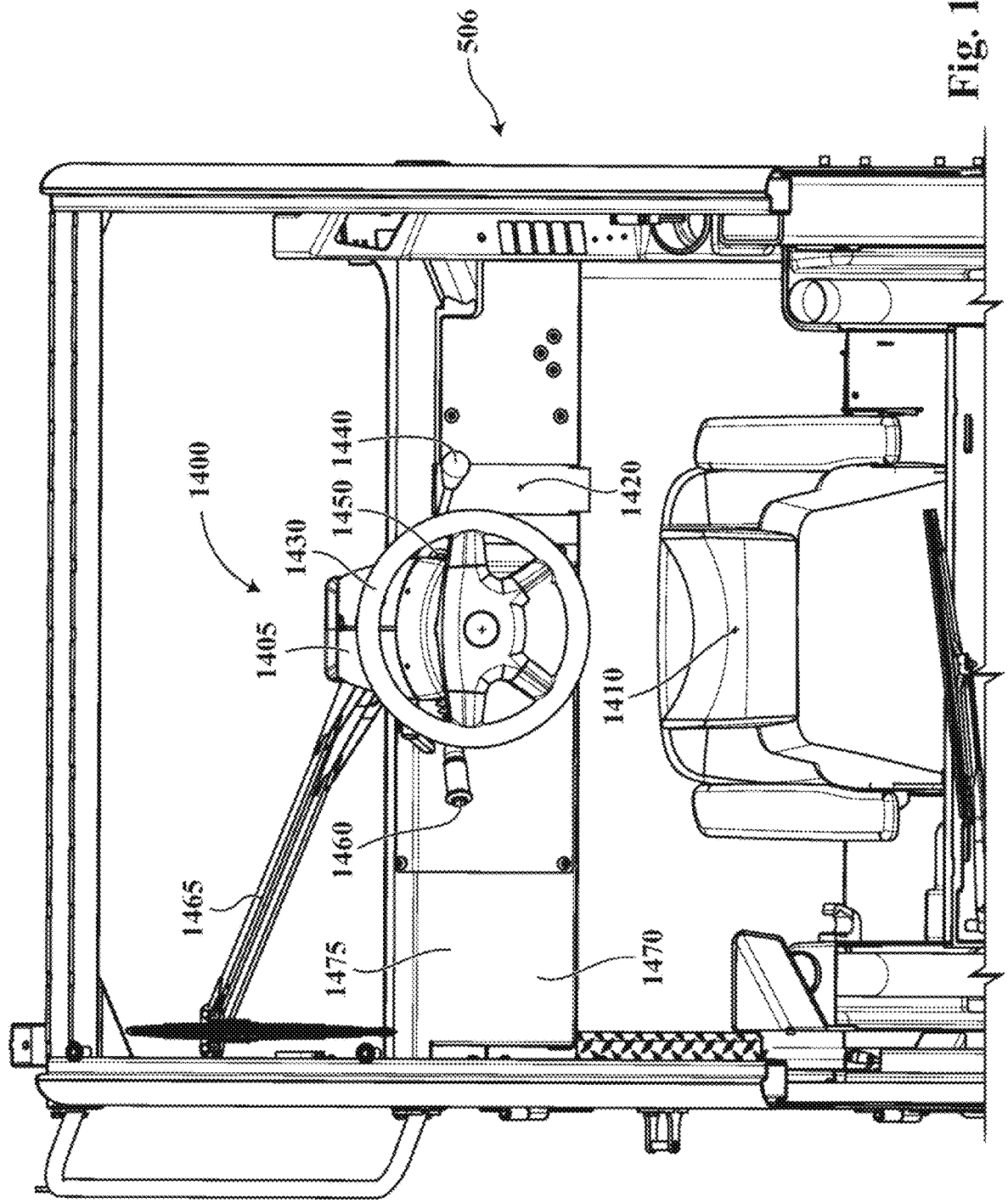

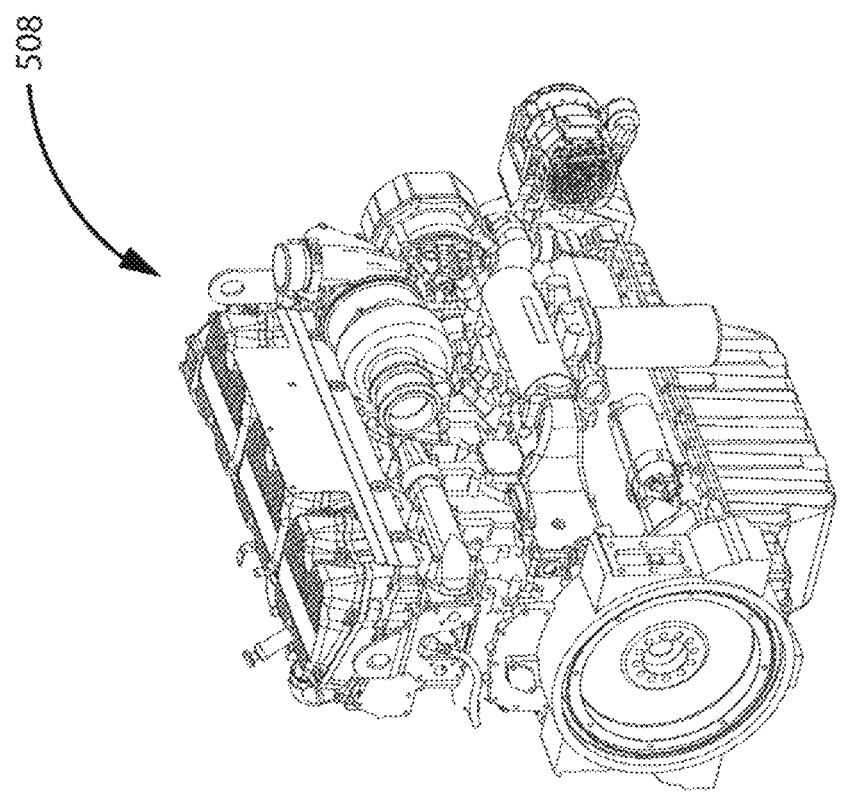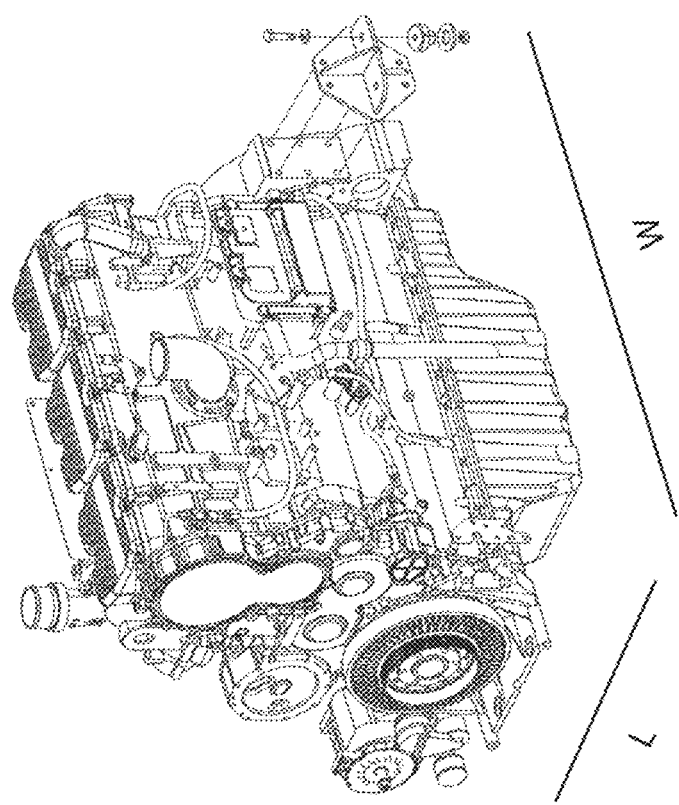
Fig. 20

TRACKED VEHICLE ARRANGEMENT INCLUDING MAIN VEHICLE AND TRAILER

FIELD

The present disclosure relates generally to tracked vehicles and more particularly to a tracked vehicle arrangement with a main vehicle and an articulated trailer for use in harsh environments.

BACKGROUND

Tracked vehicles have been developed for carrying equipment and transport across rugged terrain and in remote areas. Such vehicles typically include a frame with a track assembly on either side. Tracks are an effective way to travel on difficult terrain as they can be designed to provide satisfactory traction while distributing the weight of the vehicle over a relatively large surface area to limit ground pressure maxima. For some applications, operational requirements dictate that a significant load must be hauled. Especially in polar environments, this is accomplished by hooking up a sled to the tracked vehicle and hauling the sled to its destination. In some cases, the tracked vehicle may tow a convoy of loaded sleds. However, this manner of transport is inefficient for carrying the heavy loads needed for major expeditions and can significantly damage the environment underneath the sled, especially during turns. The industry would therefore welcome an innovative tracked vehicle suited for use in harsh physical and environmental conditions and remote areas.

SUMMARY

According to a broad aspect, there is provided a tracked vehicle comprising: a frame; a prime mover mounted above the frame; a fuel tank mounted above the frame, configured to hold a supply of fuel for the prime mover; a plurality of track assemblies mounted to the frame, the plurality of track assemblies comprising at least a right track assembly mounted to a right lateral side of the frame and a left track assembly mounted to a left lateral side of the frame, each of the right and left track assemblies comprising a respective endless track for moving the tracked vehicle on the ground; a drive system for transmitting power from the prime mover to the track assemblies to move the endless tracks; and a cab mounted above the frame, the cab having a length in a longitudinal direction of the tracked vehicle, the cab comprising a user interface for allowing an operator to control a speed of the tracked vehicle and a steering direction of the tracked vehicle. In the longitudinal direction of the tracked vehicle, less than 25% of the length of the cab overlies the track assemblies. In the longitudinal direction of the tracked vehicle, the fuel tank is located between the cab and the prime mover. In a widthwise direction of the tracked vehicle, the fuel tank at least partly overlies the right and left track assemblies.

According to another broad aspect, there is provided a tracked vehicle arrangement comprising: a main vehicle and a trailer. The main vehicle has a frame, a prime mover mounted above the frame and right and left track assemblies mounted on respective lateral sides of the frame, the right and left track assemblies each comprising a respective endless track driven by the prime mover. The trailer has a frame and right and left track assemblies mounted on respective lateral sides of the frame, the right and left track assemblies of the trailer each comprising a respective endless track driven by the prime mover on the main vehicle, the trailer further comprising a platform connected by a first pivotable connection to the frame of the main vehicle and to a second pivotable connection to the frame of the trailer, the platform being elongated in a longitudinal direction. The first and second pivotable connections are configured to allow pivoting of the frame at least partly around, respectively, first and second axes transverse to the longitudinal direction of the platform and wherein at least the first pivotable connection is further configured to allow pivoting at least partly around a third axis transverse to the longitudinal direction of the platform and to the first and second axes.

According to another broad aspect, there is provided a tracked vehicle arrangement comprising a main vehicle and a trailer. The main vehicle comprises a frame; a prime mover mounted above the frame; and right and left track assemblies mounted on lateral sides of the frame. The trailer comprises a frame; right and left track assemblies mounted on lateral sides of the frame; and a platform configured to carry a load and connected by a first pivotable connection to the frame of the main vehicle and by a second pivotable connection to the frame of the trailer. The right and left track assemblies of the main vehicle and of the trailer each comprise a first wheel-carrying assembly carrying a plurality of first support wheels, the first wheel-carrying assembly pivotable around a first pivot point; a second wheel-carrying assembly in line with the first wheel-carrying assembly and carrying a plurality of second support wheels, the second wheel-carrying assembly pivotable around a second pivot point; a drive wheel driven by the prime mover; an idler wheel; and an endless track surrounding the first and second support wheels, the drive wheel and the idler wheel. When viewed from a side of the main vehicle, the first pivotable connection is located substantially above the second pivot point for the second wheel-carrying assembly of the right and left track assemblies of the main vehicle. Also, when viewed from a side of the trailer, the second pivotable connection is located substantially above the midway point between the first and second pivot points for the first and second wheel-carrying assemblies of the right and left track assemblies of the trailer.

According to another broad aspect, there is provided a tracked vehicle arrangement comprising a main vehicle and a trailer. The main vehicle has a frame, a prime mover mounted above the frame and right and left track assemblies mounted on lateral sides of the frame, the right and left track assemblies comprising endless tracks driven by the prime mover. The trailer has a frame and right and left track assemblies mounted on lateral sides of the frame, the right and left track assemblies of the trailer comprising endless tracks driven by the prime mover on the main vehicle, the trailer further comprising a platform connected by a first pivotable connection to the frame of the main vehicle and by a second pivotable connection to the frame of the trailer. The platform comprises a plurality of locking members, each locking member configured to interconnect with a container corner member, the plurality of locking members being arranged along the platform to support at least three different container configurations.

According to another broad aspect, there is provided a tracked vehicle arrangement comprising a main vehicle and a trailer. The main vehicle comprises a frame having an upper portion connected to a lower portion, the lower portion of the frame being closer to the ground than the upper portion of the frame; a prime mover mounted atop the upper portion of the frame; and right and left track assemblies mounted on lateral sides of the lower portion of the frame, each of the right and left track assemblies comprising a respective endless track driven by the prime mover. The trailer comprises a frame having an upper portion connected to a lower portion, the lower portion of the frame being closer to the ground than the upper portion of the frame; right and left track assemblies mounted on lateral sides of the lower portion of the frame of the trailer, each of the right and left track assemblies of the trailer comprising a respective endless track driven by the prime mover on the main vehicle; a platform configured for carrying a load and connected by a first pivotable connection to the frame of the main vehicle at a point higher than the upper portion of the frame of the main vehicle and by a second pivotable connection to the frame of the trailer at a point higher than the upper portion of the frame of the trailer; and a towing connector mounted to the lower portion of the frame.

According to another broad aspect, there is provided a method of steering a vehicle arrangement comprising a main vehicle having right and left tracks and an articulated trailer having right and left tracks. The method comprises receiving a steering command input; determining a track speed for each of the tracks based on the steering command input; and regulating power to each of the tracks in accordance with the determined track speed to steer the vehicle arrangement. In case of the steering command input being indicative of a right turn in a forward direction, the determined track speed for the left track of the main vehicle is greater than the determined track speed for the right track of the main vehicle and wherein the determined track speed for the right track of the trailer is greater than the determined track speed for the left track of the trailer.

According to another broad aspect, there is provided a method of steering a vehicle arrangement comprising a main vehicle having right and left tracks and an articulated trailer having right and left tracks. The method comprises receiving a steering command input; determining a track speed for each of the tracks based on the steering command input; and regulating power to each of the tracks in accordance with the determined track command to steer the vehicle arrangement. In case of the steering command input being indicative of a turn to one side in a forward direction, the determined track speed for the right and left tracks of the main vehicle cause the main vehicle to turn to the desired side to a first extent and the determined track speed for the right and left tracks of the trailer cause the trailer to turn to the opposite side of the desired side to a second extent less than the first extent.

According to another broad aspect, there is provided a non-transitory computer-readable medium comprising instructions which, when read and executed by a processor on board a vehicle arrangement comprising a main vehicle with right and left tracks and an articulated trailer with right and left tracks, configure the processor to implement a method that comprises receiving a steering command input; determining a track speed for each of the tracks based on the steering command input; and regulating power to each of the tracks in accordance with the determined track speed to steer the vehicle arrangement. Here too, in case of the steering command input being indicative of a right turn in a forward direction, the determined track speed for the left track of the main vehicle is greater than the determined track speed for the right track of the main vehicle and wherein the determined track speed for the right track of the trailer is greater than the determined track speed for the left track of the trailer.

According to another broad aspect, there is provided a non-transitory computer-readable medium comprising instructions which, when read and executed by a processor on board a tracked vehicle, configure the processor to implement a method that comprises: receiving a request from an operator of the tracked vehicle to carry out a zero-radius turn; determining whether a trailer is attached to the vehicle; and in case the determining reveals that a trailer is connected to the tracked vehicle, preventing the zero-radius turn from being carried out by the operator.

According to another broad aspect, there is provided a computer-implemented method for execution by a computer of a tracked vehicle, comprising: determining via at least one sensor whether or not a trailer is attached to the tracked vehicle; and in case the determining reveals that a trailer is connected to the tracked vehicle, indicating via a display that a zero-radius turning capability of the tracked vehicle is disabled.

BRIEF DESCRIPTION OF THE DRAWINGS

A detailed description of embodiments is provided below, by way of example only, with reference to accompanying drawings, in which:

FIG. 14A is a top view of the interior of the cab of the main vehicle, according to an example non-limiting embodiment, without an operator console;

FIG. 20 includes perspective views of a prime mover generating power to move the tracks of the main vehicle and of the trailer, according to an example non-limiting embodiment;

Figure 1:
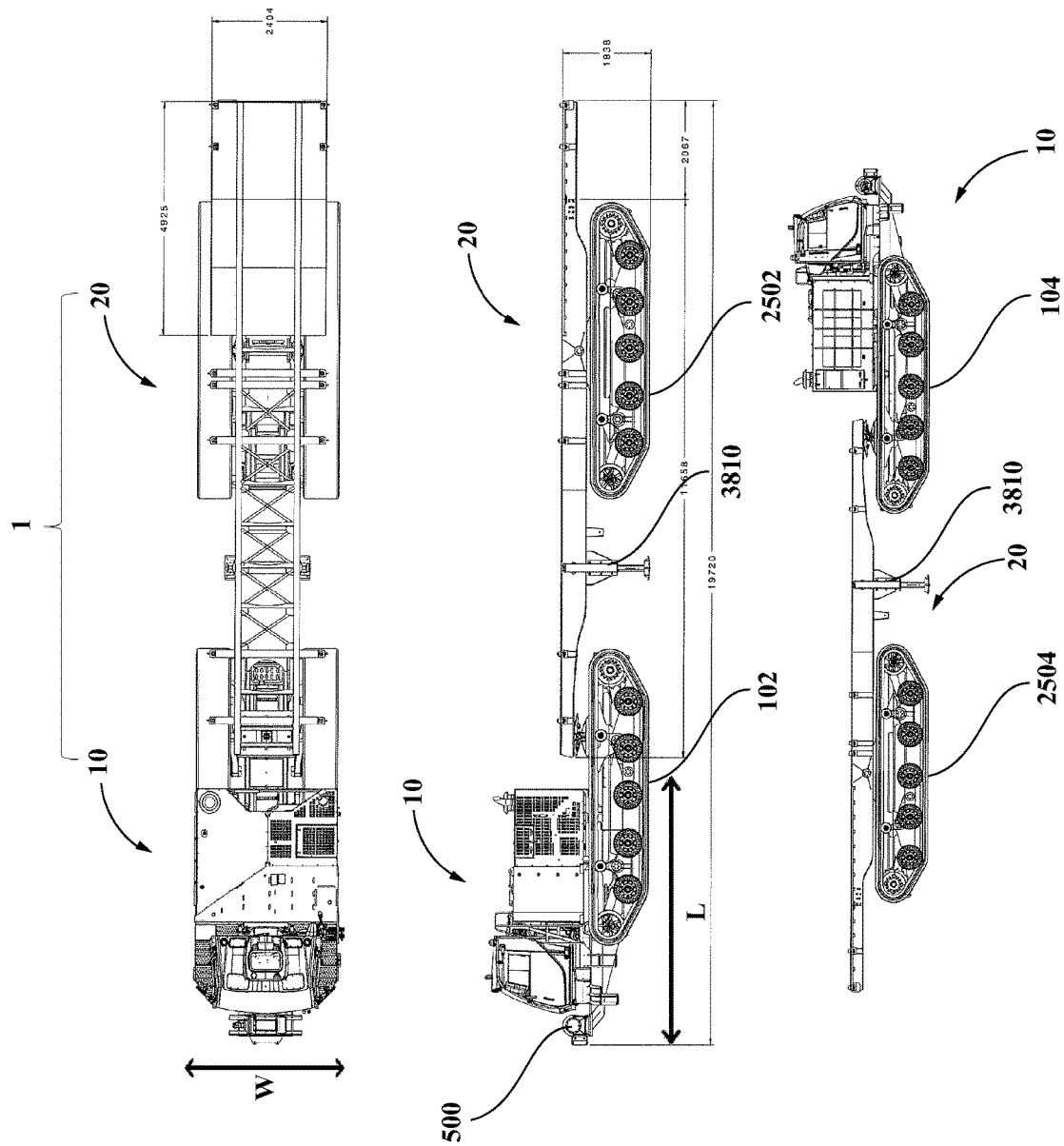
FIG. 1 shows top and side views of a tracked vehicle arrangement comprising a main vehicle connected and a tractor, according to an example non-limiting embodiment.
Figure 2:
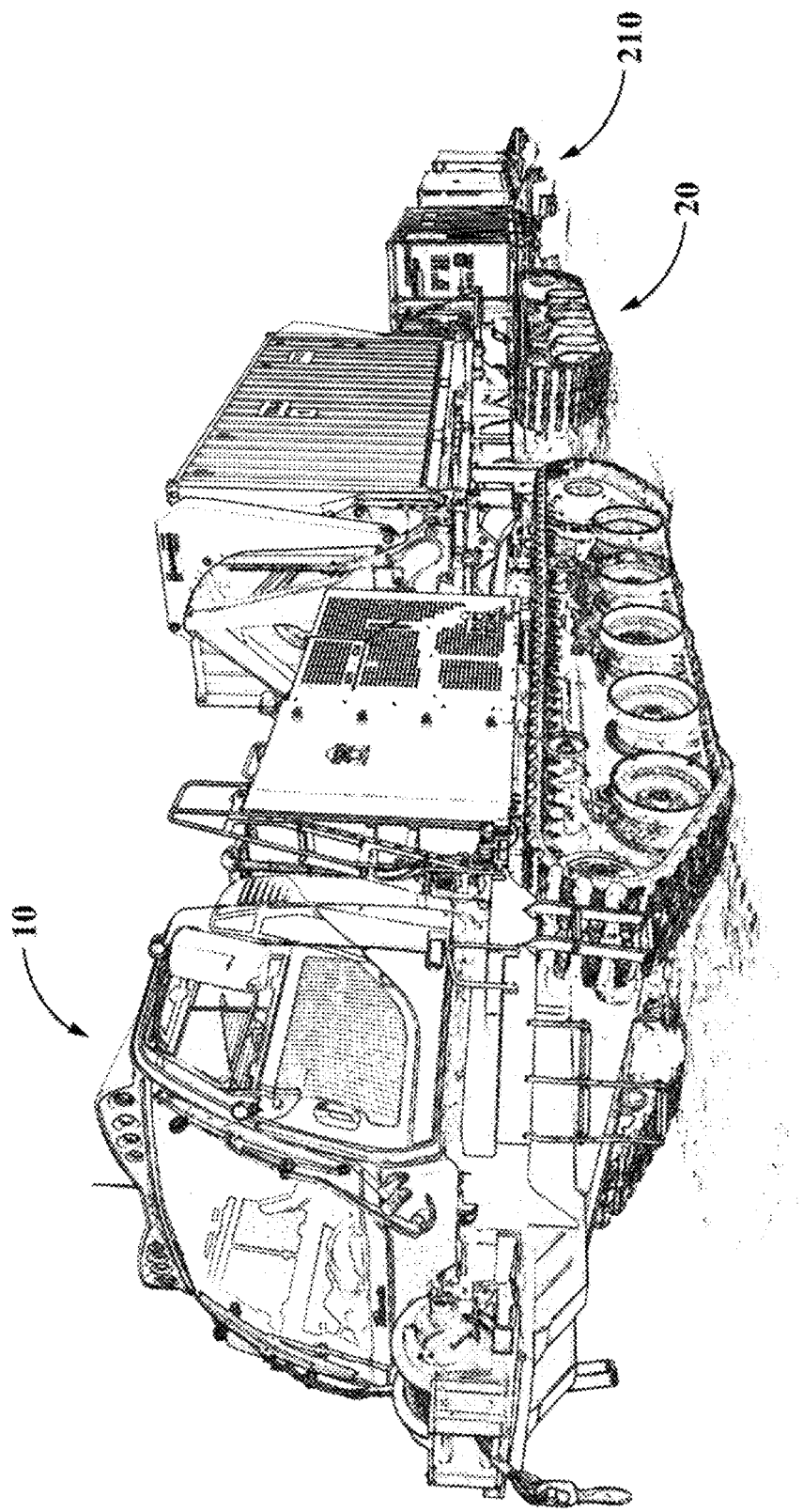
FIGS. 2 and 3 are perspective views of tracked vehicle arrangement, according to example non-limiting embodiments.

It is to be understood that all illustrations are for example purposes only and that information contained therein, including numerical information, is merely to provide an example implementation and is not intended to be limitative.

DETAILED DESCRIPTION

With reference to FIGS. 1 to 4, a tracked vehicle arrangement 1 in accordance with a non-limiting embodiment of the present disclosure comprises a main vehicle 10 (sometimes referred to as a tractor) connected to an auxiliary vehicle 20 (sometimes referred to as a trailer). The total overall length of the tracked vehicle arrangement may be on the order of 19.7 m in a non-limiting embodiment, although shorter or longer vehicles ranging between 10 m and 30 m in length may be contemplated, as well as vehicles outside this range in length. Both the main vehicle 10 and the trailer 20 are tracked, meaning that they each have at least one track assembly on each lateral side of the vehicle, each track assembly including an endless track. Moreover, the track assemblies of the trailer 20 are motorized, and the main vehicle 10 supplies power both to the track assemblies of the main vehicle 10 and to the track assemblies of the trailer 20. A hydraulic drive system may be used for this purpose. The hydraulic drive system comprises a prime mover and "N" hydraulic motors responsive to pressurized fluid provided by electronically controlled pumps and/or a flow control valve. Each hydraulic motor is connected to a sprocket wheel of each track assembly. In an example where there are two track assemblies 102, 104 on the main vehicle 10 and two track assemblies 2502, 2504 on the trailer 20, N will be equal to 4, however this is not a limitation of the present disclosure. As the prime mover is located on the main vehicle 10, pressurized fluid travels from the main vehicle 10 to the trailer 20 via an interconnection of hydraulic lines between the main vehicle 10 and the trailer 20. A steering controller on the main vehicle 10 regulates the amount of power being applied by the hydraulic motor to each track assembly thereby to effect turns.

In the longitudinal direction of the main vehicle, only a small fraction (less than 25%) of the length of the main vehicle's cab, which is mounted above the frame, overlies the main vehicle's track assemblies (the rest juts forward). This allows installation of a fuel tank between the cab and the prime mover, while providing a counterbalance for the trailer, which has a platform attached by a first pivotable connection to the frame of the main vehicle and by a second pivotable connection to the frame of the trailer.

A. Main Vehicle

Figure 5:
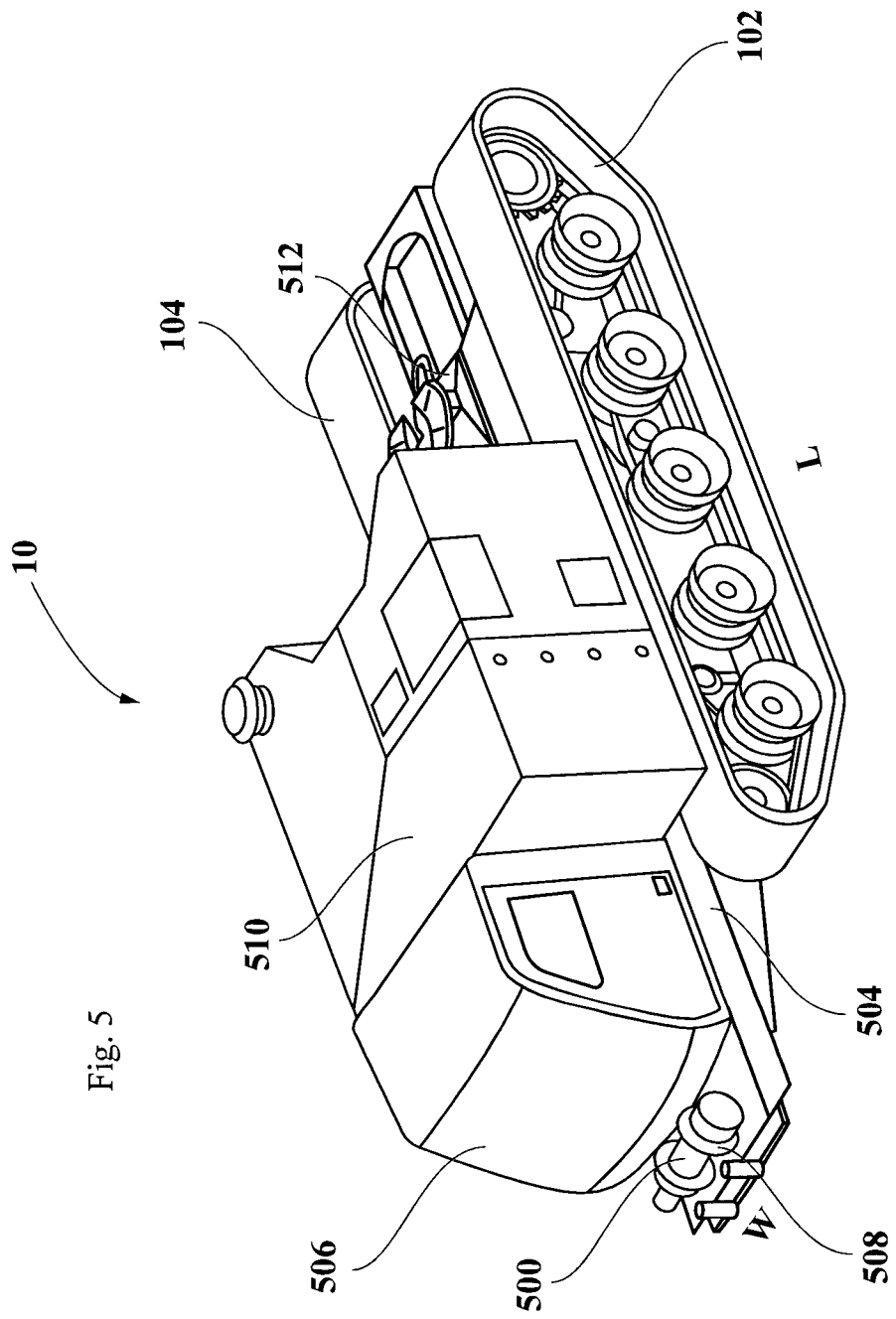
FIGS. 5 and 6 are perspective views of the main vehicle according to example non-limiting embodiments.
Figure 6:
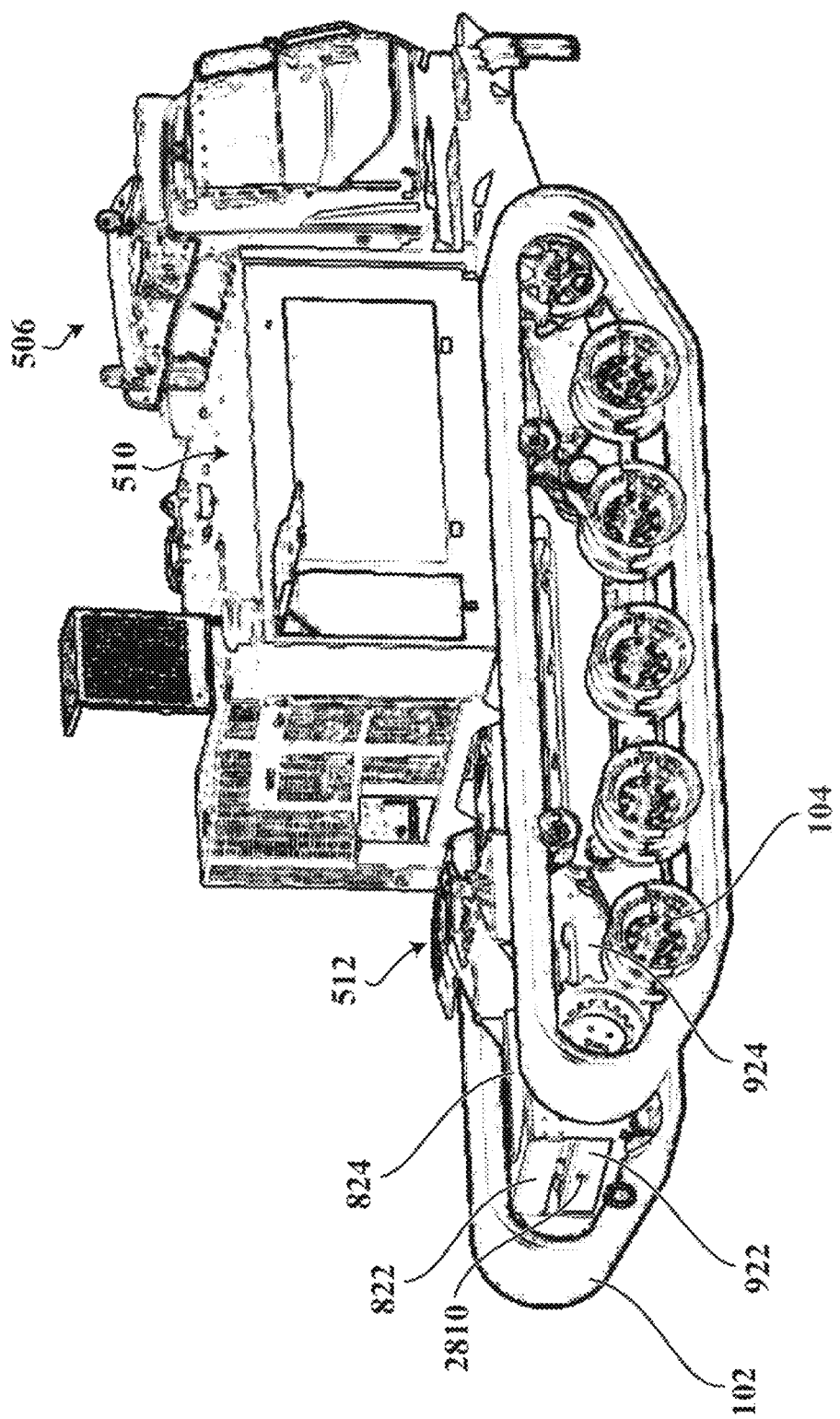

With reference to FIGS. 5-23, and to FIGS. 5 and 6 in particular, the main vehicle 10 includes a variety of components including (i) a frame 504, (ii) track assemblies 102, 104, (iii) a cab 506, (iv) a prime mover 508, (v) a fuel tank 510 and (vi) an articulated trailer connector 512. These components will be described below in greater detail. Those skilled in the art will appreciate that the main vehicle 10 may also be equipped with a pushing blade or snow blower to remove snow from the area in front of the main vehicle 10.

(i) Frame

Figure 23:
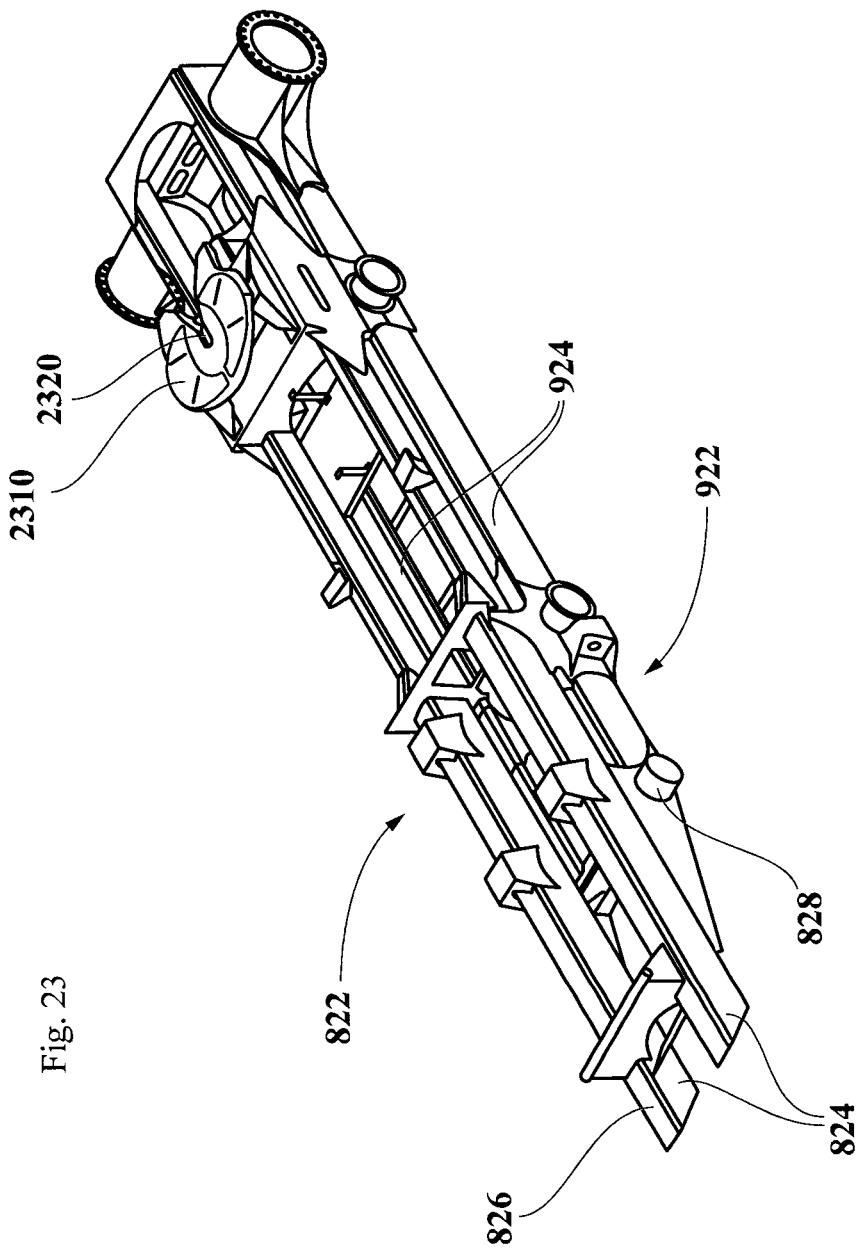
FIG. 23 is a perspective image of an articulated trailer connector mounted to the upper portion of the frame of the main vehicle, providing a first pivotable connection to a platform of the trailer, according to an example non-limiting embodiment.
Figure 24:
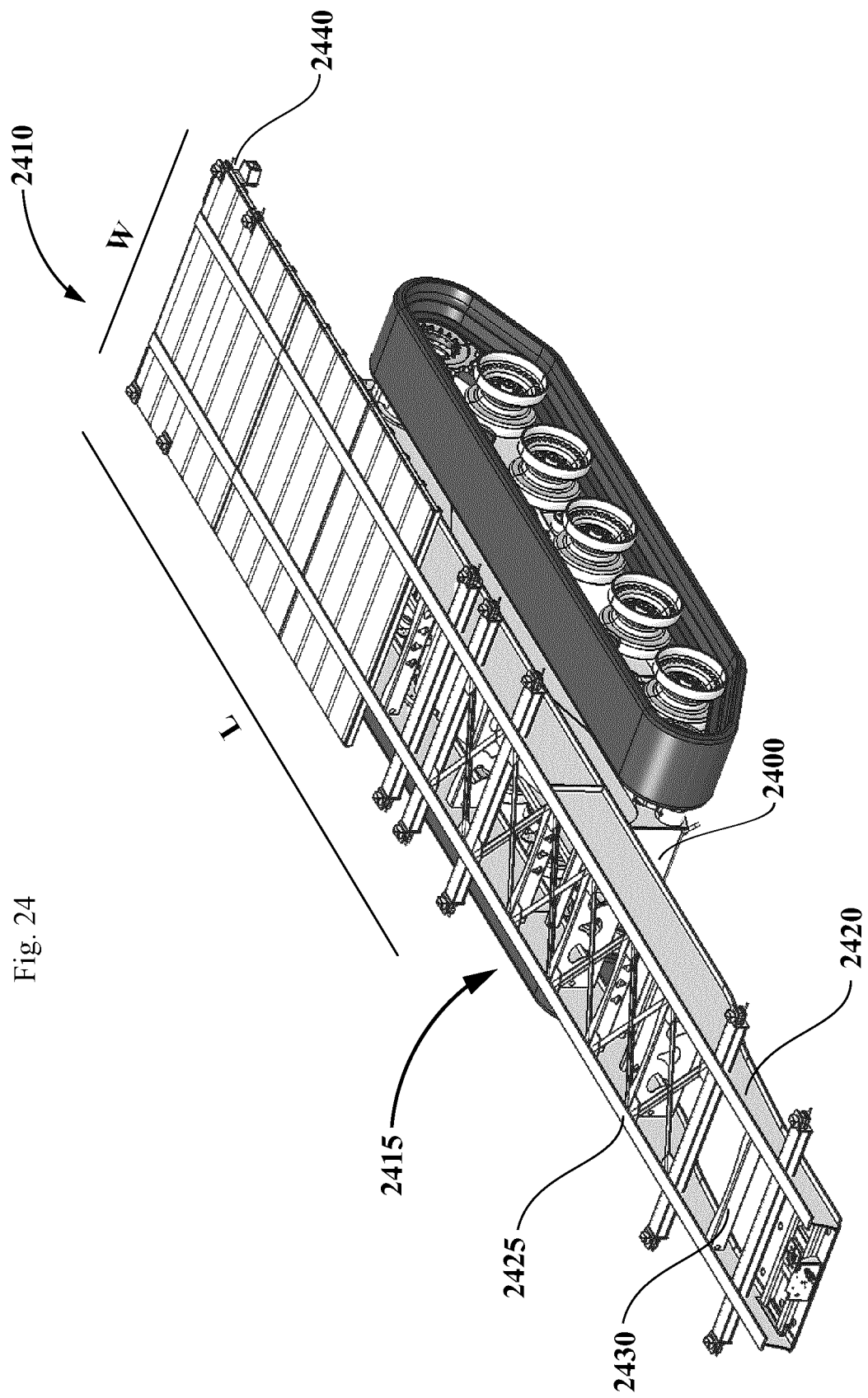
FIG. 24 is a perspective view of the platform mounted to the frame of the trailer, according to an example non-limiting embodiment.

As best seen in FIGS. 6 and 23, the frame 504 comprises an upper frame structure 822 connected to a lower frame structure 922. The upper frame structure 822 comprises a pair of parallel side rails or beams 824, (e.g., H-beams, I-beams, C-beams, U-beams, hollow beams, full beams) extending in a generally longitudinal direction (L) of the main vehicle 10. The side rails 824, have an upper surface 826 defining at least part of the upper surface of the frame 504. The side rails 824 may be metallic and made of steel or another alloy, or they may be non-metallic. The upper frame structure 822 may also comprise a plurality of cross-members 828 extending transversally to the longitudinal direction of the main vehicle 10 between the side rails 824, in which case the upper frame structure 822 may be viewed as being a type of "ladder frame" construction. A spacing of the side rails 824 in the widthwise direction (W) of the main vehicle 10 may take on various values, including between 1,500 mm and 2,500 mm.

The lower frame structure 922 connects to the side rails 824 of the upper frame structure 822, and provides structural integrity to the frame 504. The lower frame structure 922 is disposed below the upper frame structure 822 and provides a main structure for supporting the track assemblies (102 and 104). In some embodiments, the lower frame structure 922 may be more rigid than the upper frame structure 822. In fact, it may be the most rigid portion of the frame 504 and provides torsional ridigity. In some embodiments, the lower frame structure 922 may comprise a pair of side beams 924 extending along the longitudinal direction of the main vehicle 10 and spaced apart in the widthwise direction of the main vehicle 10. The lower frame structure 922 may also comprise a plurality of cross-members 928 extending transversally to the longitudinal direction of the main vehicle 10 between the side beams of the lower frame structure 922. The lower frame structure 922 may thus also be viewed as being a type of "ladder frame" construction.

In an embodiment, each of the side beams 924 may be a rectangular box beam made of metallic material, in this case steel. In other embodiments, each of the side beams 924 may be a hollow beam having a cross-sectional shape other than rectangular (e.g., circular or otherwise curved), or a channel having a C-shape, U-shape or other suitable shape, or any other suitable elongated structural member. As another example, in some embodiments, the side beams 924 may be made of material other than steel.

Figure 7:
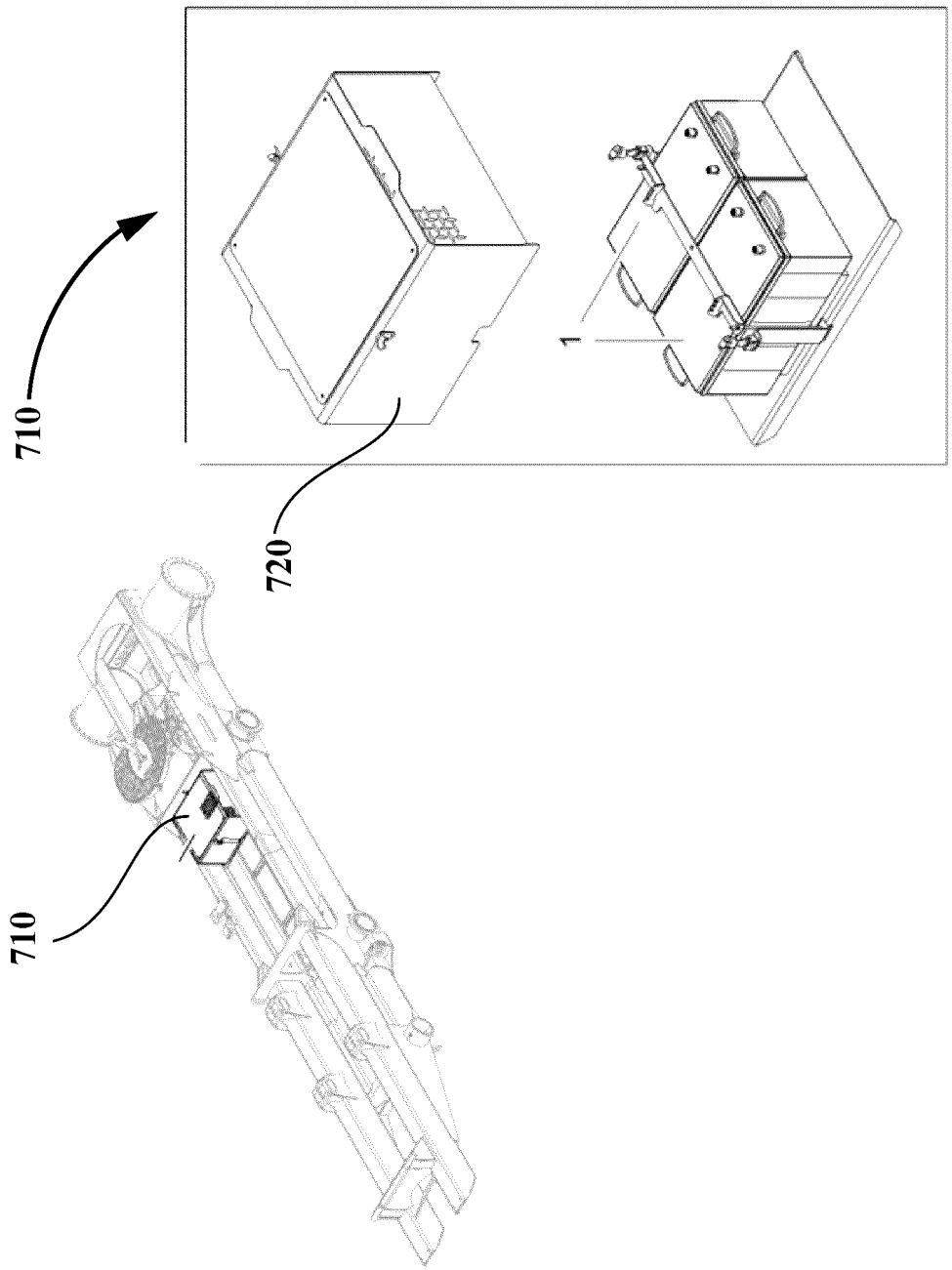
FIG. 7 is a perspective view showing a possible location for the batteries placed between beams of the frame of the main vehicle, according to an example non-limiting embodiment.

An internal space defined by the frame 504 may be used to house cables, including hydraulic cables and electric cables, as well as various other components such as pipes, as well as batteries. Specifically, as shown in FIG. 7, batteries 710 may be located between the side rails 824 rearwards of the prime mover 508. The batteries 710 may be configured to produce 24 V, for example, although other voltages are possible. A metal cover 720 may protect the batteries 710 and may be able to support a user wishing to perform maintenance.

(ii) Track Assemblies

The track assemblies 102, 104 are used to propel the main vehicle 10 on the ground. Track assembly 102 is a left track assembly mounted on the left lateral side of the frame 504 and track assembly 104 is a right track assembly mounted on the right lateral side of the frame 504. The track assemblies may be mounted to both the lower frame structure 922 and the upper frame structure 822. Each of the track assemblies supports a portion of a weight of the main vehicle 10 and a portion of weight of the trailer 20 and its load (when the trailer 20 attached to the main vehicle 10). In this example, the track assemblies 102, 104 are similarly configured and are disposed symmetrically relative to the frame 504 and thus the portion of the weight of the main vehicle 10 supported by each of the track assemblies 102, 104 is about half of the weight of the main vehicle 10. In other examples, the portion of the weight of the main vehicle 10 supported by each of the track assemblies 102, 104 may differ. The portion of the weight of the trailer 20 supported by each of the track assemblies 102, 103 is less than half of the weight of the trailer 20, with the remaining portion of the weight of the trailer being supported by the track assemblies 2502, 2504 of the trailer 20.

Figure 8:
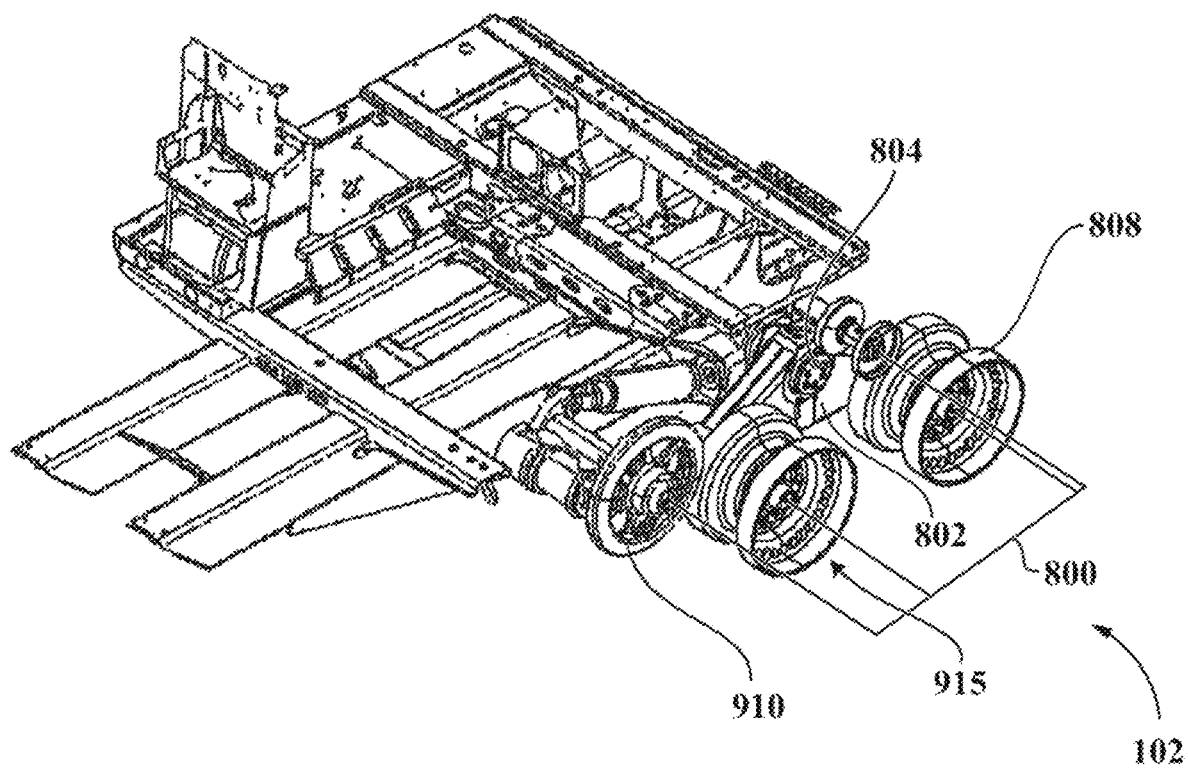
FIGS. 8 and 9 are perspective images showing frame of the main vehicle, including the lower and upper frame structures, as well as the track assemblies connected thereto, according to an example non-limiting embodiment.

The left track assembly 102 will now be described with reference to FIGS. 8-11, with the understanding that an analogous description applies to the right track assembly 104. With reference to FIG. 8, the left track assembly 102 comprises a plurality of wheels 800 and an endless track 1100 that surrounds the wheels. The endless track 1100 engages the ground to provide traction. A longitudinal direction of the track assembly 102 is generally parallel to the longitudinal direction of the main vehicle 10. The track assembly 102 also has transversal directions, including a widthwise direction which is generally parallel to the widthwise direction of the main vehicle 10, and a height direction which is generally parallel to the height direction of the main vehicle 10.

Figure 9:
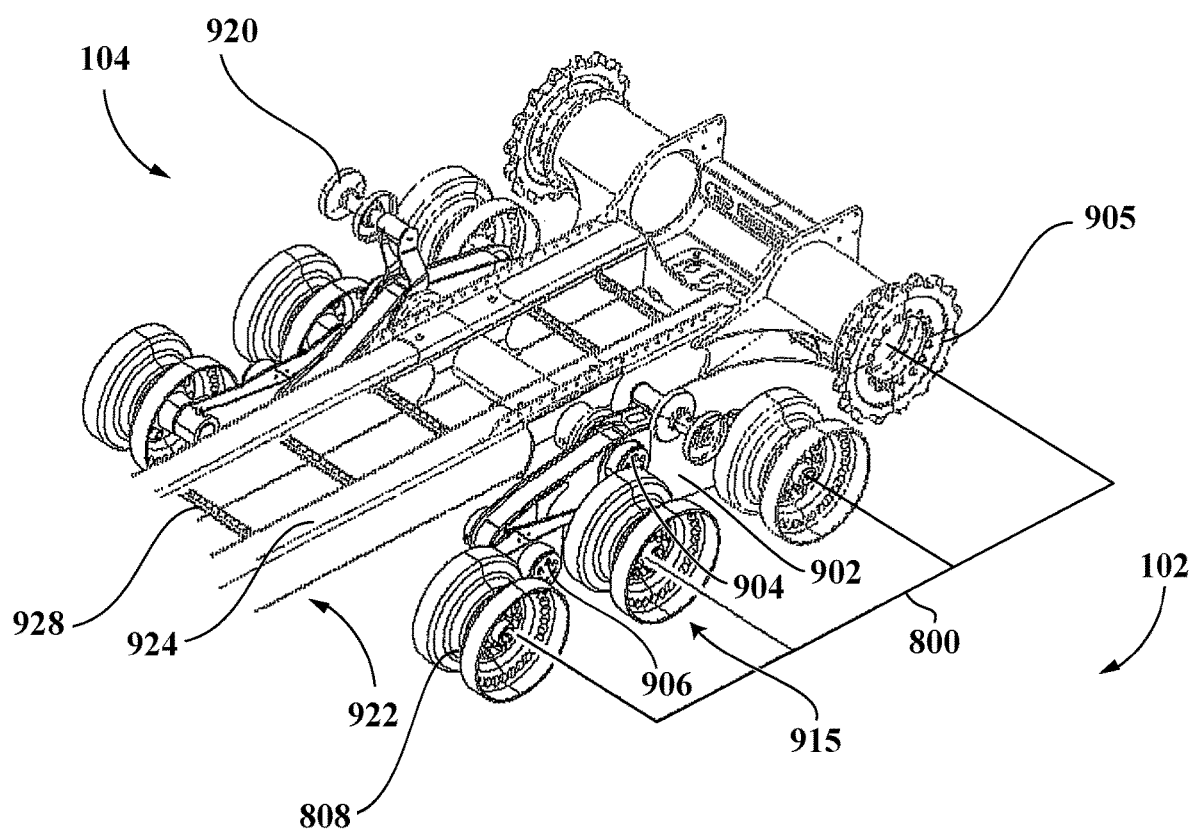

As shown in FIG. 9, the wheels 800 include a drive wheel 905, an idler wheel 910, a plurality of intermediate (or support) wheels 915 and a plurality of top rollers 920, which are optional.

Figure 10:
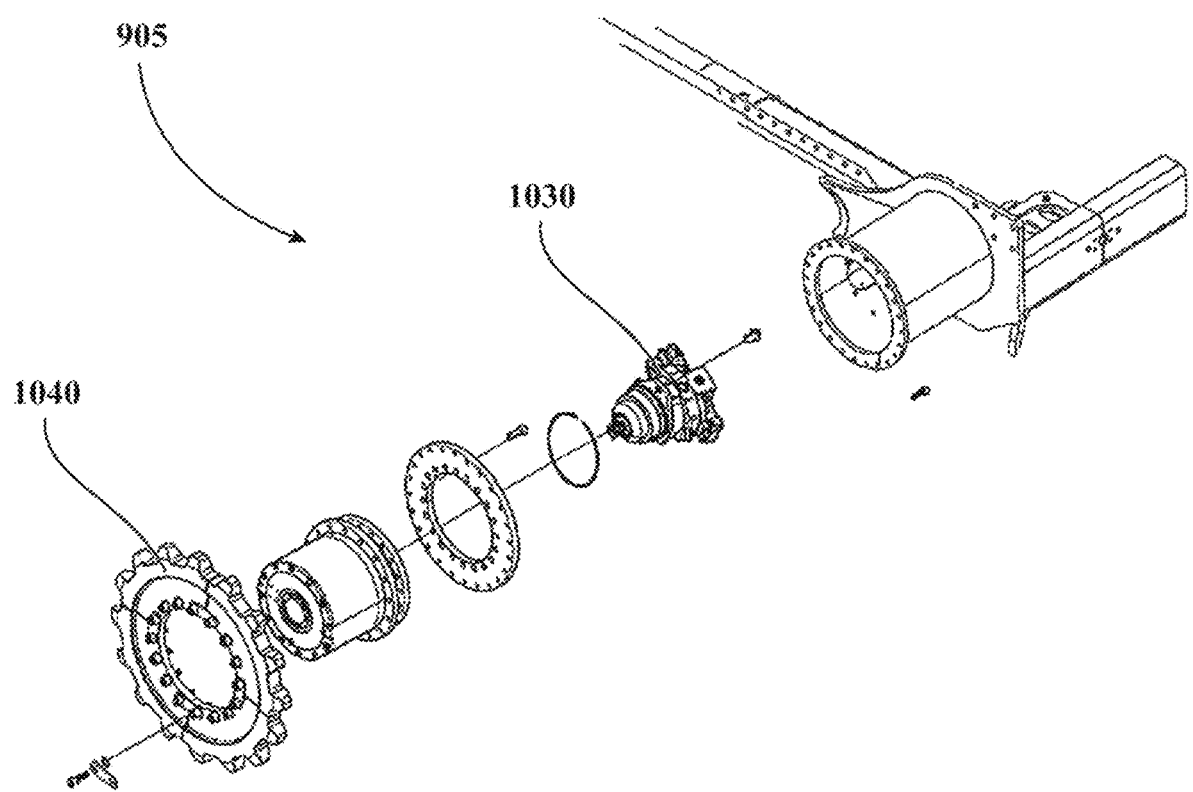
FIG. 10 is an exploded perspective view showing assembly of a drive wheel forming part of a track assembly, according to an example non-limiting embodiment.

With reference to FIG. 10, the drive wheel 905 is in a driven relationship with the prime mover 508 to impart movement of the endless track 1100 in order to propel the main vehicle 10 on the ground. The drive wheel 905 is rotatable about an axis of rotation which is transverse to the longitudinal direction (L) of the main vehicle 10 by power derived from the prime mover 508 to impart movement of the endless track 1100. Specifically, a hydraulic motor 1030, which is operatively coupled to the drive wheel 905, receives pressurized fluid from an electronically controlled pump or flow control valve and causes the drive wheel 905 to rotate. In this embodiment, the drive wheel 905 comprises a sprocket 1040 that has teeth for engaging drive openings in the track 1100; thus, movement of the sprocket 1040 causes movement of the track 1100. The drive wheel 905 may be configured in various other ways in other embodiments.

The idler wheel 910 does not convert power derived from the prime mover to motive force for movement of the endless track, but rather guides the endless track and maintains it under tension as it is driven by the drive wheel. The idler wheel is rotatable about an axis of rotation which is transverse to the longitudinal direction of the main vehicle 10. In this embodiment, the idler wheel, may comprise a sprocket or any other type of wheel that engages the endless track.

Although in the illustrated embodiment, the drive wheel is located towards the rear of the track assembly and the idler wheel is located towards the front of the track assembly, the opposite configuration may be adopted in other embodiments.

The support wheels are arranged in an in-line configuration extending along the longitudinal direction of main vehicle 10 and apply pressure onto the ground through a bottom run of the endless track 1100 as the main vehicle 10 moves on the ground. The support wheels 915 do not convert power derived from the prime mover 508 to motive force for movement of the endless track 1100, but rather support and distribute onto the ground via the endless track 1100 the portion of the weight of the main vehicle 10 (and of the trailer 20) that is supported by the track assembly 102. The support wheels 915 may also maintain the shape and position of the endless track 1100, as well as keep the track 1100 generally aligned with the general direction of vehicular movement.

The support wheels 915 are carried by a plurality of wheel-carrying assemblies 802, 902 of the track assembly 102. Each of the wheel-carrying assemblies, which may be referred to as "bogies", carries at least two of the support wheels 915. In the present embodiment, there are five support wheels 915, two of which are connected in tandem to a first wheel-carrying assembly 802 that pivots around a pivot point 804. The other three support wheels 915 are connected in a Tridem™ configuration, whereby the three wheels are inline and connected to a second wheel-carrying assembly 902 that pivots around a pivot point 904 and has its own pivot point 906 for two of the three wheels. For additional details about the wheel-carrying assemblies 802, 902 and the manner in which they carry the support wheels 915, reference may be made to U.S. Pat. No. 8,607,903, hereby incorporated by reference herein. Of course, there is no particular limit on the number of support wheels 915 that may be used, or in the manner in which they are grouped.

The support wheels 915 may be metallic and may define a hollow internal space referred to as a guiding space 808 for receiving a wheel guide 1110 of the endless track 1100 to guide the endless track 1100 as it moves around the wheels 800. In some embodiments, this guiding space 808 may also receive part of the outer surface of the drive wheel 905 and/or of the idler wheel 910, so that there may be overlap between one of the support wheels 915 and the drive wheel 905 or the idler wheel 910 in the longitudinal direction of the main vehicle 10. In some embodiments, the support wheels 915 may be made of rubber and be devoid of a guiding space 808.

Figure 11:
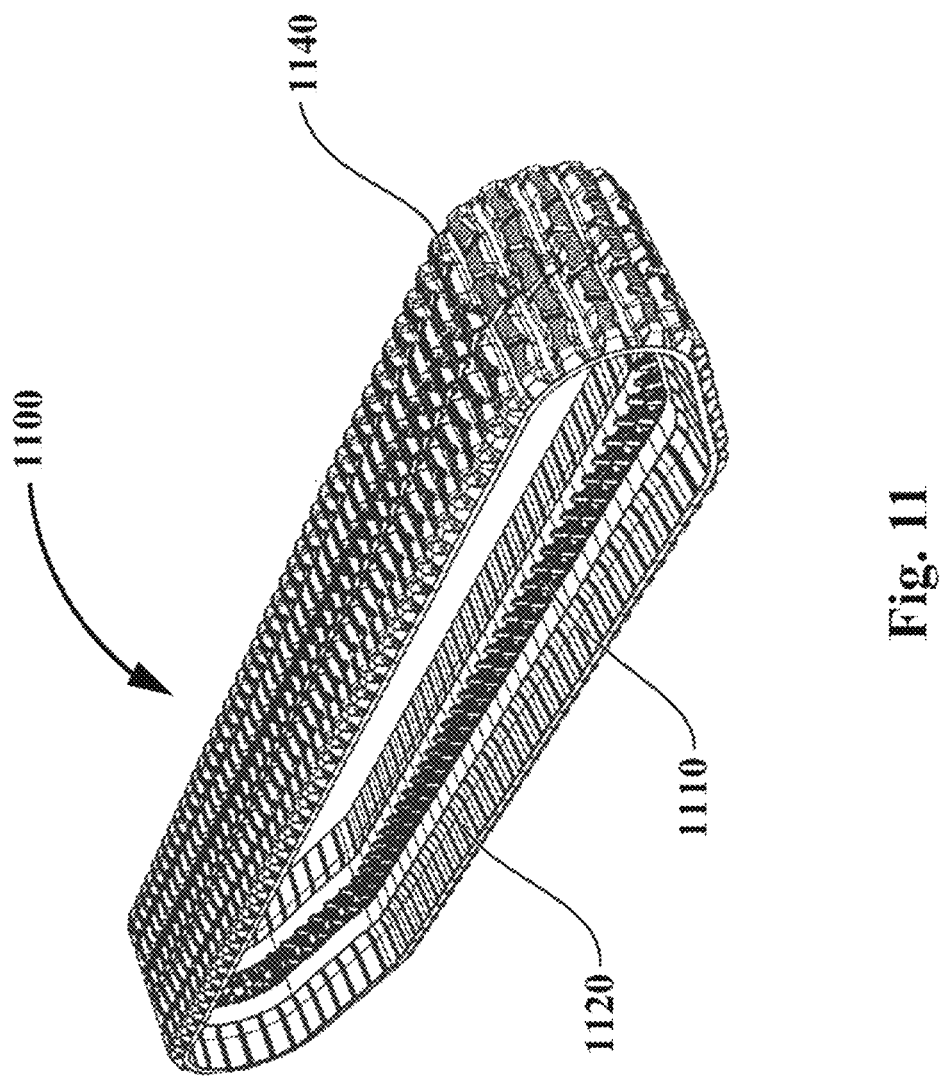
FIG. 11 is a perspective view of an endless track, according to an example non-limiting embodiment.

As shown in FIG. 11, the track is an endless track 1100 having an inner side 1120 and an outer side 1140. The inner side 1120 contacts the idler wheel 910, the support wheels 915, the sprocket 1040 and the top rollers 920. The outer side 1140 is configured to engage the ground. As such, at any given moment of operation, part of the outer side 1140 of the track 1100 may contact the ground. As the track 1100 moves along its endless trajectory, friction between the outer surface of the track and the ground causes the main vehicle 10 to move. The top rollers 920 are configured to guide the track 1100 and prevent it from sagging to a point where de-tracking may occur. The idler wheel 910 also guides the track and is movable by a piston so as to apply a varying degree of tension to the track.

Figure 12:
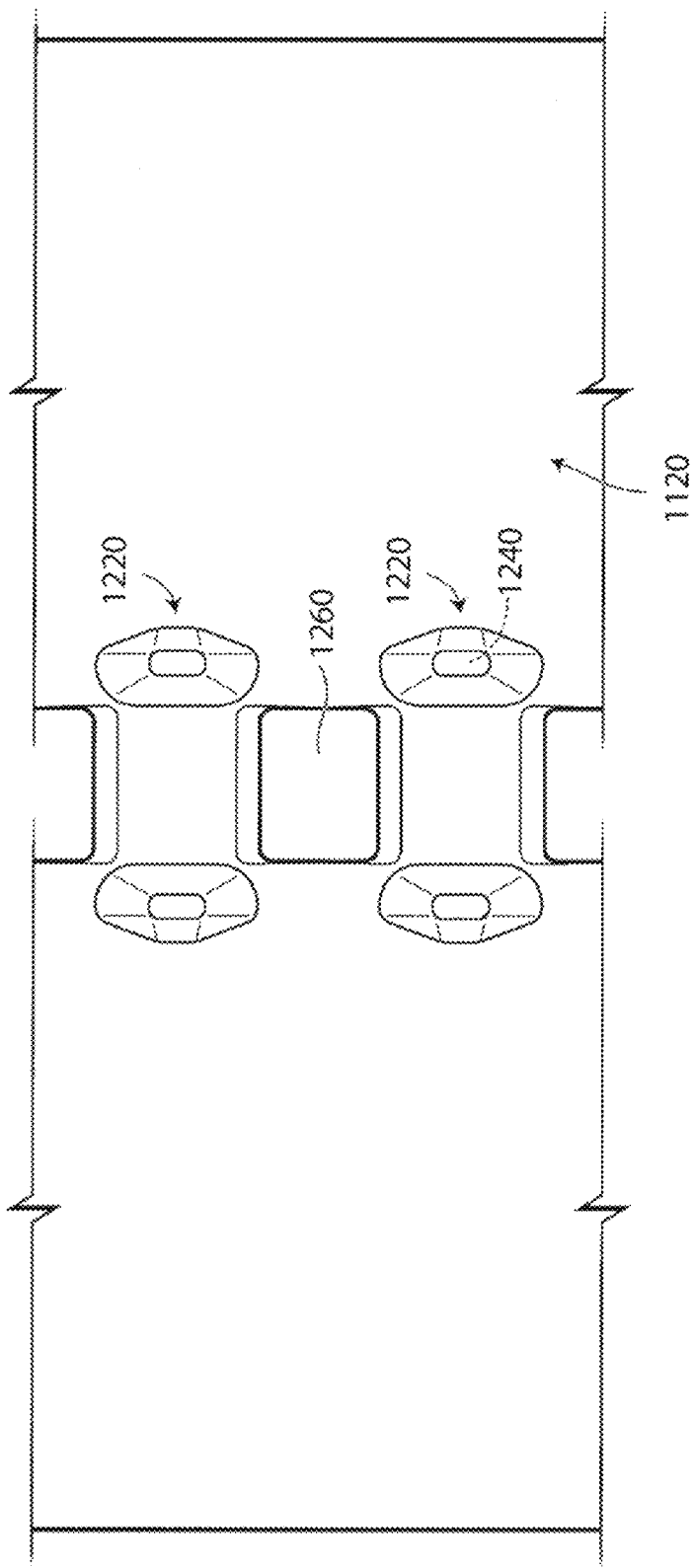
FIGS. 12 and 13 show, respectively, a plan view and a cross-sectional view of the elastomeric body of a track.
Figure 13:
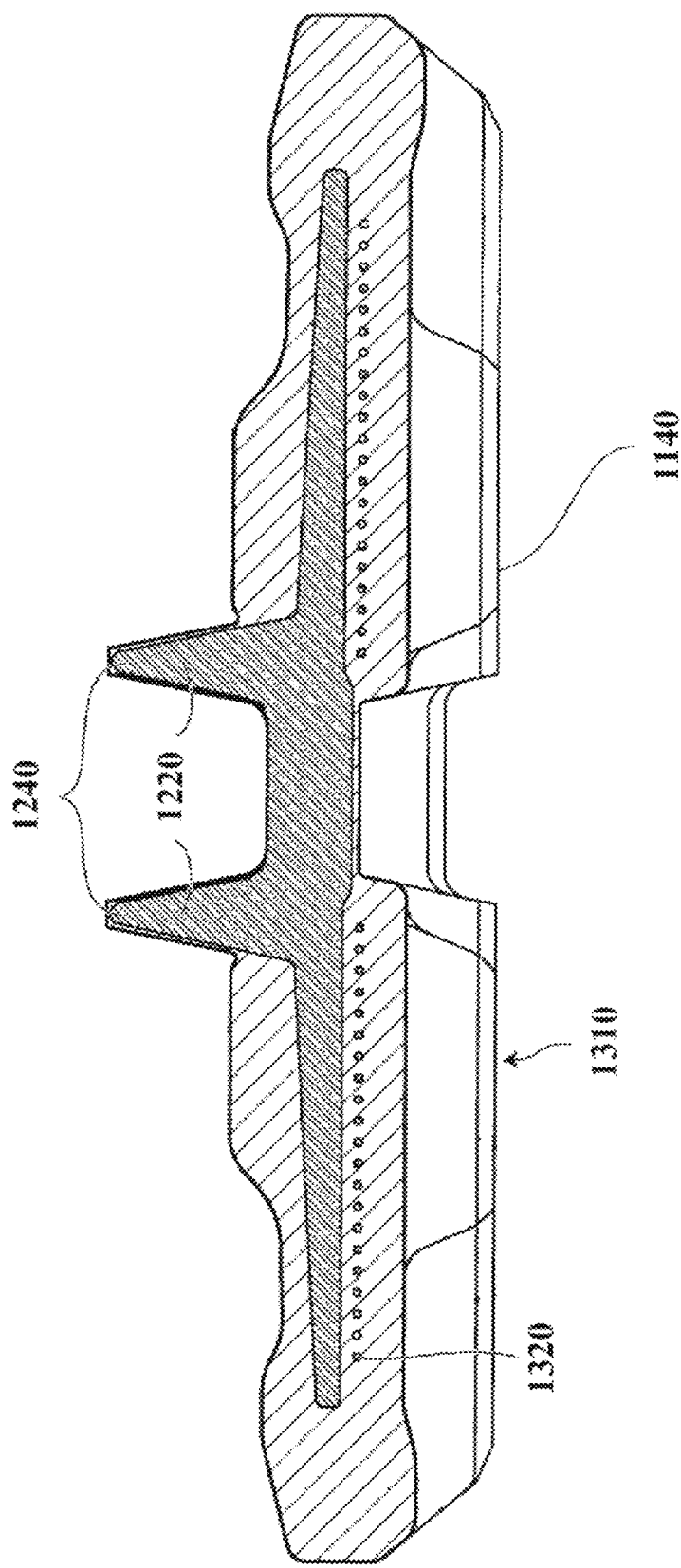

As shown in FIGS. 12-13, the track comprises an elastomeric body underlying its inner side 1120 and its ground-engaging outer side 1140. The body is elastomeric in that it comprises elastomeric material 1260 which allows the track 1100 to elastically change in shape as it is in motion around the wheels 800. The elastomeric material 1260 of the body can be any polymeric material with suitable elasticity. In this embodiment, the elastomeric material 1260 includes rubber. Various rubber compounds may be used and, in some cases, different rubber compounds may be present in different areas of the track. In other embodiments, the elastomeric material 1260 may include another elastomer in addition to or instead of rubber (e.g., polyurethane elastomer).

A plurality of cores 1220 are embedded in the elastomeric material 1260 of the body of the endless track 1100, spaced apart along the longitudinal direction of the main vehicle 10 and of the track 1100, and extending transversally to the longitudinal direction of the track to impart transverse rigidity to the track. The cores 1220 are made of rigid material. For instance, in this embodiment, the cores 1220 are metallic (e.g., steel) cores. This type of track can thus sometimes be referred to as a "metal-embedded rubber track" (MERT).

One or more reinforcements may be embedded in the elastomeric material 1260 of the body of the endless track 1100. For instance, a reinforcement may be a layer of reinforcing cables 1320 that are adjacent to one another and that extend in the longitudinal direction of the track to enhance strength in tension of the track along its longitudinal direction. In some cases, a reinforcing cable 1320 may be a cord or wire rope including a plurality of strands or wires. In other cases, a reinforcing cable 1320 may be another type of cable and may be made of any material suitably flexible longitudinally (e.g., fibers or wires of metal, plastic or composite material). Various other types of reinforcements may be provided in other embodiments.

The ground-engaging outer side 1140 of the track comprises a tread pattern to enhance traction on the ground. The tread pattern comprises a plurality of traction projections 1310, which can be referred to as "traction lugs", spaced apart along the longitudinal direction of the track 1100 and engaging the ground to enhance traction.

The inner side 1120 of the track 1100 comprises may comprise guide projections 1240 of each of the cores 1220. In addition, the inner side 1120 of the track comprises rolling surfaces on which the support wheels 915 roll to apply the track onto the ground.

For additional details about the wheel-carrying assemblies and the manner in which they carry the support wheels 915, reference may be made to U.S. Pat. No. 9,616,947, hereby incorporated by reference herein. The endless track 1100 may be configured in various other ways in other embodiments.

(iii) Cab

The cab 506 is mounted on top of the upper portion of the frame 822, either directly to the top surface of the rails 824 or via an intermediate mechanism or platform (not shown). The cab 506 is designed to accommodate an operator and potentially one or more passengers.

Figure 52:
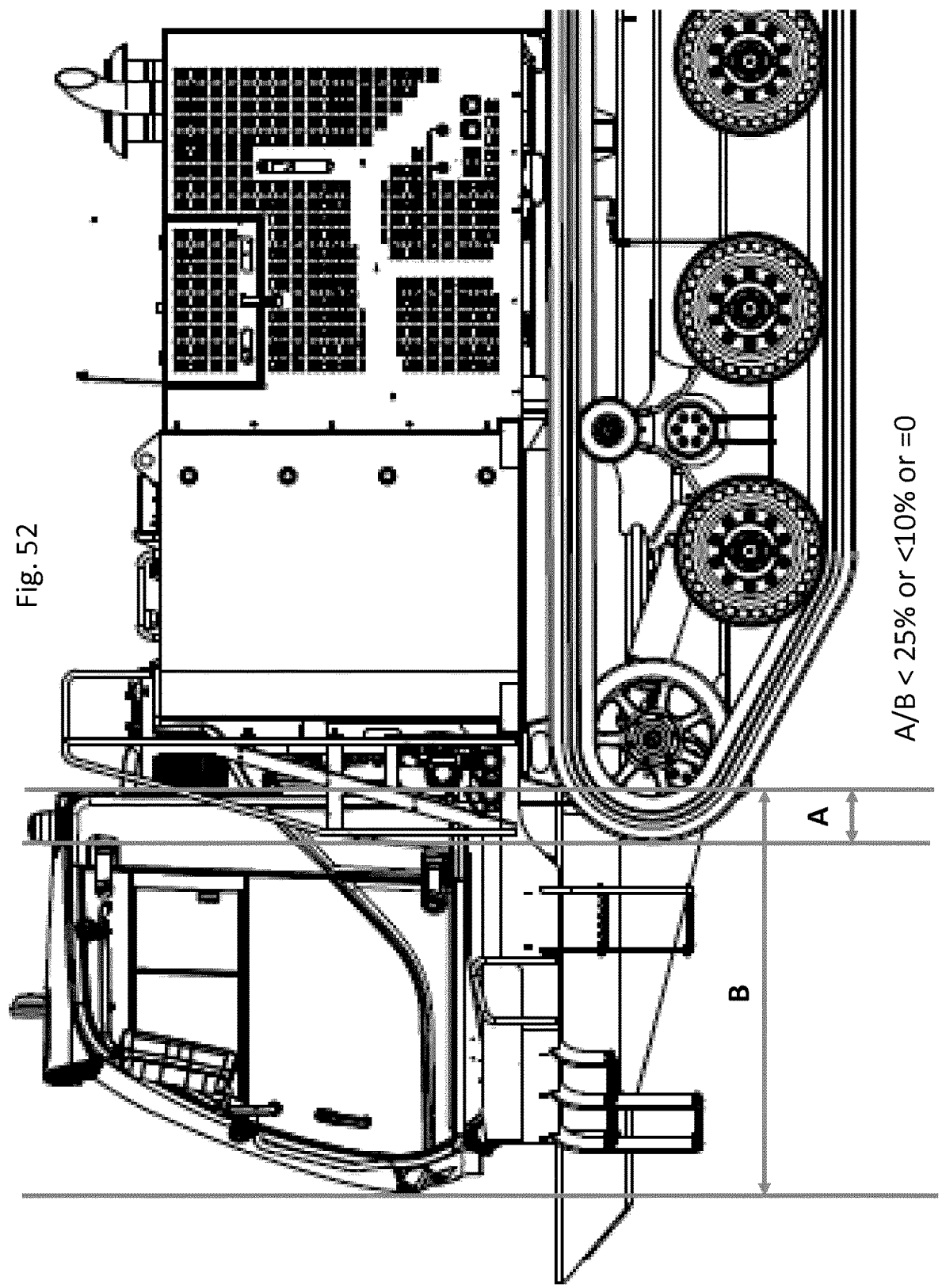
FIG. 52 is a side view of the cab of the main vehicle positioned with respect to the frame and the track assemblies, according to an example non-limiting embodiment.

With reference to FIG. 52, the cab 506 has a length B in a longitudinal direction of the main vehicle. In an embodiment, the cab 506 extends out almost entirely in front of the track assemblies 102, 104 such that none or only a small amount of its length B overlies the track assemblies 102, 104. In other words, there is an amount of overlap A between the cab 506 and the track assemblies 102, 104 in the longitudinal direction, and this amount of overlap A is less than 25%, possibly less than 10%, and possibly none, of the length of the cab 506 B, i.e., AB<0.25 or <0.1 or =0. Another way to state this is that at least 75% (and possibly at least 90% and possibly even 100%) of B, the length of the cab 506, is in front of the frontmost portion of the track assemblies 102, 104 of the main vehicle 10. This serves as a counter balance for the trailer 20, which is designed to transport a load in certain configurations. As a result, the difference in ground pressure applied by the tracks of the front and rear track assemblies 102, 104, 2502, 2504 is minimized for a range of load conditions and lengthwise load distributions.

The cab 506 includes at least one seat 1410 and a user interface 1400. The seat 1410, which can be referred to as an "operator seat", is positioned relative to the user interface 1400 to allow the operator to easily interact with the user interface 1400.

The user interface 1400 enables the operator to interact with the main vehicle 10 and the trailer 20. For example, the user interface 1400 comprises controls allowing the operator to move the main vehicle 10 and the trailer 20 on the ground. In some cases, the user interface 1400 may also include controls for controlling equipment, e.g., a crane, carried by the trailer 20. The user interface 1400 comprises an input portion to allow the operator to input commands for execution by the main vehicle 10 or the trailer 20 and an output portion to convey information to the operator.

Figure 14B:
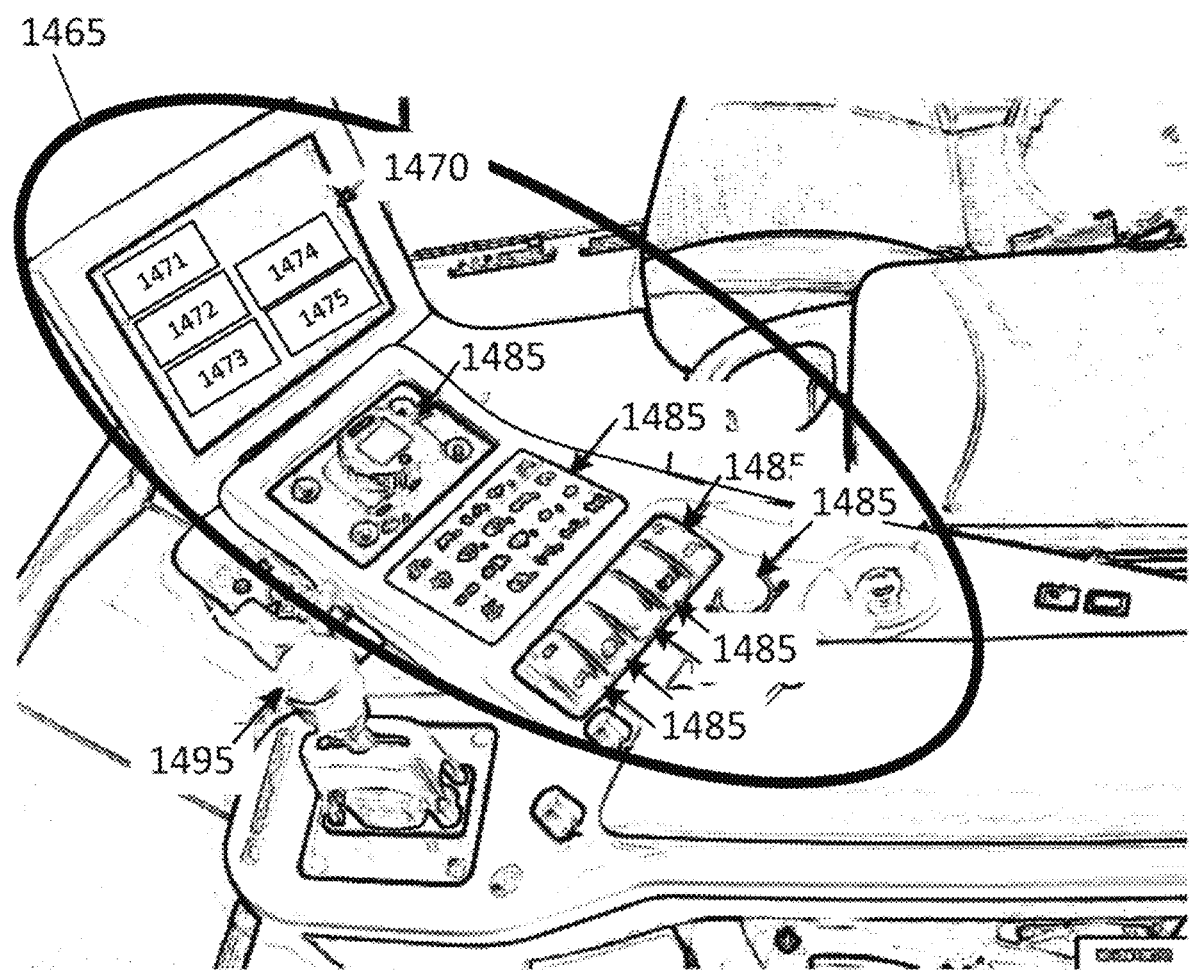
FIG. 14B is a perspective view of an operator console inside the cab, the operator console including a touch screen having a display.

In this embodiment, and as shown in FIGS. 14A and 14B, the input portion of the user interface 1400 comprises an accelerator 1420, a steering device 1430, a transmission state selector 1440, a starter switch 1450, a control lever 1460 and an operator console 1465 that includes a touch screen 1470 as well as an arrangement of buttons and knobs. More particularly:

- The accelerator 1420 allows the operator to control a speed of the main vehicle 10 (and the trailer 20) on the ground. In an example, the accelerator 1420 comprises a speed pedal operated by a foot of the operator. The accelerator 1420 may be implemented in other ways in other examples (e.g., a hand-operated accelerator).
- The steering device 1430 allows the operator to steer the main vehicle 10 (and the trailer 20) on the ground. In this example, the steering device 1430 comprises a steering wheel that is rotatable relative to a steering column 1405 about a steering axis. In addition to the steering wheel, in an example of implementation, the steering column 1405 supports the transmission state selector 1440, the starter switch 1450, and the control lever 1460. The steering device 1430 may be implemented in other ways in other embodiments (e.g., a joystick).
- The transmission state selector 1440 allows the operator to control a state of power transmission to the track assemblies. For instance, in this example, the transmission state selector 1440 comprises a proportional front-neutral-reverse selector to control whether power is transmitted to the track assemblies 102, 104, 2502, 2504 to move in a forward or reverse direction or not transmitted to the track assemblies 102, 104, 2502, 2504. The transmission state selector 1440 may be implemented in other ways in other embodiments.
- The starter switch 1450 allows the operator to start the prime mover 508. For instance, in an example, the starter switch 1450 comprises a key-receiving unit to receive a key to start the prime mover 508. The starter switch 1450 may be implemented in other ways in other embodiments (e.g., a start button, a code entry device, a biometric authentication device, etc.).
- The control lever 1460 allows the operator to control various devices of the vehicle 10. For instance, the control lever 1460 could include a wiper control which allows the operator to control a wiper 1465, a washer fluid control to allow the operator to control outflow of washer fluid from a washer fluid nozzle, and a turning indicator control to allow the operator to control a turning indicator of the main vehicle 10 (and the trailer 20). The control lever 1460 may include any other suitable control in other examples.
- The touch screen 1470 allows the operator to provide inputs by pressing or tapping on certain areas of the screen to convey or confirm information.

The input portion of the user interface 1400 may comprise any other input device (e.g., a set of buttons, a joystick 1495, a trackball, etc.) in other embodiments.

In an embodiment, the output portion of the user interface 1400 comprises a display to visually convey information to the operator. The display may be any suitable type of electronic display (e.g., a liquid-crystal display (LCD), etc.). In some embodiments, the display may include the aforementioned touch screen 1470. Various information can be conveyed to the operator on the display. For example, in some embodiments, the display may implement an instrument panel that provides:

- A speedometer indicator 1471 which conveys information indicative of the speed at which the main vehicle 10 is moving as measured by a speedometer;
- A tachometer indicator 1472 which conveys information indicative of the speed at which the prime mover 508 is running as measured by a tachometer;
- An odometer indicator 1473 which conveys information indicative of a distance traveled by the main vehicle 10 as measured by an odometer;
- A fuel gauge indicator 1474 which conveys information indicative of a quantity of fuel remaining in the fuel tank 510;
- A trailer indicator 1475 (e.g., a trailer indicator light) which conveys whether the trailer 20 has been connected to the main vehicle 10, including whether a hydraulic connection has been made, an electrical connection has been made and/or whether a connector (e.g., a kingpin) of the trailer 20 has engaged a mating connector (e.g., fifth wheel hitch) of the main vehicle 10; and/or
- Any other indicator conveying information to the user.

Each of the aforementioned indicators may comprise a digital numerical reading, a digital dial, a digital bar graph, a digital symbol, and/or any other element displayable on the display to convey information to the operator.

The output portion of the user interface 1400 may comprise any other output device (e.g., one or more mechanical dials (e.g., a speedometer dial, a fuel gauge dial, etc.) or other mechanical indicators (e.g., a mechanical odometer);

one or more light indicators (e.g., low fuel light indicator, etc.); a speaker; etc.) in other embodiments.

The user interface 1400 is mechanically or electrically (or even wirelessly) connected to other components of the main vehicle 10 and the trailer 20 to cause execution of commands provided by the operator and to present information to the operator. More particularly, one or more controllers may process certain commands provided the operator via the input interface, resulting in actions taken by various components of the main vehicle 10 and the trailer 20 and possibly also resulting in information displayed via the output interface. To this end, the one or more controllers may implement control algorithms. These one or more controllers may also process inputs received from a variety of sensors connected at different points of the main vehicle 10 and the trailer 20. Non-limiting examples of sensors may include speed, pressure and acceleration sensors, as well as thermometers and cameras, for example. Other non-limiting examples of sensors may include a pedal position sensor 1520 (e.g., comprising a potentiometer) for sensing a position of the speed pedal, a steering device angle sensor 1620 for sensing an angle in which the steering wheel is positioned, a lever sensor for sensing a position of the control lever 1460, a fuel level sensor, a trailer angle sensor for sensing the angle between the main vehicle 10 and the trailer 20, and so on.

Figure 15:
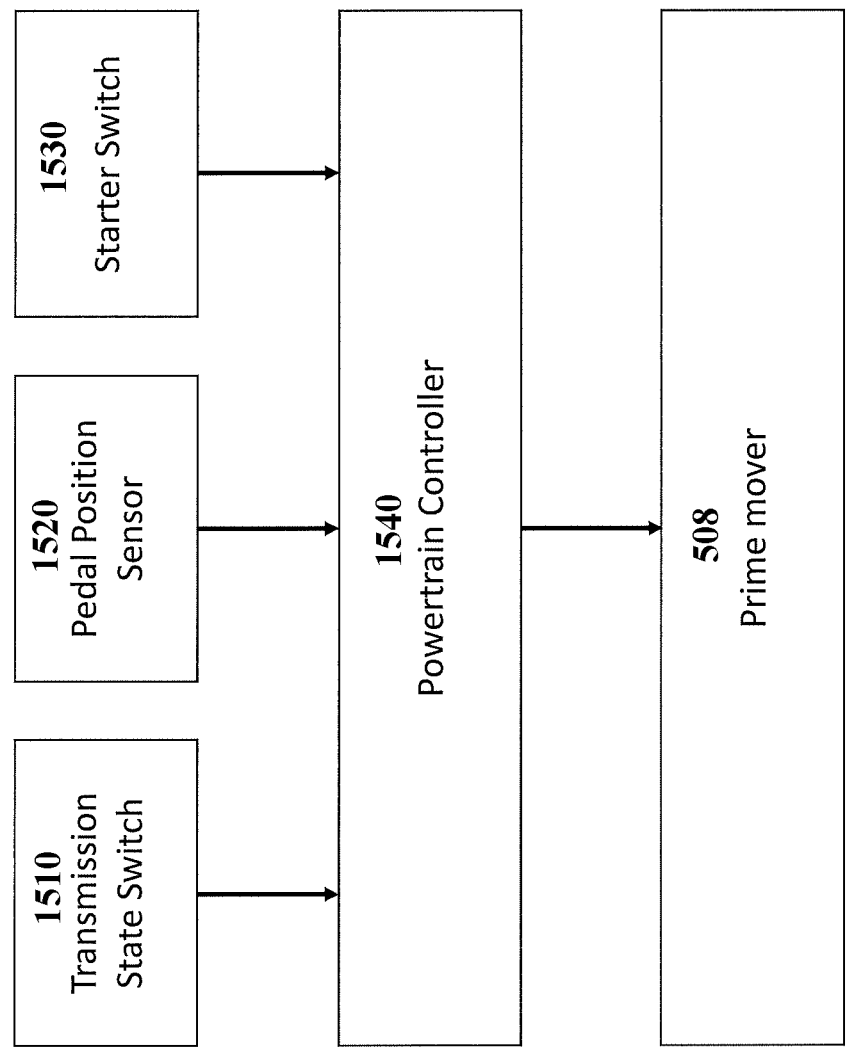
FIGS. 15 to 18 are block diagrams showing logical interconnections between various components of the main vehicle and various controllers, according to various example non-limiting embodiments.

With reference to FIG. 15, the one or more controllers may include a powertrain controller 1540 (e.g., an engine control unit—ECU). For example, the powertrain controller 1540 may collect inputs from the accelerator 1420 (speed pedal) via the pedal position sensor 1520, the transmission state switch 1510 and the starter switch 1530, and may process these to provide a signal to control operation of the prime mover 508. In other embodiments, the connection may comprise a mechanical link between the speed pedal and a throttle for the prime mover 508.

Figure 16:
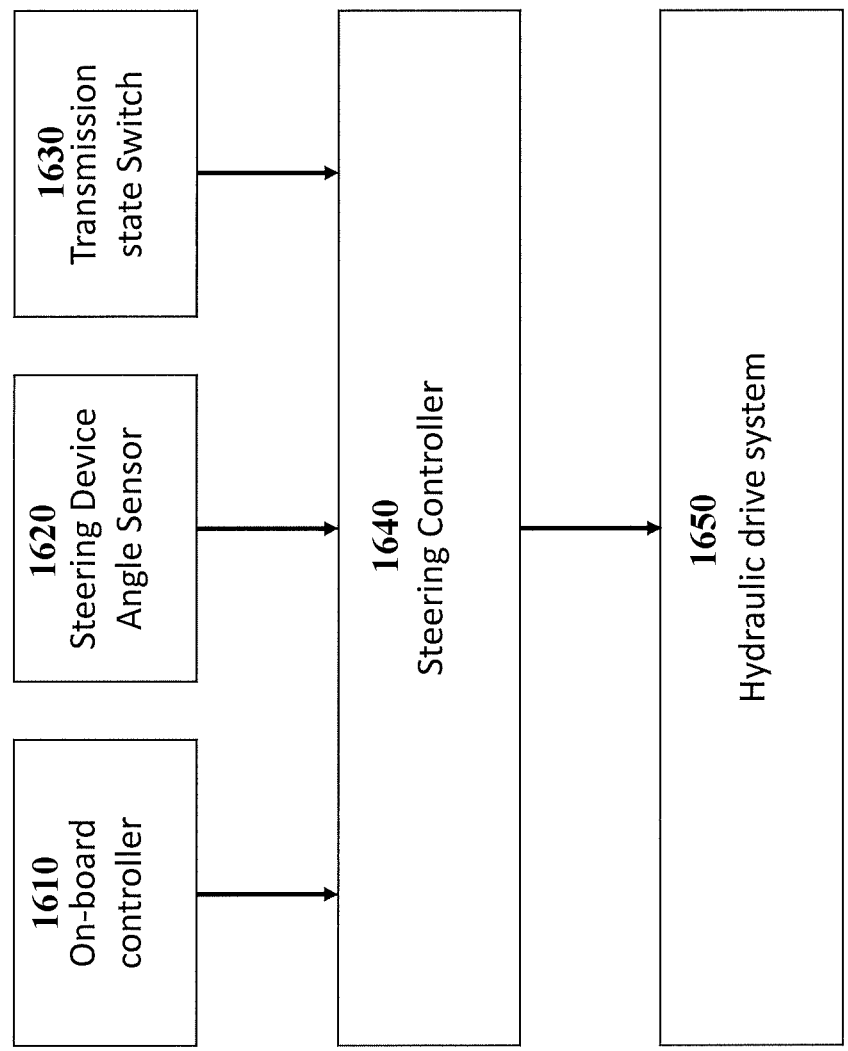

With reference to FIG. 16, the one or more controllers may also include a steering controller 1640. For example, the steering controller 1640 may collect a steering command input from the steering device angle sensor 1620 (indicative of an attempt by the operator to turn the vehicle arrangement) and the transmission state switch 1510 (indicative of whether the transmission is in forward or reverse), and may process this signal to provide a signal to control the hydraulic motors of the hydraulic drive system 1650 to cause the endless tracks 1100 of the track assemblies 102, 104, 2502, 2504 to move at different speeds.

Figure 17:
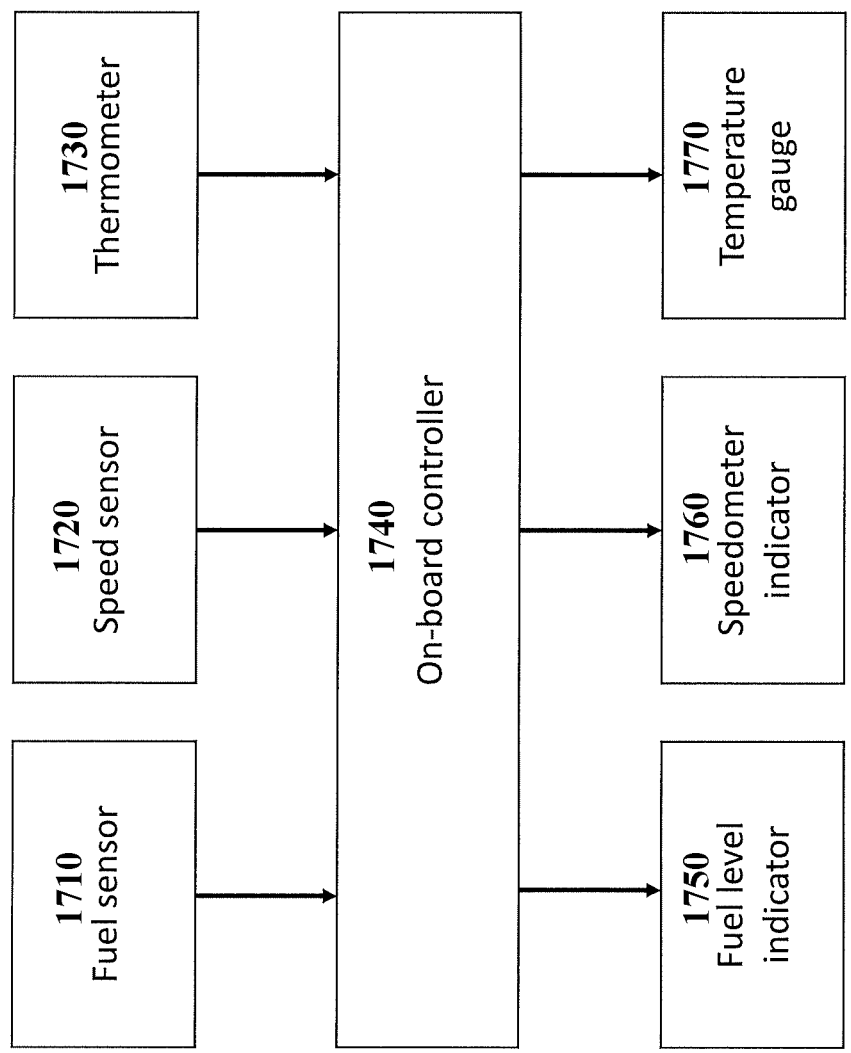

With reference to FIG. 17, the one or more controllers may also include an on-board controller 1740. For example, the on-board controller 1740 may collect input from a fuel sensor 1710, a speed sensor 1720 and a thermometer 1730, and may process these to output corresponding readings on the speedometer indicator 1760, the fuel level indicator 1750 and temperature gauge 1770, for viewing by the operator.

Additionally, the on-board controller 1740 may collect an input from a trailer attachment sensor 2320 that senses whether the trailer 20 is attached (e.g., hitched) to the main vehicle 10. The trailer attachment sensor 2320 may be mounted to an articulated trailer connector 512 (e.g., a fifth wheel hitch) on the frame 504 of the main vehicle 10, or it could be configured to test whether electricity is being consumed by the trailer 20. The on-board controller 1740 may be configured to process the output of the trailer attachment sensor 2320 to assess the presence or absence of a trailer and to correspondingly light the trailer indicator 1475. The on-board controller 1740 may also be configured to determine that there is now a trailer attached where there was none before, and to request a confirmation from the operator via the touch screen 1470.

Figure 18:
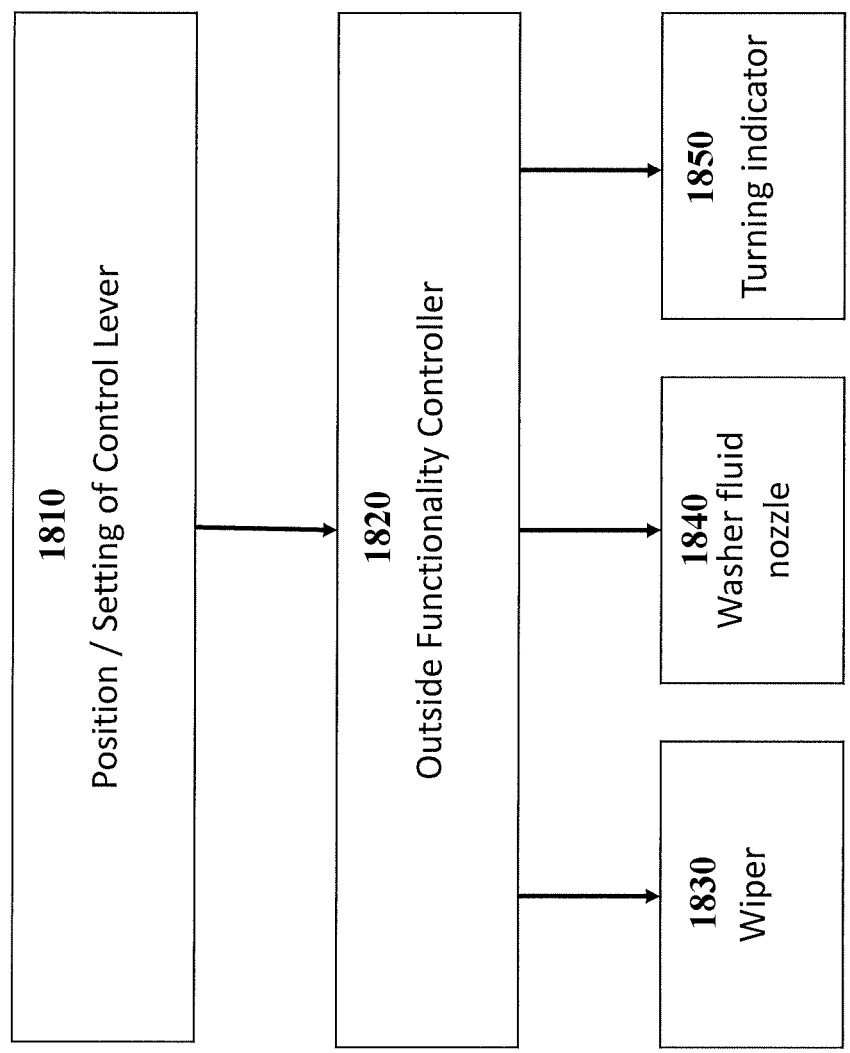

With reference to FIG. 18, the one or more controllers may also include an outside functionality controller 1820. For example, the control lever controller 1810 may collect the position and setting of the control lever, and may process this information to determine an output signal that is to be sent to outside functionality devices for activating or controlling the wiper 1830, the washer fluid nozzle 1840, the turning indicator 1850 and/or any other device of the main vehicle 10 or of the trailer 20 which can be controlled via inputs at the control lever 1460.

The aforementioned controllers, such as the powertrain controller 1540, the steering controller 1640 the on-board controller 1740 and the outside functionality controller 1820, may also communicate signals to one another. For example, the on-board controller 1740 may send to the steering controller 1640 a signal indicative of presence or absence of the trailer 20; such signal may be interpreted by the steering controller 1640 as will be described later on.

The aforementioned controllers, such as the powertrain controller 1540, the steering controller 1640, the on-board controller 1740 and the outside functionality controller 1820, may be implemented in various manners. For example, one or more of these controllers may comprise suitable hardware and/or software (e.g., firmware) implementing: an interface for receiving and transmitting signals to other components of the vehicle 10 to which it is connected; a processing portion comprising one or more processors for performing processing operations, where a processor may be a general-purpose processor executing program code stored in the controller or a specific-purpose processor comprising one or more preprogrammed hardware or firmware elements (e.g., application-specific integrated circuits (ASICs), electrically erasable programmable read-only memories (EEPROMs), etc.); and a memory portion comprising one or more memories for storing program code executed by the processing portion and/or data used during operation of the processing portion, where a memory may be a semiconductor memory (e.g., read-only memory (ROM) and/or random-access memory (RAM)), a magnetic storage medium, an optical storage medium, and/or any other suitable type of memory.

Figure 19:
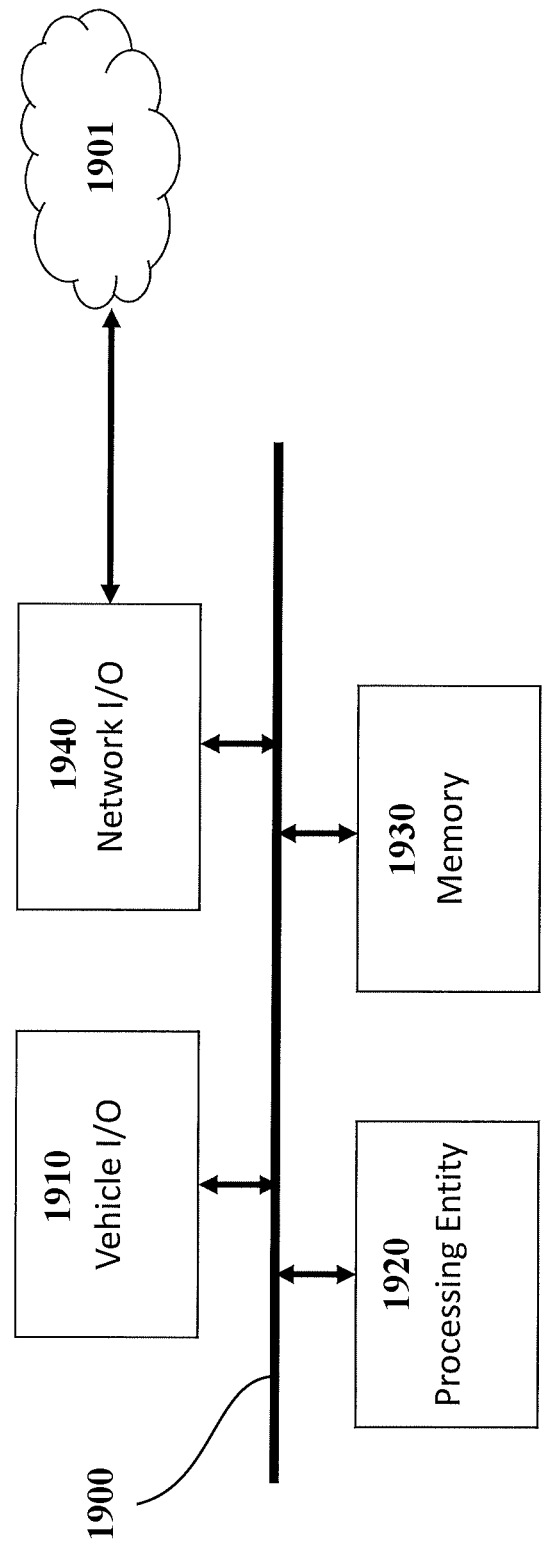
FIG. 19 is a block diagram showing a possible internal configuration of a generic one of the controllers, according to an example non-limiting embodiment.

FIG. 19 shows a possible internal structural configuration of a controller, in accordance with a non-limiting embodiment. The controller includes a processing entity 1920 connected to a memory 1930 over a bus 1900. Examples of the processing entity 1920 may include electronic components such as a computer processor comprising a microchip or application-specific integrated circuitry, or a quantum computer. The memory 1930 may be implemented in a variety of ways, such as a magnetic disk or solid state memory, and may include flash memory, SRAM, DRAM, phase-change memory and the like. The memory 1930 stores computer-readable instructions, respective subsets of which may encode an operating system and a set of processes. The processing entity 1920 is configured to execute the computer-readable instructions in the memory 1930. In so doing, the processing entity 1920 of the controller configures the controller to implement the aforementioned operating system and various processes. The precise nature of the processes implemented in this way depends on the type or functionality of the controller. A user input/output 1910 (I/O), connected to the processing entity 1920 over the bus 1900, enables the processing entity 1920 to communicate externally with a user with the aid of peripherals such as a screen/touchscreen, keyboard/mouse, USB port, etc. A network interface 1940, also connected to the processing entity 1920 over the bus 1900, enables the processing entity 1920 to communicate externally over a data network 1901 (e.g., over the internet) and may include a network interface device (e.g., to support Ethernet communications of various speeds, for example) and/or a wireless transceiver (e.g., to support NFC, WiFi, Ethernet or cellular/GSM/LTE communications, for example). Connection to the data network 1901 may be established by a link connected to the network interface 1940.

In some embodiments, two (2) or more (e.g., all) of the controllers may be physically distinct from one another and may be connected to one another via a bus 1900 (e.g., a controller-area network (CAN) bus or other suitable bus). In other embodiments, two (2) or more (e.g., all) of the controllers may be functional entities of a single physical control unit (e.g., a vehicle controller).

(iv) Prime Mover

With reference to FIG. 20, the prime mover 508 generates power to move the main vehicle 10 and the trailer 20 (as it is assumed to be attached to the main vehicle 10 for the purposes of this section of the disclosure). For example, the prime mover 508 may comprise an internal combustion engine and/or one or more other types of motors (e.g., electric motors, etc.) for generating motive power to move the main vehicle 10 and the trailer 20.

The prime mover 508 is in a driving relationship with each of the track assemblies 102, 104, 2502, 2504. That is, power derived from the prime mover 508 is transmitted to each of the track assemblies 102, 104, 2502, 2504 in order to drive the track assemblies 102, 104, 2502, 2504. In this embodiment, power from the prime mover 508 is transmitted to the track assemblies 101, 102, 2502, 2504 via a hydraulic drive system. In one example, the hydraulic drive system comprises, for each of the track assemblies, a hydraulic pump driven by the prime mover 508 and connected to a hydraulic motor 1030 which drives that track assembly 102; each hydraulic pump may be electronically regulated by the steering controller 1640. In another embodiment, there is a single pump connected to the various hydraulic motors 1030 by a flow control valve electronically regulated by the steering controller 1640. Power from the prime mover 508 may be transmitted to the track assemblies 102, 104, 2502, 2504 in various other ways in other embodiments.

In this embodiment, the prime mover 508 is contained in a housing together with other components. More particularly, the housing may house hydraulic components (including each hydraulic pump of the hydraulic drive system and a hydraulic fluid reservoir); a cooling system for cooling the prime mover 508 and hydraulic fluid of the hydraulic drive system; batteries; components of an exhaust system; pipes; and cables. Other components may be housed in the housing in other embodiments.

The prime mover 508 is mounted to the upper frame structure 822, for example directly to the top surface 826 of the rails 824 or via an intermediate mechanism or platform (not shown). As such, the prime mover is mounted above the frame 504. When embodied as an internal combustion engine (ICE), the prime mover 508 may comprise a plurality of cylinders generally aligned along one direction W, which is referred to as the orientation of the ICE. In some embodiments, the ICE is mounted to the frame 504 transversally. In other words, the ICE is mounted above the frame 504 such that the orientation of the ICE (namely W) is perpendicular to the direction of travel of the main vehicle 10, while the direction L (see FIG. 20, in the plane of rotation caused by the cylinders) is parallel to the direction of travel of the main vehicle 10. This transverse arrangement may provide compactness in the longitudinal direction of the main vehicle 10 so as to be able to fit a large fuel tank, a cab and still have adequate space for connecting the trailer in a way that provides stability.

Other components related to the prime mover 508 may be provided, such as a cowling 500 for covering the prime mover 508, a radiator (or cooler) for cooling the prime mover 508 and an engine air intake for supplying air to the prime mover 508.

(v) Fuel Tank

Figure 21:
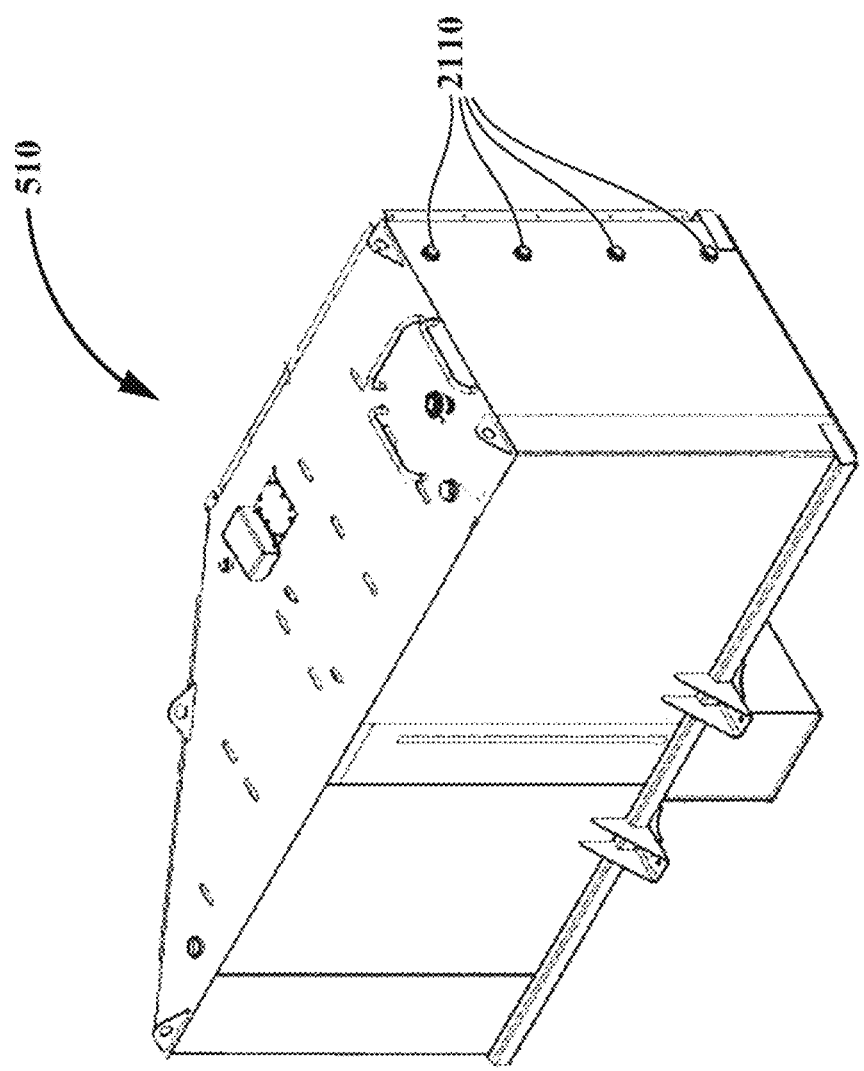
FIGS. 21 and 22 are images of the fuel tank mounted above the frame of the main vehicle, according to an example non-limiting embodiment.
Figure 22:
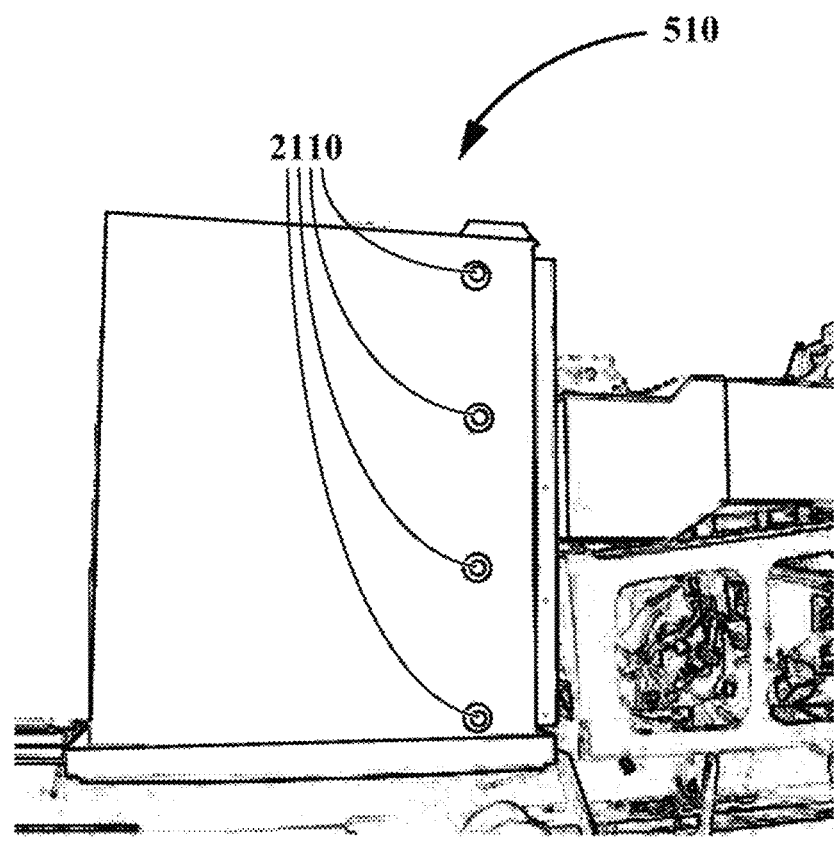

With reference to FIGS. 21-22, the fuel tank 510 is also mounted on top of (above) the frame 504, either directly to the top surface 826 of the rails 824 or via an intermediate mechanism or platform. The fuel tank 510 has a sizeable capacity, on the order of at least 2,000 liters, possibly at least 4,000 liters and potentially more. The actual capacity is not material for the purposes of this disclosure, although it is expected that a capacity of several thousand liters may be required in many polar applications. The level of fuel in the fuel tank 510 can be roughly estimated using sight glasses 2110 on the fuel tank 510 itself. There may be, e.g., four sight glasses 2110 aligned vertically at various levels (e.g., 700, 1700, 2700 and 3700 liters). A fuel gauge may also be provided on the display in the cab 506. In certain embodiments, the fuel tank 510 could be comprised of multiple fuel tanks that are removable and interchangeable. In the illustrated embodiment, the fuel tank 510 is generally in the shape of a prism having a trapezoidal base; however, this is not to be considered a limitation of the present disclosure.

An auxiliary pump may also be provided for transferring fuel from a source off of the main vehicle 10 into the fuel tank 510. A fuel level alarm device may also be provided. The fuel level alarm device includes a detector at a critical level near the top of the fuel tank 510 and is configured to activate a visual alarm when fuel is detected by the detector, i.e., when the fuel level approaches the top of the fuel tank 510 at filling. When the critical level is reached, an alarm (e.g., a light or buzzer) may be activated to warn the operator of this condition. A stop switch is provided that allows the operator to turn off the alarm. If the fuel tank 510 was filled by the auxiliary fuel pump onboard the main vehicle 10, the stop switch will cut the power to the pump as well as the visual alarm.

In some cases, the particular configuration of the cab 506, the fuel tank 510 and the prime mover 508 may have certain features and provide certain advantages. For example, due to the sizeable capacity of the fuel tank 510, it occupies a correspondingly large volume. As such, if the fuel tank 510 of the required size were to co-exist with a longitudinally aligned prime mover 508, even if such prime mover 508 partly occupied the space internal to the frame 504 of the main vehicle 10, this would still require the fuel tank 510 to be split into two parts, which may be a risk under extreme operating conditions (e.g., polar or desert regions). As such, the engine is placed transversally, and the fuel tank 510 is placed between the cab 506 and the engine. This allows the fuel tank 510 to be constructed as a single unit. An added benefit is that a fuel tank 510 of such size may act as a sound barrier between the prime mover 508 and the cab 506.

(vi) Articulated Trailer Connector

With reference to FIG. 23, the articulated trailer connector 512 is mounted to the upper portion of the frame 822, in an area that is above the second (rearward) wheel-carrying assembly 902 of the track assemblies 102, 104 of the main vehicle 10, when viewed from the side. In a specific non-limiting embodiment, the articulated trailer connector 512 may comprise a fifth wheel hitch 2310. The fifth wheel hitch 2310 may be provided with a lock/unlock lever and used to unlock a kingpin 2710 of the trailer 20 when disconnecting the trailer 20 from the main vehicle 10. In other embodiments, the articulated trailer connector 512 may be a gooseneck hitch, for example.

B. Trailer

The trailer 20 is now described in greater detail. The trailer 20 is a powered tracked vehicle attached to the main vehicle 10. With reference to FIGS. 24-36, the trailer 20 includes (i) a frame 2400, (ii) track assemblies 2502, 2504, (iii) a connector (e.g., a kingpin 2710), (iv) a platform 2410 and (v) a pulling connection 2810. These components will now be described in greater detail.

(i) Frame

With reference to FIGS. 24-30, the frame 2400 of the trailer 20 may be substantially identical to the frame 504 of the main vehicle 10. This may help reduce the quantity of spare parts that might need to be carried on an expedition, as parts used to repair one frame could also be used to repair the other. Where the chances that a particular one of the two frames would fail are small, the chances that both frames would fail and require the same spare part are infinitesimal.

As such, the frame 2400 of the trailer may comprise an upper frame structure 2415 connected to a lower frame structure 2515. The upper frame structure 2415 comprises a pair of parallel side rails or beams 2420, (e.g., H-beams, I-beams, C-beams, U-beams, hollow beams, full beams) extending in a generally longitudinal direction of the main vehicle 10. The side rails 2420, have an upper surface 2425 defining at least part of the upper surface of the frame 2400. The side rails 2420 may be metallic and made of steel or another alloy, or they may be non-metallic. The upper frame structure 2415 may also comprise a plurality of cross-members 2430 extending transversally to the longitudinal direction of the main vehicle 10 between the side rails, in which case the upper frame structure 2415 may be viewed as being a type of "ladder frame" construction. A spacing of the side rails 2420 in the widthwise direction of the main vehicle 10 may take on various values, including between 1,500 mm and 2,500 mm.

The lower frame structure 2515 connects to the side rails 2420 of the upper frame structure 2415, and provides structural integrity to the frame 2400. The lower frame structure 2515 is disposed below the upper frame structure 2415 and provides a main structure for supporting the track assemblies. In some embodiments, the lower frame structure 2515 may be more rigid than the upper frame structure 2415. In fact, it may be the most rigid portion of the frame 2400 and provides torsional rigidity. In some embodiments, the lower frame structure 2515 may comprise a pair of side beams 2520 extending along the longitudinal direction of the main vehicle 10 and spaced apart in the widthwise direction of the main vehicle 10. The lower frame structure 2515 may also comprise a plurality of cross-members 2530 extending transversally to the longitudinal direction of the main vehicle 10 between the side beams of the lower frame structure 2515. The lower frame structure 2515 may thus also be viewed as being a type of "ladder frame" construction.

In an embodiment, each of the side beams may be a rectangular box beam made of metallic material, in this case steel. In other embodiments, each of the side beams may be a hollow beam having a cross-sectional shape other than rectangular (e.g., circular or otherwise curved), or a channel having a C-shape, U-shape or other suitable shape, or any other suitable elongated structural member. As another example, in some embodiments, the side beams may be made of material other than steel.

An internal space defined by the frame 2400 may be used to house cables, including hydraulic cables and electric cables, as well as various other components such as pipes, as well as batteries.

(ii) Track Assemblies

Track assemblies 2502, 2504 may be identical to track assemblies 102, 104. As a result, the vehicle arrangement on the whole has four (4) identical track assemblies, two front track assemblies on the main vehicle 10 and two rear track assemblies on the trailer 20.

As such, track assembly 2502 is a left track assembly mounted on the left lateral side of the frame 2400 and track assembly 2504 is a right track assembly mounted on the right lateral side of the frame 2400. The track assemblies 2502, 2504 may be mounted to both the lower frame structure 2515 and the upper frame structure 2415. Each of the track assemblies 2502, 2504 supports a portion of a weight of the trailer 20 and, if applicable, its load; this is the portion that is not supported by the track assemblies 102, 104 of the main vehicle 10.

Figure 25:
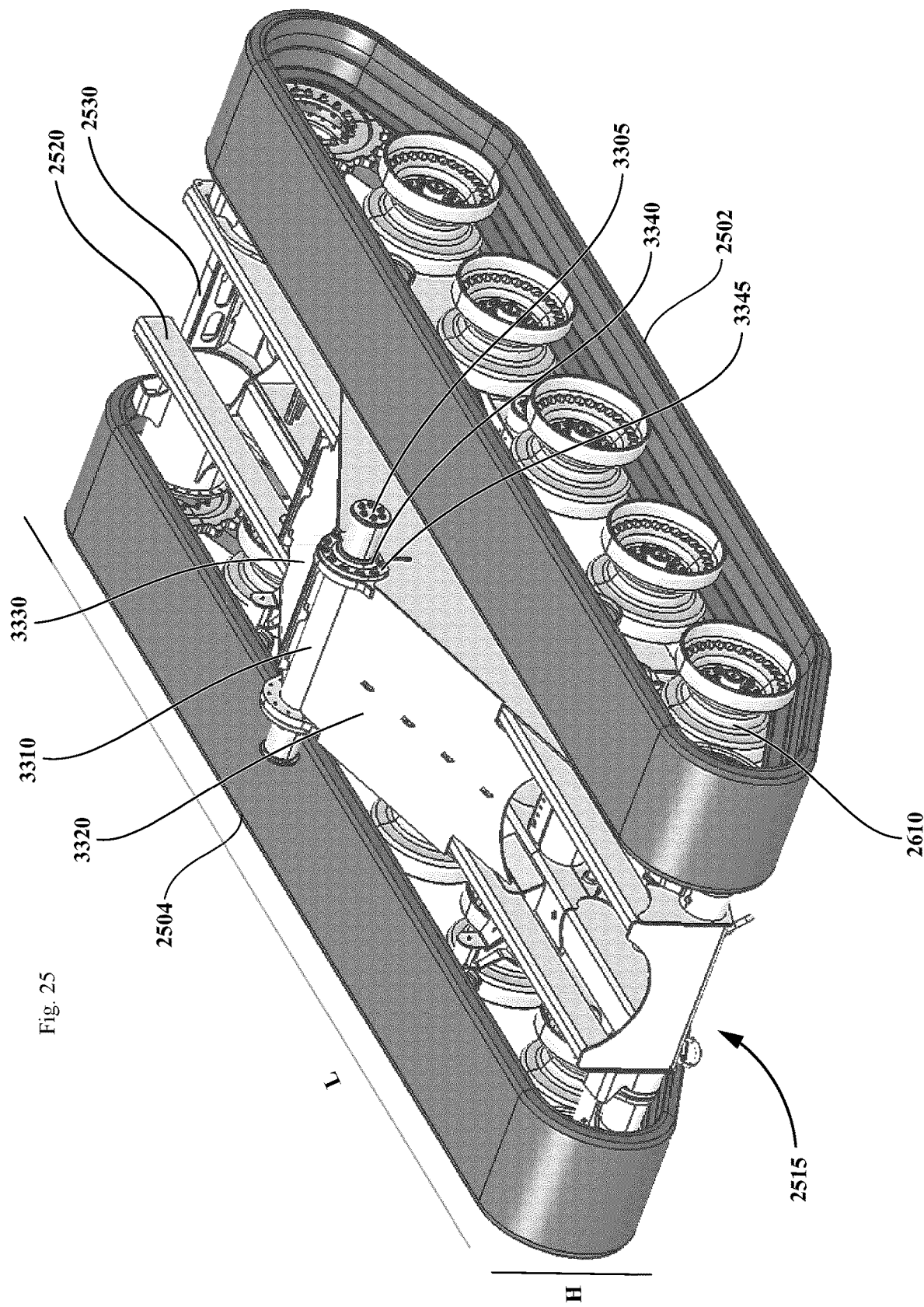
FIG. 25 is a perspective view of the frame of the trailer, with the platform removed, according to an example non-limiting embodiment.
Figure 26:
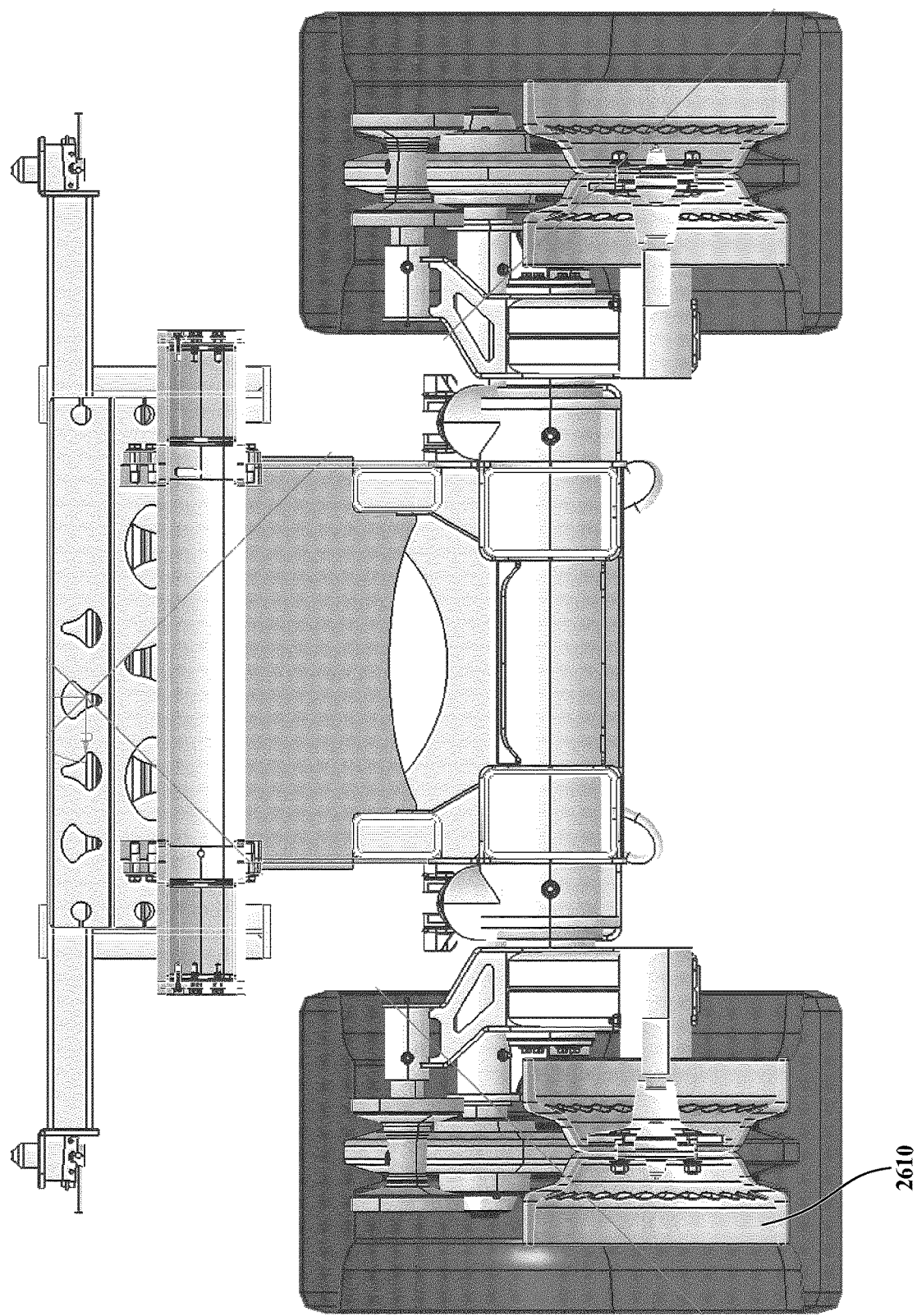
FIGS. 26 and 27 are cross-sectional and front elevational views of the frame of the trailer, according to an example non-limiting embodiment.
Figure 27:
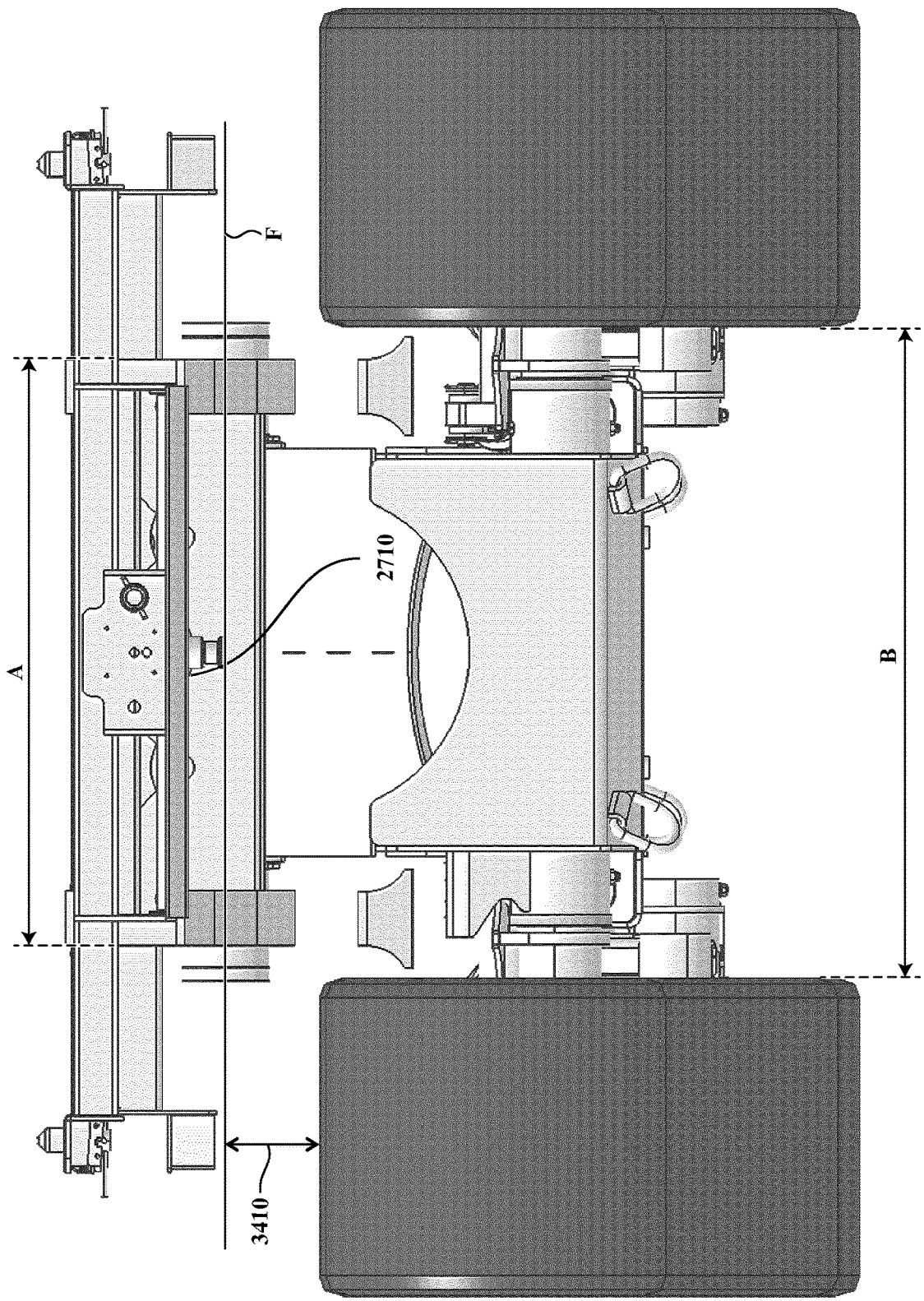

The left track assembly 2502 will now be described with reference to FIG. 31, with the understanding that an analogous description applies to the right track assembly 2504. The left track assembly 2502 comprises a plurality of wheels 3100 and an endless track 1100 that surrounds the wheels 3100. The endless track 1100 engages the ground to provide traction. A longitudinal direction of the track assembly 2502 is generally parallel to the longitudinal direction of the trailer 20. The track assembly also has transversal directions, including a widthwise direction (W) which is generally parallel to the widthwise direction of the trailer 20 (W), and a height direction (H) which is generally parallel to the height direction of the trailer 20 (as shown in FIG. 25).

The wheels 3100 include a drive wheel 3102, an idler wheel 3104, a plurality of intermediate (or support) wheels 3106 and a plurality of top rollers 3108, which are optional.

The trailer 20 comprises a hydrostatic drive system with oil pressure supplied by the main vehicle 10 to hydraulic motors on the trailer 20 (similar to hydraulic motor 1030) via interconnections. Couplers (e.g., quick couplers) may enable connection of hydraulic hoses and electrical cables between the main vehicle 10 and the trailer 20 and also with a self-loading crane 4500 (if present). The couplers for supplying power to the trailer may be located at the front of the trailer 20, whereas the couplers for supplying power to the crane 4500 that may be present may be located at the rear of the trailer 20.

By virtue of the interconnection between the trailer 20 and the main vehicle 10, the drive wheel 3102 is in a driven relationship with the prime mover 508 to impart movement of the endless track 1100 in order to propel the trailer 20 on the ground. The drive wheel 3102 is rotatable about an axis of rotation which is transverse to the longitudinal direction of the trailer 20 by power derived from the prime mover 508 to impart movement of the endless track 1100. In this embodiment, the drive wheel 3102 comprises a sprocket 1040 that has teeth for engaging drive openings in the track 1100; thus, movement of the sprocket 1040 causes movement of the track 1100. The drive wheel 3102 may be configured in various other ways in other embodiments.

The idler wheel 3104 does not convert power derived from the prime mover 508 to motive force for movement of the endless track 1100, but rather guides the endless track 1100 and maintains it under tension as it is driven by the drive wheel 3102. The idler wheel 3104 is rotatable about an axis of rotation which is transverse to the longitudinal direction of the trailer 20. In this embodiment, the idler wheel 3104, may comprise a sprocket 1040 or any other type of wheel that engages the endless track 1100.

Although in the illustrated embodiment, the drive wheel 3102 is located towards the rear of the track assembly 2502 and the idler wheel 3104 is located towards the front of the track assembly 2502, the opposite configuration may be adopted in other embodiments.

The support wheels 3106 are arranged in an in-line configuration extending along the longitudinal direction (L) of trailer 20 and apply pressure onto the ground through a bottom run of the endless track 1100 as the trailer 20 moves on the ground. The support wheels 3106 do not convert power derived from the prime mover 508 to motive force for movement of the endless track 1100, but rather support and distribute onto the ground via the endless track 1100 the portion of the weight of the trailer 20 that is supported by the track assembly 2502. The support wheels 3106 may also maintain the shape and position of the endless track 1100, as well as keep the track generally aligned with the general direction of vehicular movement.

The support wheels 3106 are carried by a plurality of wheel-carrying assemblies 3110, 3120 of the track assembly 2502. Each of the wheel-carrying assemblies, which may be referred to as "bogies", carries at least two of the support wheels 3106. In the present embodiment, there are five support wheels 3106, two of which are connected in tandem to a first wheel-carrying assembly 3110 that pivots around a pivot point 3112. The other three support wheels 3106 are connected in a Tridem™ configuration, whereby the three wheels are inline and connected to a second wheel-carrying assembly 3120 that pivots around a pivot point 3122 and has its own pivot point 3124 for two of the three wheels. For additional details about the wheel carrying assemblies and the manner in which they carry the support wheels 3106, reference may be made to U.S. Pat. No. 8,607,903, hereby incorporated by reference herein. Of course, there is no particular limit on the number of support wheels that may be used, or in the manner in which they are grouped.

The support wheels 3106 may be metallic and may define a hollow internal space referred to as a guiding space 2610 for receiving a wheel guide 1110 of the endless track 1100 to guide the endless track 1100 as it moves around the wheels. In some embodiments, this guiding space 2610 may also receive part of the outer surface of the drive wheel 3102 and/or of the idler wheel 3104, so that there may be overlap between one of the support wheels 3106 and the drive wheel 3102 or the idler wheel 3104 in the longitudinal direction of the trailer 20. In some embodiments, the support wheels 3106 may be made of rubber and be devoid of a guiding space 2610.

The track is an endless track 1100 having an inner side 1120 and an outer side 1140, as has been previously described. The top rollers 3108 are configured to guide the track 1100 and prevent it from sagging to a point where de-tracking may occur. The idler wheel 3104 also guides the track and is movable by a piston so as to apply a varying degree of tension to the track.

(iii) Connector/Kingpin

The platform 2410 includes a connector 2710 for connecting to the articulated trailer connector 512 on the main vehicle, thereby forming a pivotable connection. For example, the connector 2710 may be embodied as a kingpin that connects to the fifth wheel hitch 2310 of the main vehicle 10, making the fifth wheel hitch 2310 an articulated connecting point between the main vehicle 10 and the trailer 20. The kingpin 2710 may be engaged or disengaged by the lock/unlock lever of the fifth wheel hitch 2310. Alternatively, other pivotable connections, such as a gooseneck hitch, may be used instead of the fifth wheel hitch 2310/kingpin 2710 combination.

(iv) Platform

Figure 32:
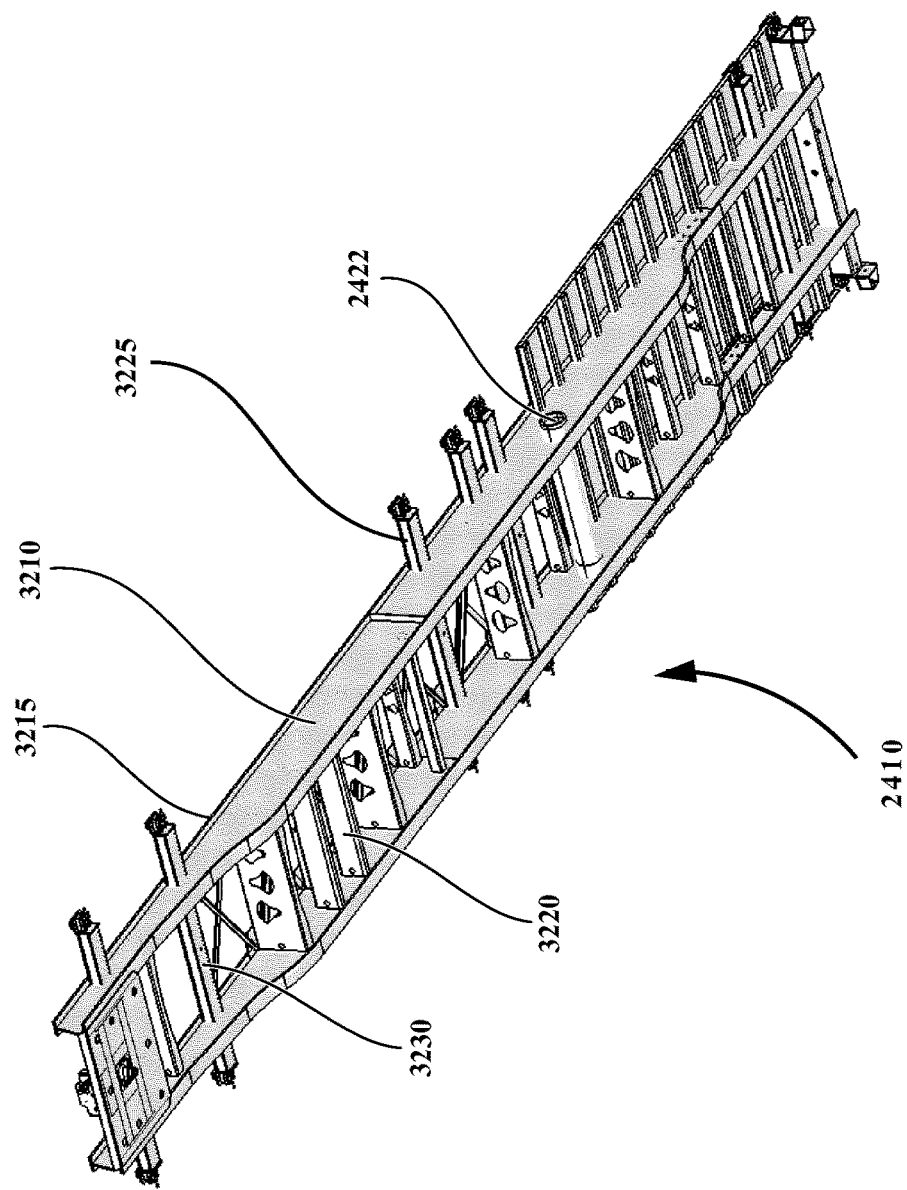
FIG. 32 is a perspective view of the structure of the platform mountable to the frame of the trailer by a second pivotable connection, according to an example non-limiting embodiment.
Figure 33:
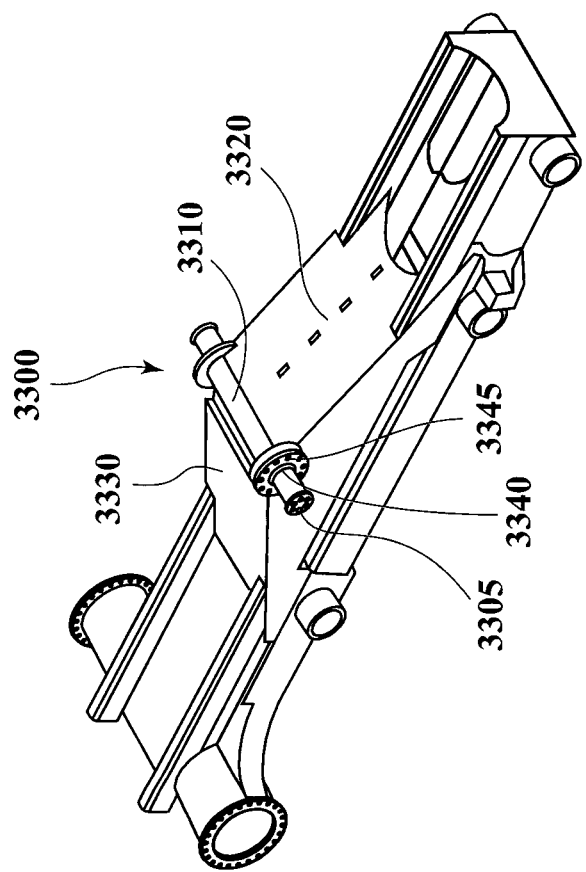
FIG. 33 is a perspective image showing the portion of the frame of the trailed used to create the second pivotable connection via which the platform is mounted to the trailer, according to an example non-limiting embodiment.
Figure 36:
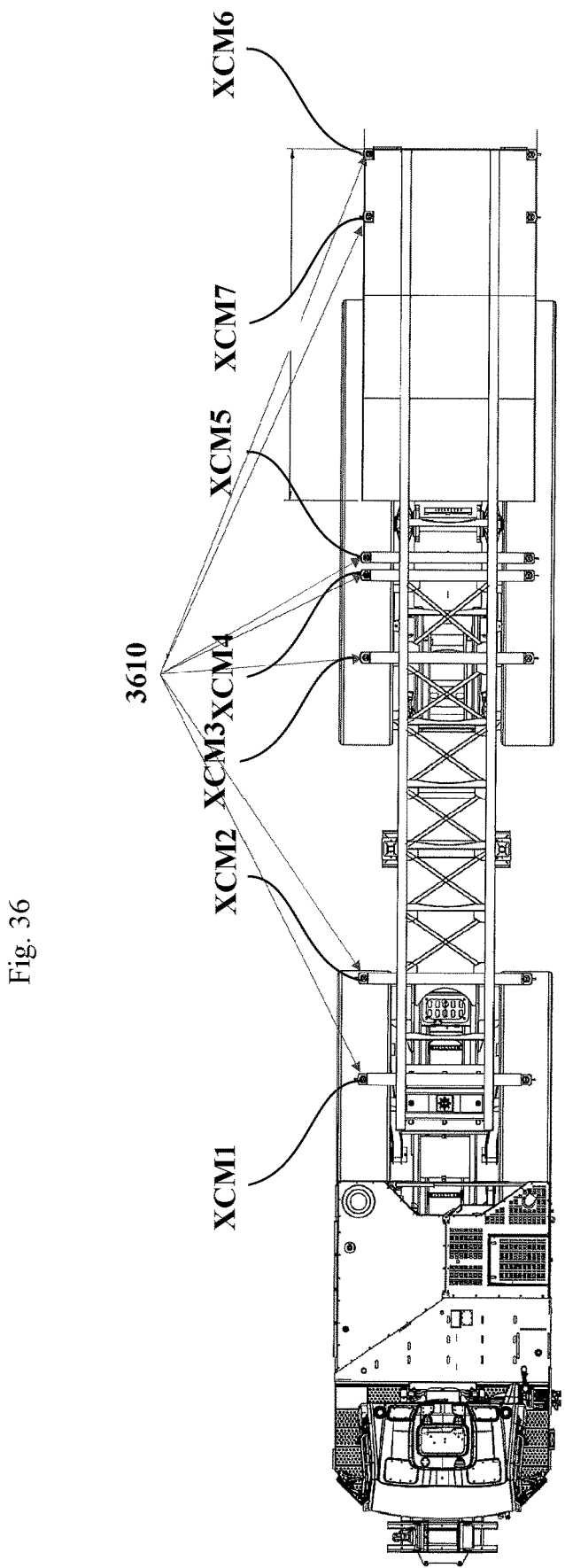
FIG. 36 is a top view of a tracked vehicle arrangement including the platform having extended cross-members with locking members, according to an example non-limiting embodiment.

With reference to FIGS. 32 and 36, in a non-limiting embodiment, the platform 2410 may comprise a pair of parallel beams 3210 (e.g., H-beams, I-beams, C-beams, U-beams, hollow beams, full beams) extending along a longitudinal direction of the trailer 20 and a plurality of transverse cross-members 3220 connecting the beams and extending in a direction transverse to the longitudinal direction of the trailer 20, i.e., in the widthwise direction. A plurality of braces 3230 that cross one another may also connect to the two beams to provide additional structural integrity to the platform 2410. The braces 3230 may be disposed at different points along the platform 2410 in the longitudinal direction (L).

The beams of the platform 2410 are separated along the widthwise direction (from the exterior surface of one beam to another) by a distance A that is less than the distance B in the widthwise direction from the interior surfaces of the two tracks 1100 on either side of the trailer 20. This may allow certain advantages that will be described later.

The platform 2410 may comprise landing gear 3810, which is configured to be retractable. The landing gear 3810 comprises a pair of retractable legs 3815 that support a front portion of the trailer 20 when it is not attached to the main vehicle 10. The retractable legs 3815 are to be raised and retracted before the trailer 20 is moved by the main vehicle 10.

The platform 2410 is mounted to the frame 2400 of the trailer 20 by another pivotable connection 3310. In the illustrated non-limiting embodiment, the pivotable connection 3310 takes on the form of a transverse (widthwise) axle 3305 that interconnects the frame 2400 of the trailer 20 and the platform 2410. As such, the pivotable connection 3310 enables pivoting of the platform 2410 about a horizontal axis F (see FIG. 27) that is transverse to the direction of travel of the trailer 20. More specifically, the axle 3305 passes through a support member 3300 mounted to the frame 2400 of the trailer 20 (e.g., mounted to the beams and/or the frame lower portion 2515). In the illustrated non-limiting embodiment, the support member 3300 is generally a triangular prism with a sloped front surface 3320, a sloped rear surface 3330 and an apex 3340 that accommodates the axle 3305. As for the platform 2410, it includes apertures 2422 in the side rails 2420 that provide a bushing 3345 for the axle 3305. As such, the platform 2410, when mounted to the support member 3300 via the axle 3305, is configured to pivot about the axle 3305 and therefore about the apex 3340 of the support member 3300.

Figure 34:
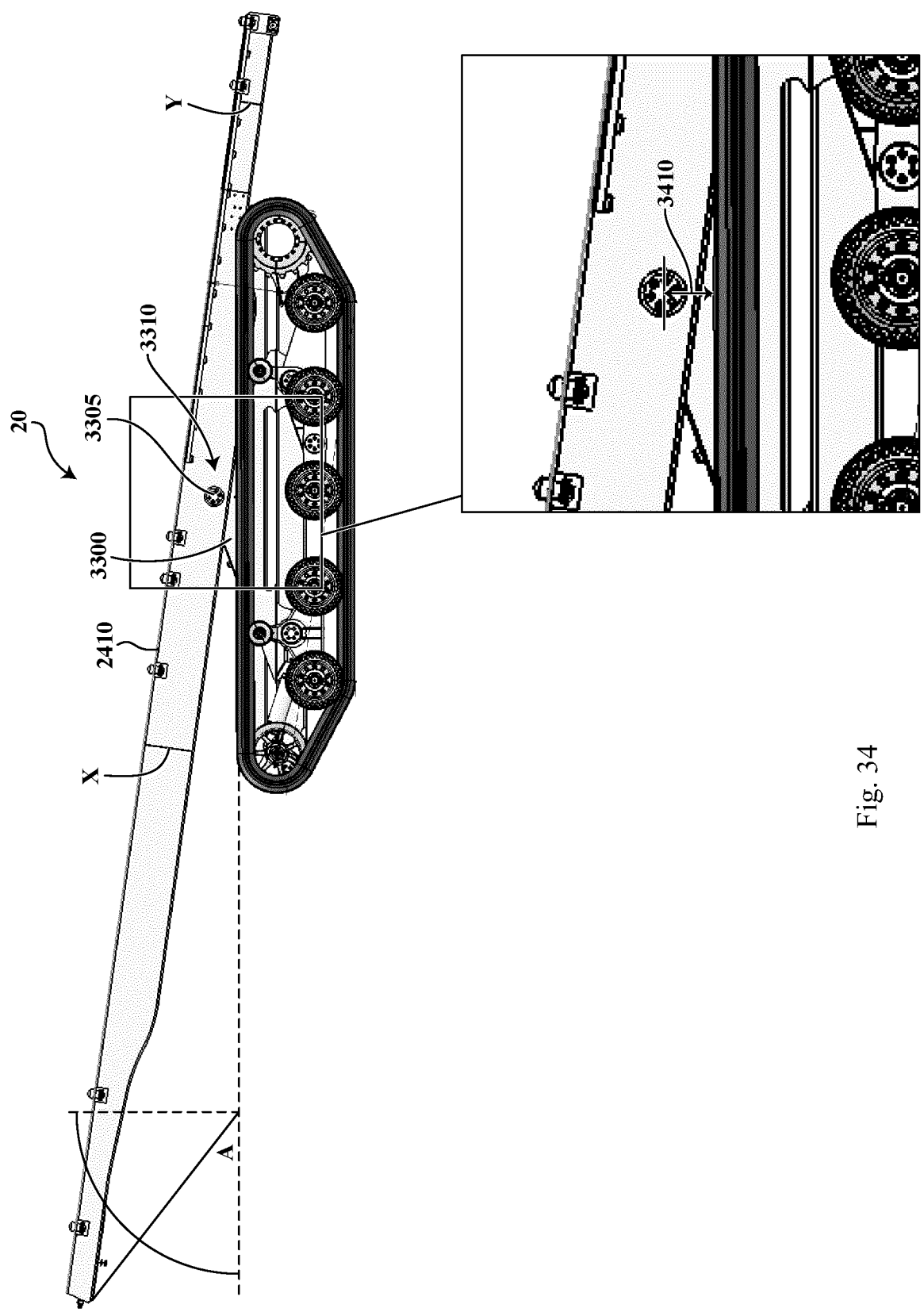
FIGS. 34 and 35 are side views of the trailer with the platform showing of the angular range of backwards and forwards pivoting of the platform by way of the second pivotable connection.
Figure 35:
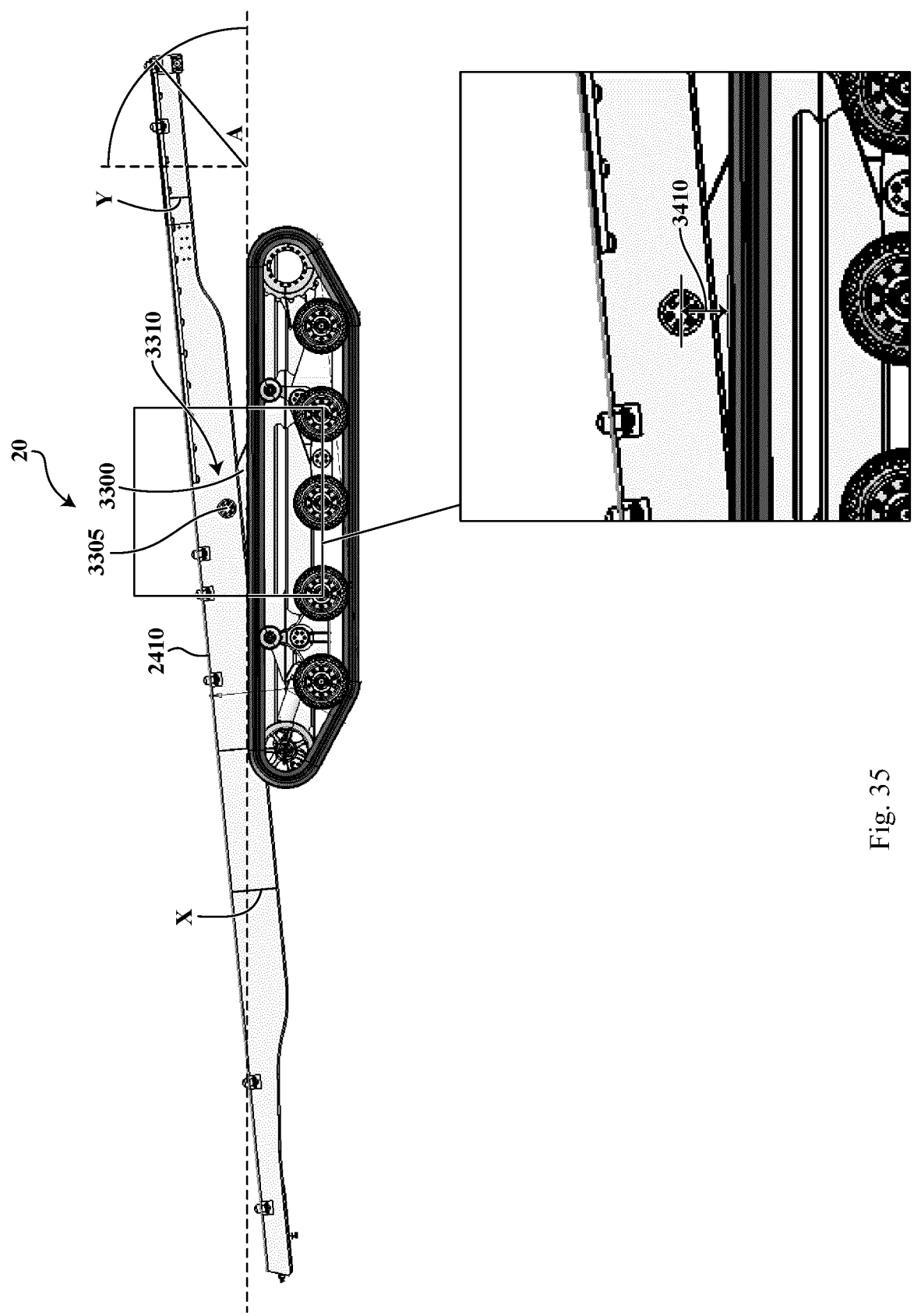

In the present embodiment, and as shown in particular in FIGS. 34-35, the center of the axle 3305 of the pivotable connection 3310 is mounted at a height level 3410 above the top surface 1140 (i.e. outer side) of the tracks 1100. In non-limiting embodiments, this added height level 3410 may range from 1 cm to 100 cm and may be governed by stability considerations. Additionally, it is noted that the top surface 3215 of the rails 3210 of the frame 2400 of the trailer 20 may be below the top surface of the tracks 1100. In any event, the axle 3305 is further from the ground than the top surface of the rails of the frame 2400 to which it is mounted. This provides a certain allowed "swing" (angular range of "backwards" (FIG. 34) and "forwards" pivoting (FIG. 35)

about the axle 3305) before the platform 2410 is at risk of contacting the rails of the frame 2400 of the trailer 20. The fact that the platform 2410 is narrower, in a widthwise direction, than the spacing between the left and right tracks 1100 allows the platform 2410 to avoid contacting the tracks when swinging.

In other embodiments, the pivotable connection 3310 (e.g., the axle 3305) may be mounted at a height level at or below the top surface of the tracks 1100, which may still enable swing although to a reduced degree than if the pivotable connection 3310 were mounted at a height level above the top surface of the tracks as previously described.

The transverse cross members include a plurality of short cross-members 3220 that terminate at the beams of the platform 2410 and a plurality of extended cross-members 3225 that extend past the beams in the widthwise direction. The extremities of the extended cross-members 3225 include locking members 3610. It is noted that he extended cross-members 3225 are wider than the interior width between the left and right tracks. As such to allow the desired swinging range without the extended cross-members interfering with the tracks, the extended cross-members 3225 width are constrained to be extended past the interior edge of the tracks.

Figure 37:
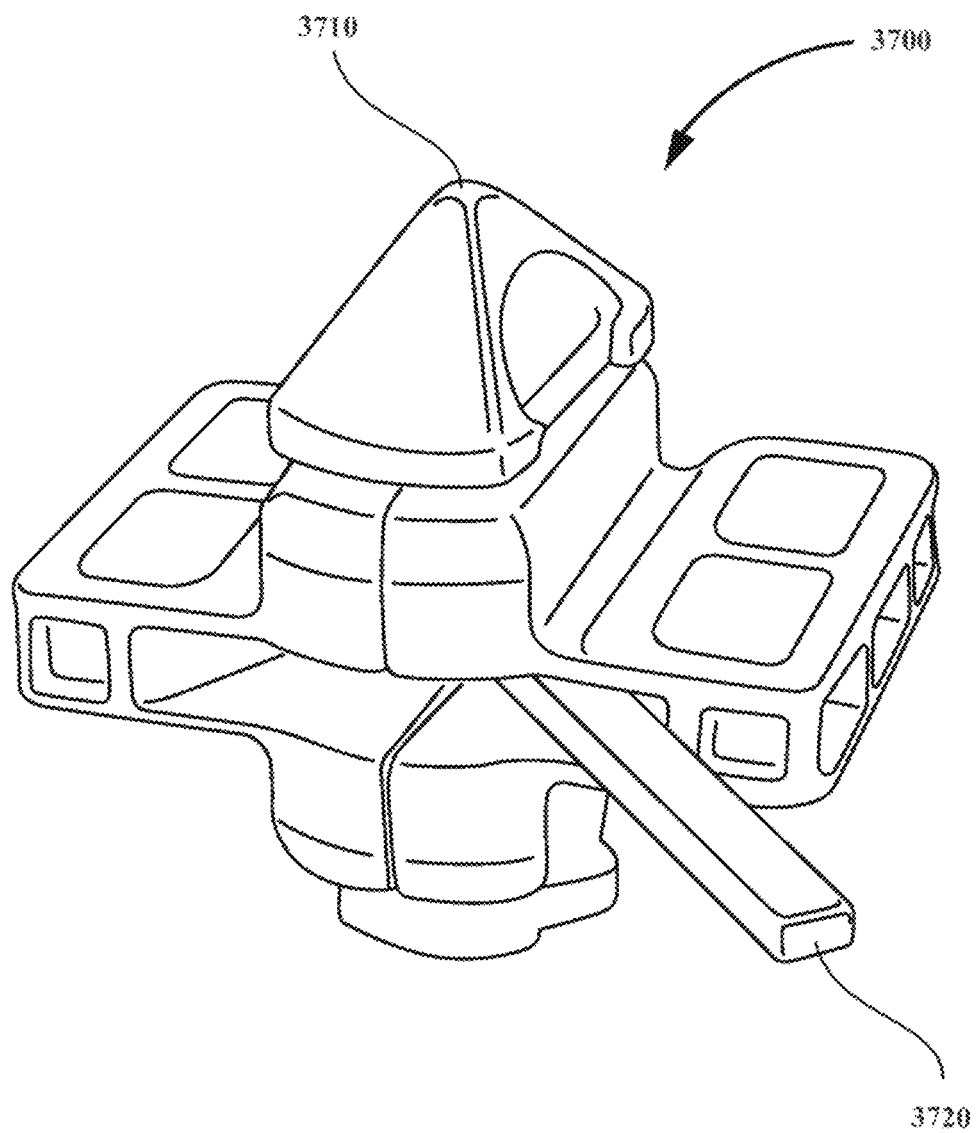
FIG. 37 is a perspective view showing a locking member embodied as a twist-lock connector, according to an example non-limiting embodiment.

As mentioned above, the extremities of the extended cross-members 3225 include locking members 3610. The locking members 3610 comprise a connector that projects upwardly and is configured to engage with a complementary connector inside a container post. An example of a suitable locking mechanism is known in the art as a "twist lock", as shown in FIG. 37. The twist lock 3700 incudes a pivotable head 3710 and a locking lever 3720 that turns the pivotable head 3710 by a quarter turn to enter into a slot 4530 inside the container post, thereby to hold the container (3800 or 3900) solidly in place during transport. The twist lock 3700 is merely one example of a locking mechanism; other mechanisms that have been devised over the years can be used instead or in addition.

Figure 38:
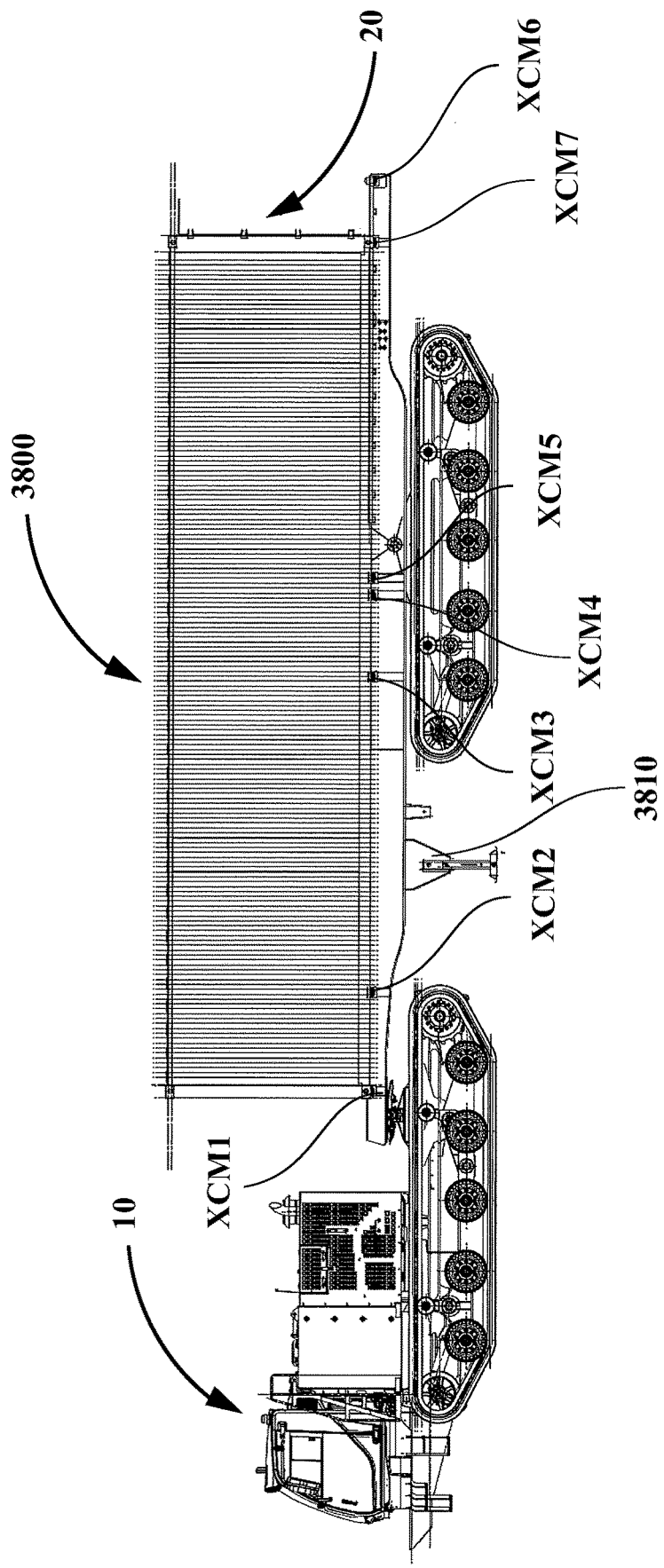
FIGS. 38 to 40 are side views of the vehicle arrangement showing three respective container configurations according to various example non-limiting embodiments.
Figure 39:
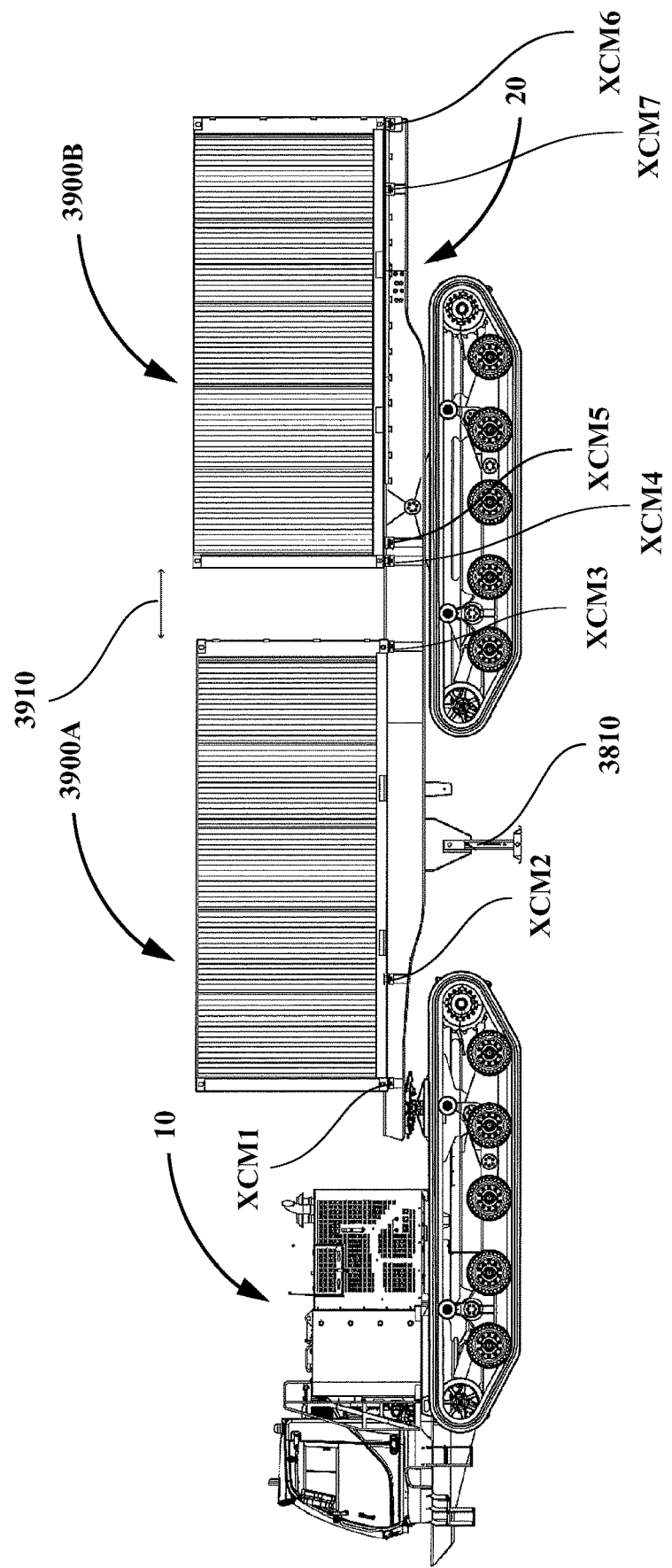
Figure 40:
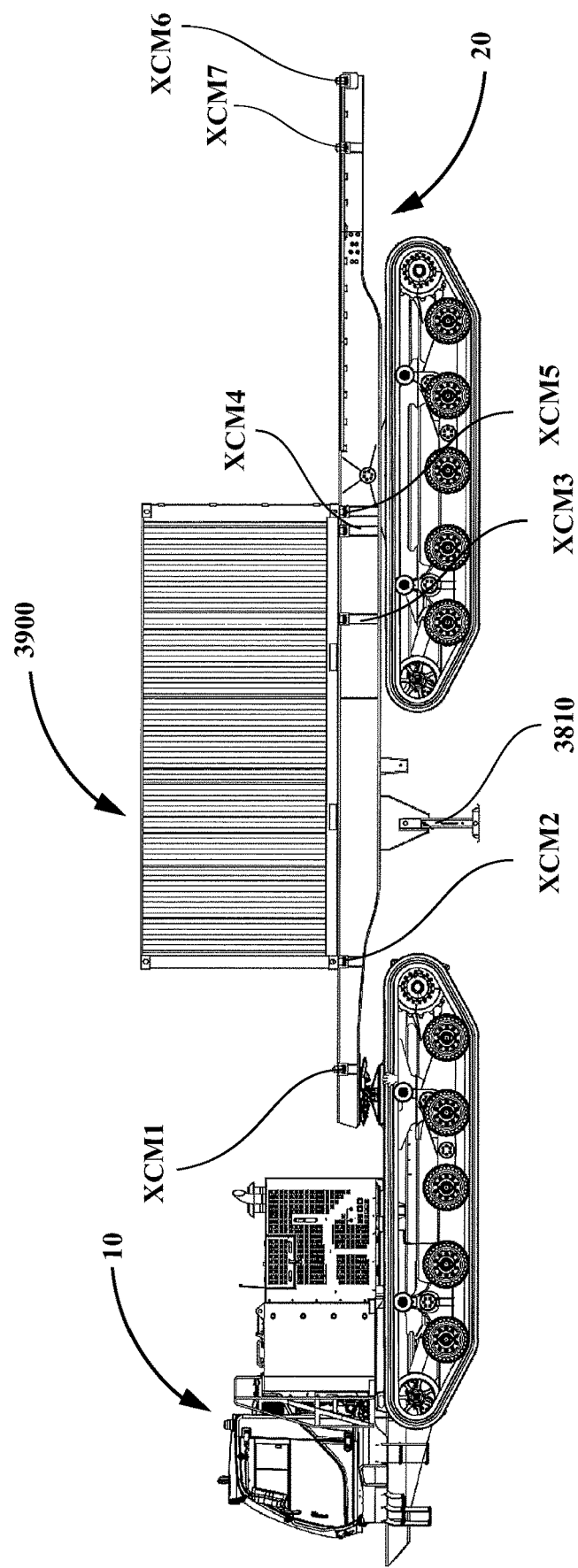

A certain number of extended cross-members 3225 (each supporting a pair of locking members) are strategically positioned along the length of the platform 2410. In the illustrated embodiment, there are seven extended cross-members to support at least three container configurations (as shown in FIGS. 38-40). The three container configurations assist in load balancing to even out the ground pressure of the front and rear tracks. As shown in FIG. 38, two extended cross-members 3225, namely XCM1 and XCM7, are positioned on the platform 2410 to engage the corners of a 40-foot container 3800; this is referred to as a first container configuration. Cross-member XCM1 is located near a front extremity of the platform 2410 and cross-member XCM7 is located towards a rear of the platform but is not the rearmost extended cross-member. As shown in FIG. 39, four (4) extended cross-members 3225, namely XCM1, XCM3, XCM4 and XCM6, are positioned to engage the corners of two 20-foot containers 3900A, 3900B, in a second container configuration. It is noted that there is a gap 3910 between the two containers 3900A, 3900B. The gap 3910 is present in order to allow an external (e.g., grounded) crane's arm to reach between the two 20-foot containers 3900 and unload one of the two containers 3900A, 3900B from the platform 2410. As such, the gap 3910 may measure anywhere from 100 mm to 1,000 mm in length, for example, although other dimensions are possible. Finally, in a third container configuration shown in FIG. 40, two (2) extended cross-members 3225, namely XCM2 and XCM5, are used for engaging the corners of a single 20-foot container 3900 when no other 20-foot container is present. It will be noted that in this third container configuration, the single container 3900 is located less towards the front of the trailer 20 than the front container 3900A in the second container configuration, as this improves the load balancing and stability of the resulting vehicle arrangement 1, also taking into account the counter-balance provided by the cab 506 of the main vehicle 10, which is in located generally ahead of the track assemblies 102, 104.

As such, there is a total of fourteen (14) locking members 3610 attached to the frame 2400 of the trailer 20 via seven (7) 7 extended cross-members 3225 to accommodate the three container configurations (one such extended cross-member, namely XCM 1, being reused in two of these three configurations). Of course, those skilled in the art will appreciate that a "20-foot" container is used merely as an example due to its standard size and that different-sized containers, e.g., shipping containers, may be supported in different embodiments. Also, there may be more than three container configurations supported by the arrangement of extended cross-members 3225, and there may be more than 7 cross-members. Also, in other embodiments, the locking mechanism may differ so as to be different from the illustrated twist-lock mechanism.

For example, there may be 8, 10, 20 or even more extended cross-members staggered in the longitudinal direction so as to allow an arbitrary positioning of a container, where the positioning could result in a different weight distribution depending on the total weight of the container (and its contents) and the weight and size of any additional load to be carried in addition to the container (e.g., on a platform behind the container). The average linear density of extended cross-members across the entire length of the platform may be from 7 XCMs per 13.7 m (which is in this case the example length of the platform) to 20 XCMs per 13.7 m or higher.

(v) Pulling Connection

Figure 3:
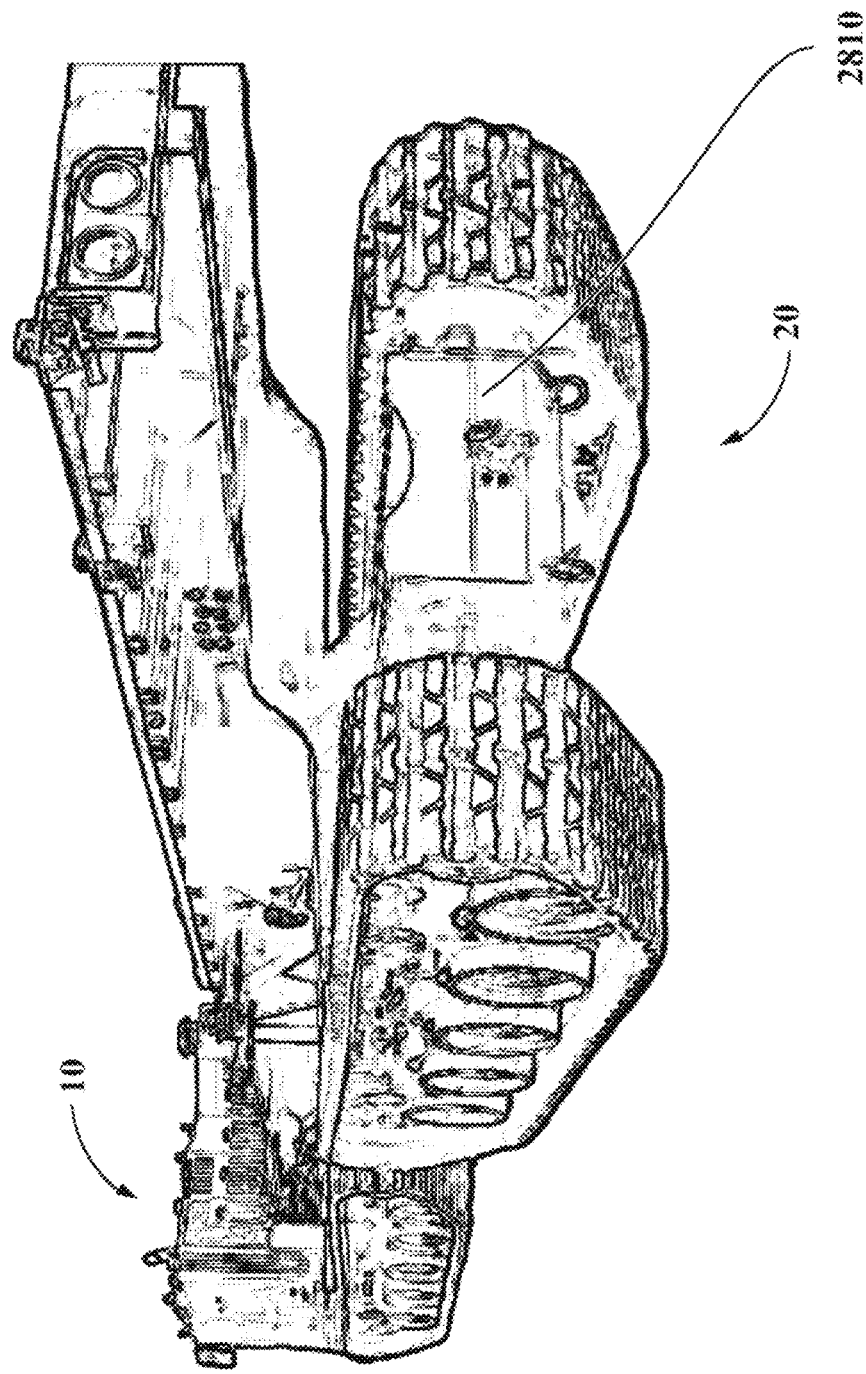
Figure 4:
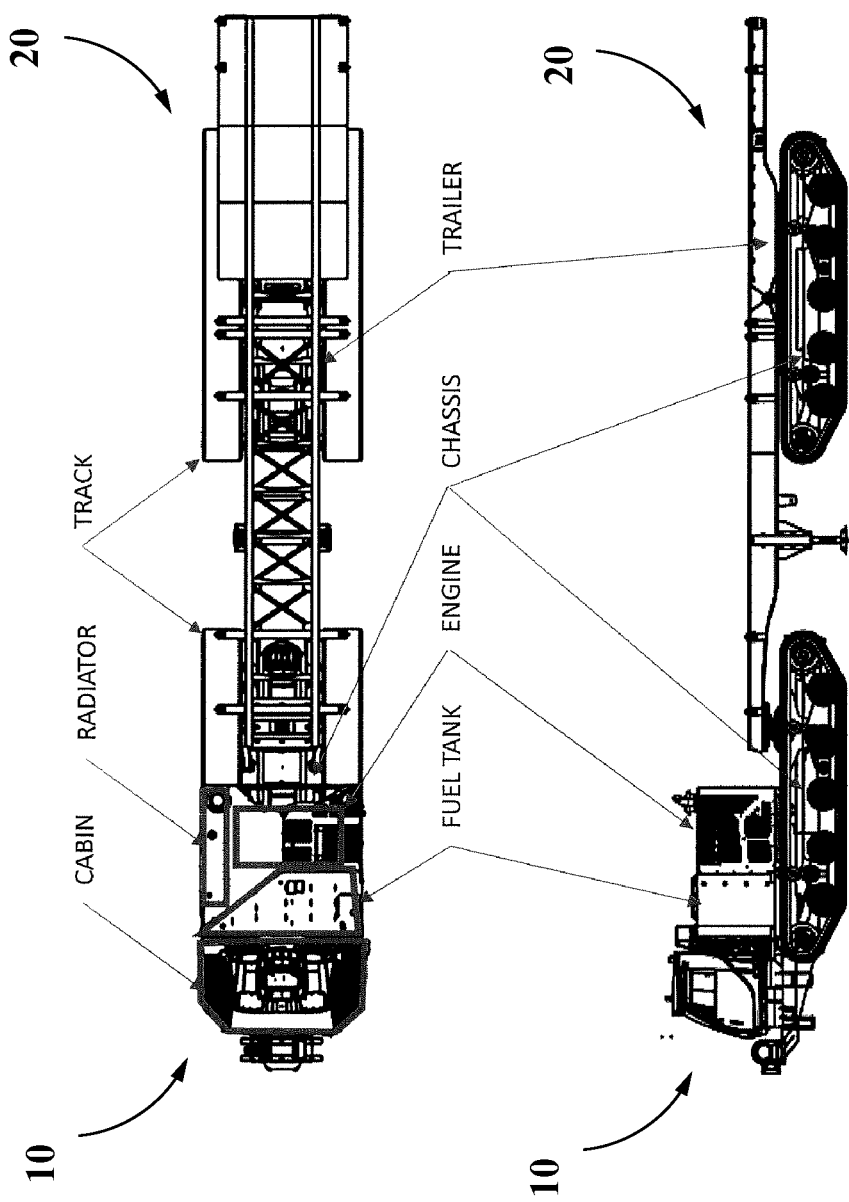
FIG. 4 shows additional top and side views of a tracked vehicle arrangement, according to an example non-limiting embodiment.
Figure 28:
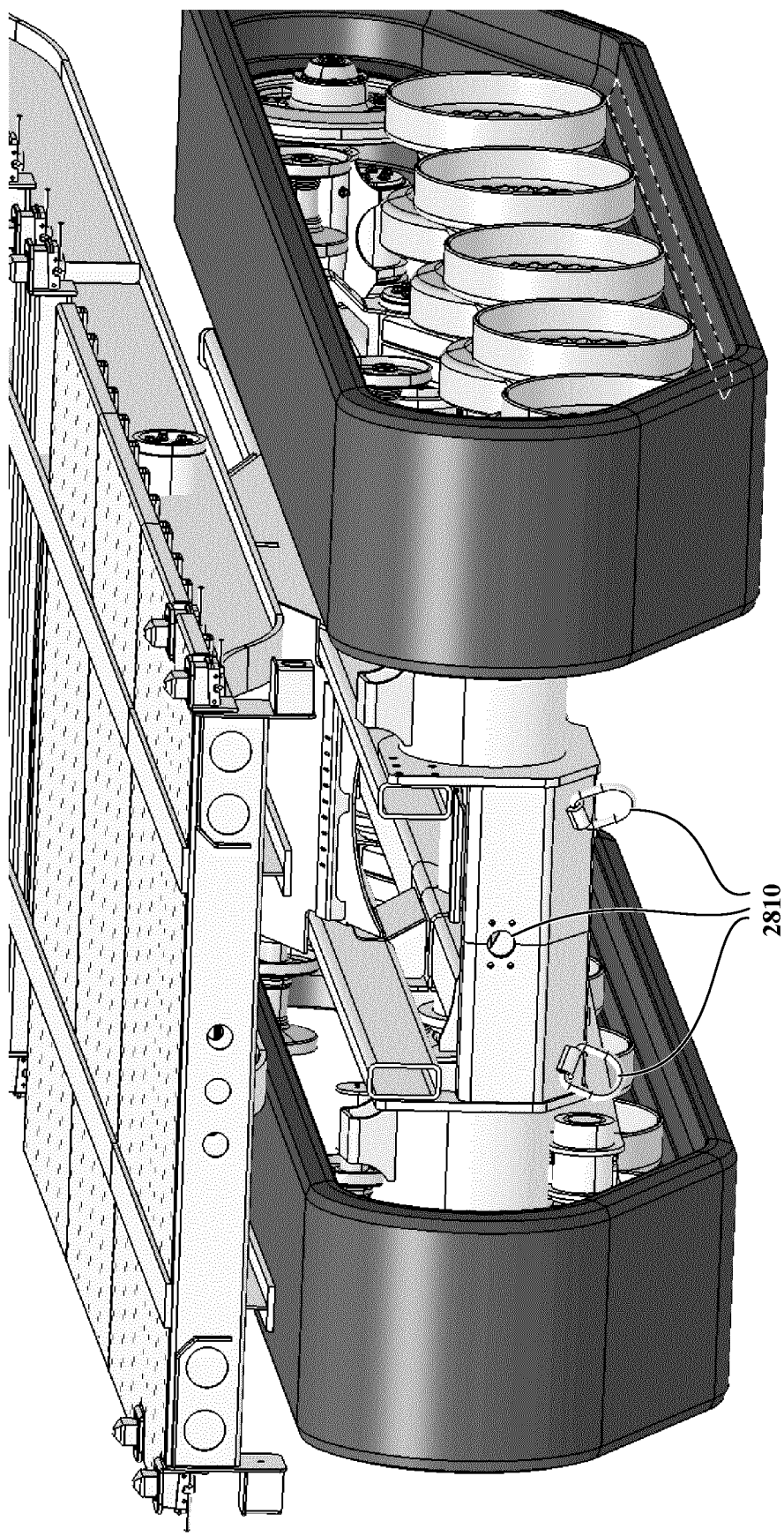
FIGS. 28 and 29 are rear and front perspective views of the frame of the trailer, according to an example non-limiting embodiment.
Figure 29:
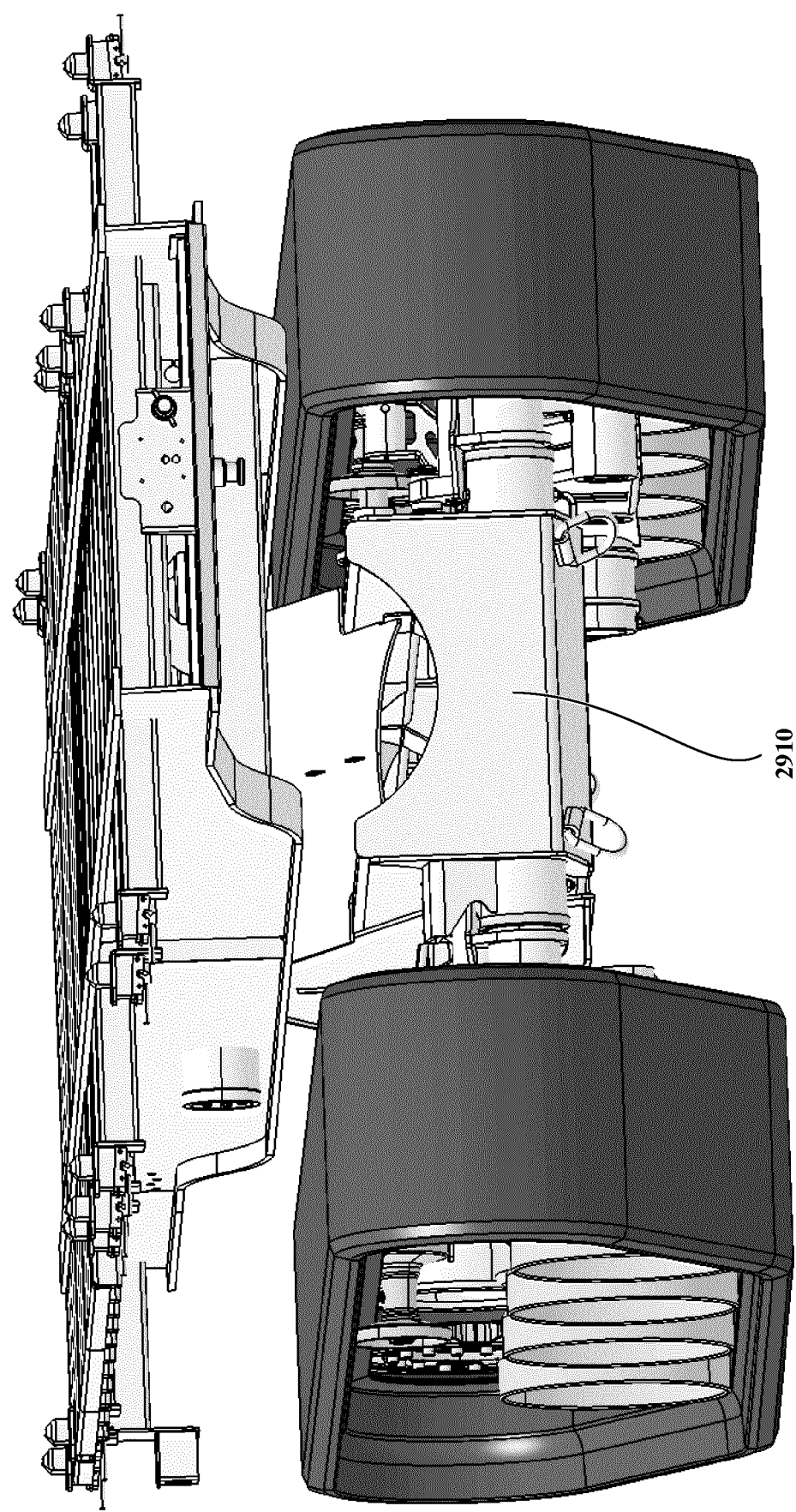
Figure 30:
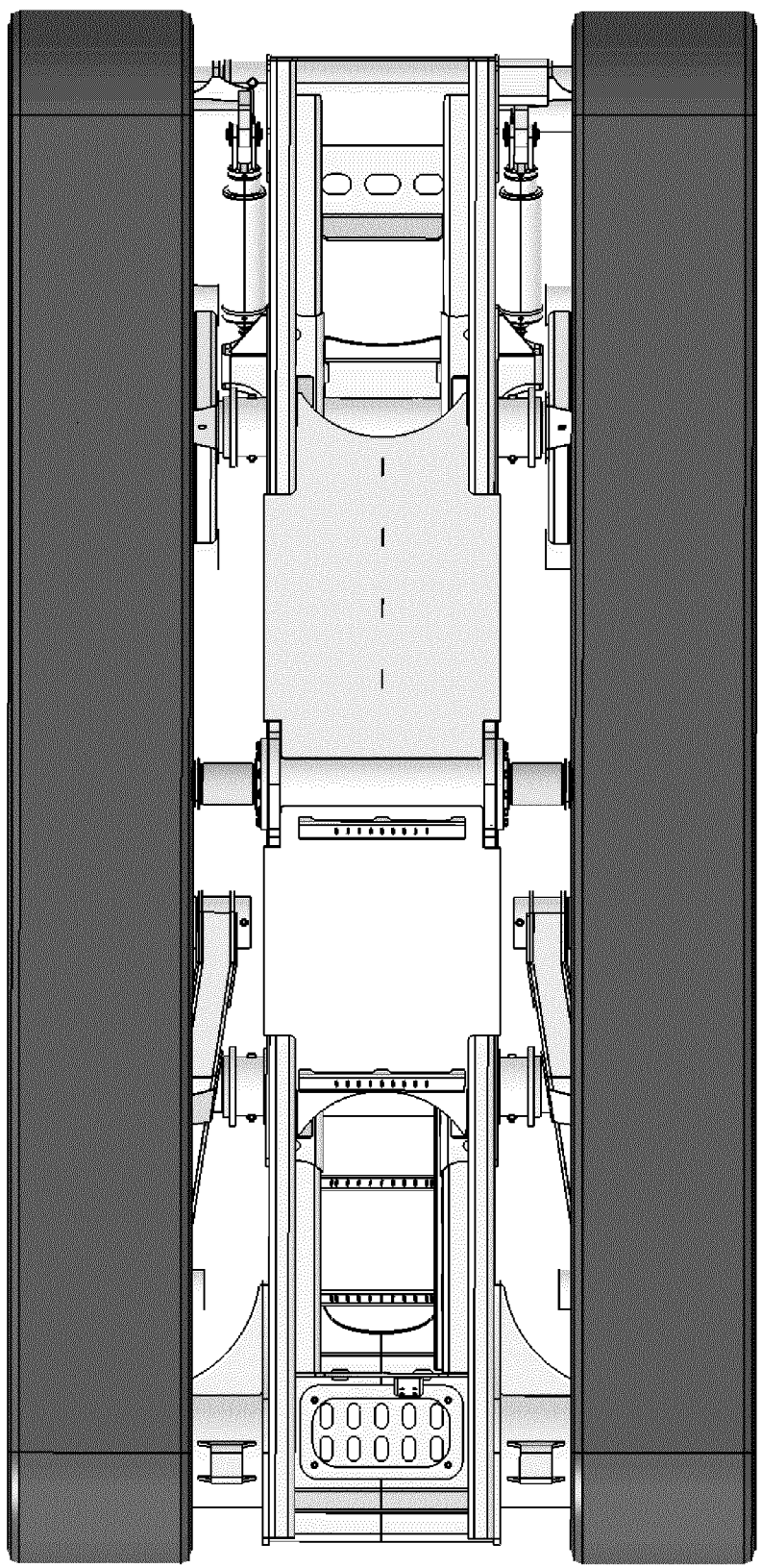
FIG. 30 is a plan view of the trailer, including its track assemblies but without the platform, according to an example non-limiting embodiment.
Figure 31:
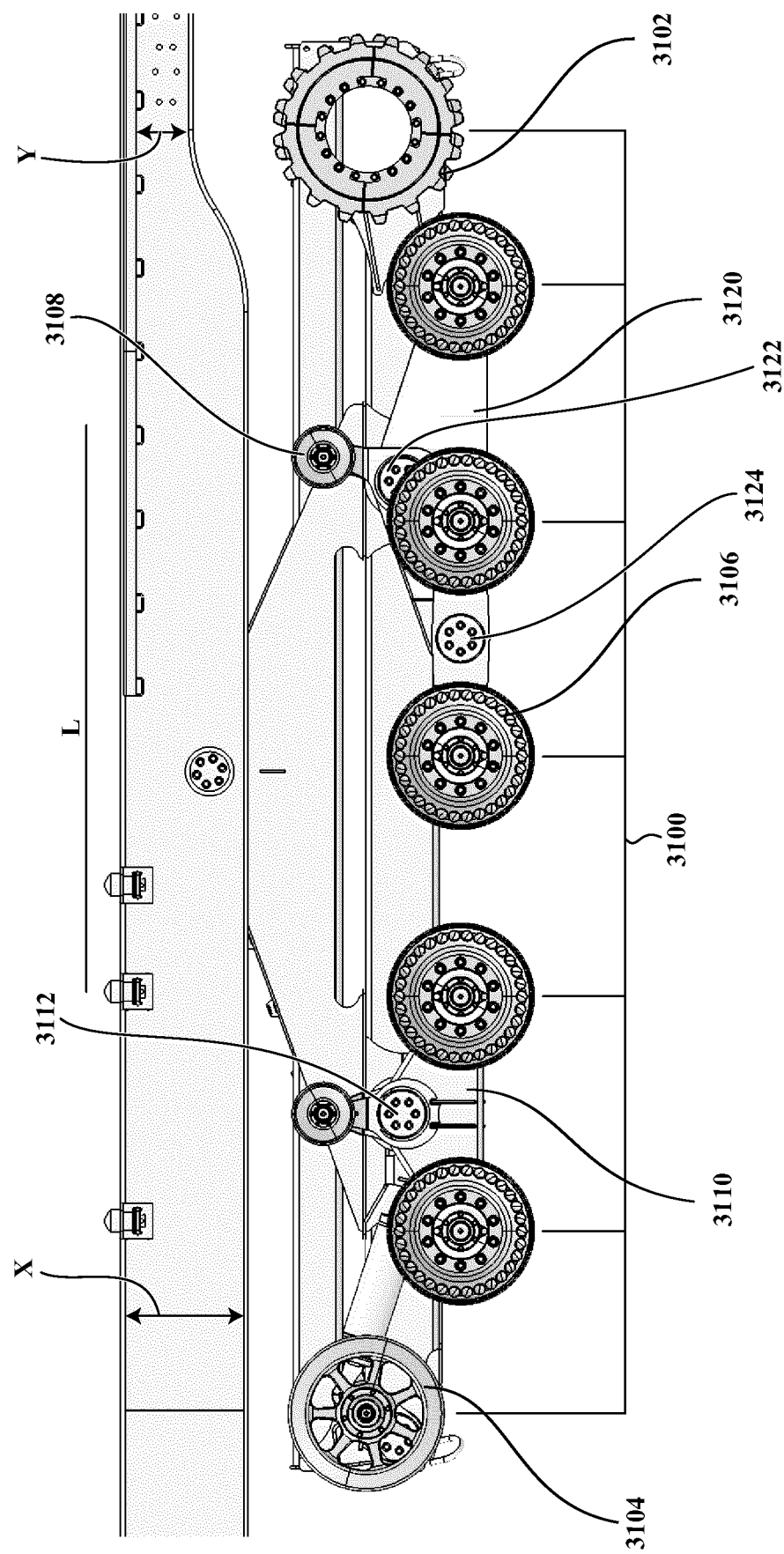
FIG. 31 is a right side elevational view of the trailer with the platform assembled but the track of the track assembly removed to better show a plurality of wheels of the track assembly, according to an example non-limiting embodiment.

With reference now to FIGS. 3, 28 and 31 (and also in FIG. 6 if the frame 2400 were that of the trailer 20), the pulling connection 2810 may allow the trailer 20 to pull a towed unit, such as a sled 210, on which a load may be placed. It is noted that the sled 210 may be used to carry lighter loads while heavier loads may be placed on the trailer 20. The pulling connection 2810 is affixed to the frame 2400 of the trailer 20 rather than to the platform 2410 at the rearmost extremity 2440 of the trailer 20. More specifically, the pulling connection 2810 is affixed to a cross-member of the frame 2400 that is generally aligned with the rearmost extremity 2440 of the track assemblies 2502, 2504 (and not the platform 2410). In particular, depending on the embodiment, the pulling connection 2810 may be installed between 1 m and 3 m closer to the front of the trailer 20 than a rearmost extremity 2440 of the trailer 20. Another way to characterize this gap in the longitudinal direction is to say that the pulling connection 2810 is located further to the front of the trailer 20 than the height difference between the top and bottom surfaces of the track assemblies.

The pulling connection 2810 may be a pintle hook, for example, although various types of hitches could be used. It is noted that the frame 2400 of the trailer 20 is located entirely below the top surface of the track assemblies, and that the pulling connection 2810 is located at a height that is approximately half way from the bottom to the top surfaces of the track assemblies. In a specific embodiment, the pulling connection 2810 appears no higher than ¾ and possibly no higher than ⅔ of the way from the bottom to the top surfaces of the track assemblies. In some cases, it may even be possible to install the pulling connection 2810 such that it appears no higher than ½ of the way from the bottom to the top surfaces of the track assemblies.

Figure 41:
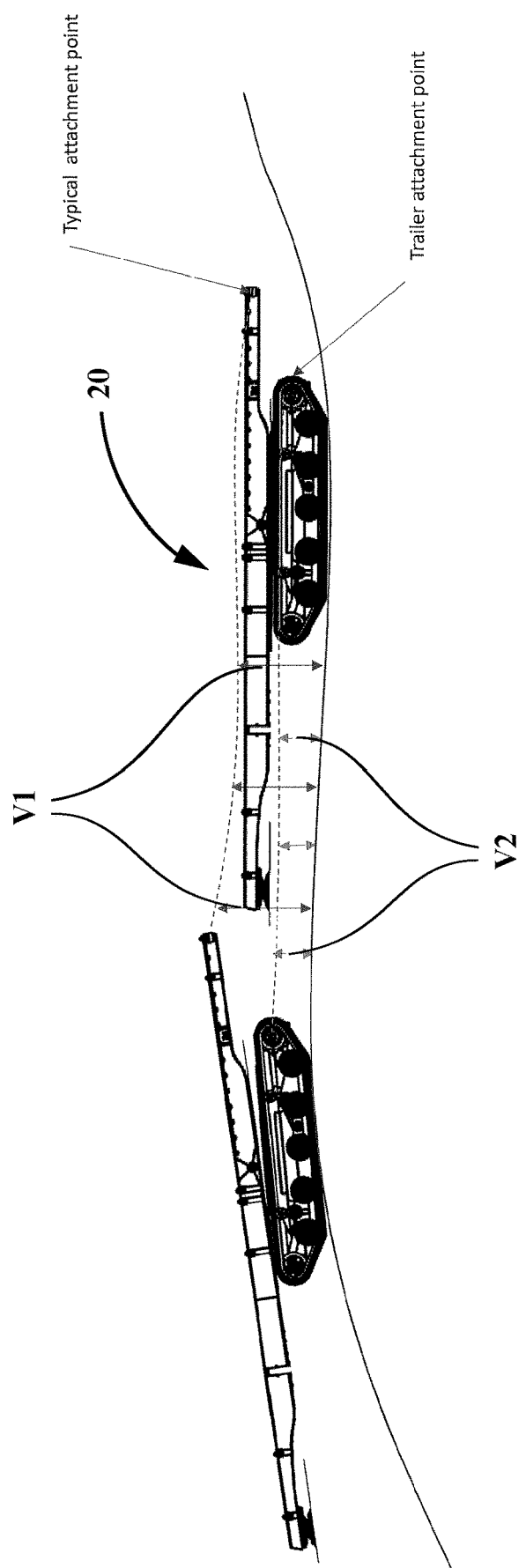
FIGS. 41 to 43 are schematic side views of particular cases in which the tracked vehicle arrangement handles altitude variations in terrain, according to various example non-limiting embodiments.

In operation, and with reference to FIG. 41, if the trailer 20 experiences altitude variations V2 in the terrain (e.g., due to rough terrain or obstacles), such variations will also be experienced by the sled 210, but further variations transferred by the trailer 20 will be mitigated doe to the relatively low-to-the-ground point of installation of the pulling connection 2810. This is in comparison to the altitude variations V1 that would arise in the case where the pulling connection 2810 is installed on the platform 2410 (e.g., at its rearmost extremity).

By mounting the pulling connection 2810 to the frame 2400 of the trailer 20 rather than on the platform 2410, this also liberates the platform 2410 for installation of an extension if necessary.

C. Connection Between Main Vehicle and Trailer

Consider now the scenario where the trailer 20, with or without a load, is free standing, with the landing gear 3810 extended and supporting part of the weight of the trailer 20. The trailer 20 can then be connected to the main vehicle 10 by following a process such as:

Tilting the ramps of the fifth wheel hitch 2310 downward;
Pulling the release handle of the fifth wheel hitch 2310 completely out;
Inspecting the fifth wheel throat to ensure the locks are completely opened;
Ensuring the trailer 20 is at the correct height;
Backing up the main vehicle slowly to engage the kingpin 2710 in the fifth wheel hitch 2310;
Inspecting the throat of the fifth wheel hitch 2310 to ensure the locks are completely closed;
Raising the landing gear 3810;
Connecting the hydraulic hoses, electrical cables, etc (e.g., using "Quick couplers");
Exiting the cab 506 and inspecting the pulling connection 2818;
Visually checking that the locking mechanism of the fifth wheel hitch 2310 is closed; and
Perform a pull test;

Similarly, the trailer 20 can be disconnected from the main vehicle 10 by following a process such as:

Positioning the main vehicle 10 and the trailer 20 in straight alignment on a flat and level area;
Slowly backing the main vehicle 10 against the trailer 20 to relieve pressure on the fifth wheel locks.
Turning off the prime mover;
Retracting the landing gear 3810 up;
Disconnecting the hydraulic hoses, electrical cables, etc. This causes the brakes of the trailer 20 to be automatically applied;
Pulling the release handle on the fifth wheel hitch 2310;
Visually checking that the locking mechanism opens;
Moving the tractor about 300 mm to disengage the kingpin 2710 from the fifth wheel;
Ensuring that the trailer 20 is completely supported by the landing gear 3810; and
Slowly driving the main vehicle away from the trailer 20.

There are two modes of operation of the main vehicle 10, one without the trailer 20 ("vehicle mode") and one with the trailer 20 attached ("trailer mode"). When connecting the trailer 20 to the main vehicle 10 as described above, the mode of operation of the main vehicle 10 should be changed from "vehicle" to "trailer". This can be accomplished by following a process such as:

Setting the ignition switch to ON;
Waiting a certain amount of time (e.g., 30 seconds);
On the display of the user interface 1470, observing the appearance of the trailer indicator 1475 or setting a "trailer" parameter to ON to indicate to the on-board controller 1740 that the trailer 20 is attached;
Turning OFF the key in the ignition switch;
Restarting the prime mover; and
Ensuring that a specific icon (e.g., a "trailer" light 1475) APPEARS on the display.

In some embodiments, the operator must indicate or confirm that the trailer 20 is attached to the main vehicle 10 whereas in other embodiments, the main vehicle 10 is equipped with the capability to automatically detect whether the trailer 20 is attached and will thereby control appearance of the trailer indicator 1475 independently of operator intervention.

The fact that the platform 2410 is connected to the main vehicle 10 by a first pivotable connection (e.g., the fifth wheel hitch 2310) and to the frame 2400 of the trailer 20 by a second pivotable connection 3310 (e.g., the axle 3305) may provide certain advantages, e.g., in cases where the vehicle arrangement 1 travels over uneven terrain. For example, these connections may allow the tracks of the main vehicle 10 (i.e., the front tracks) and the tracks of the trailer 20 (i.e., the rear tracks) to attack slopes of different magnitudes or even directions (uphill vs. downhill) while staying in full contact with the ground.

Figure 42:
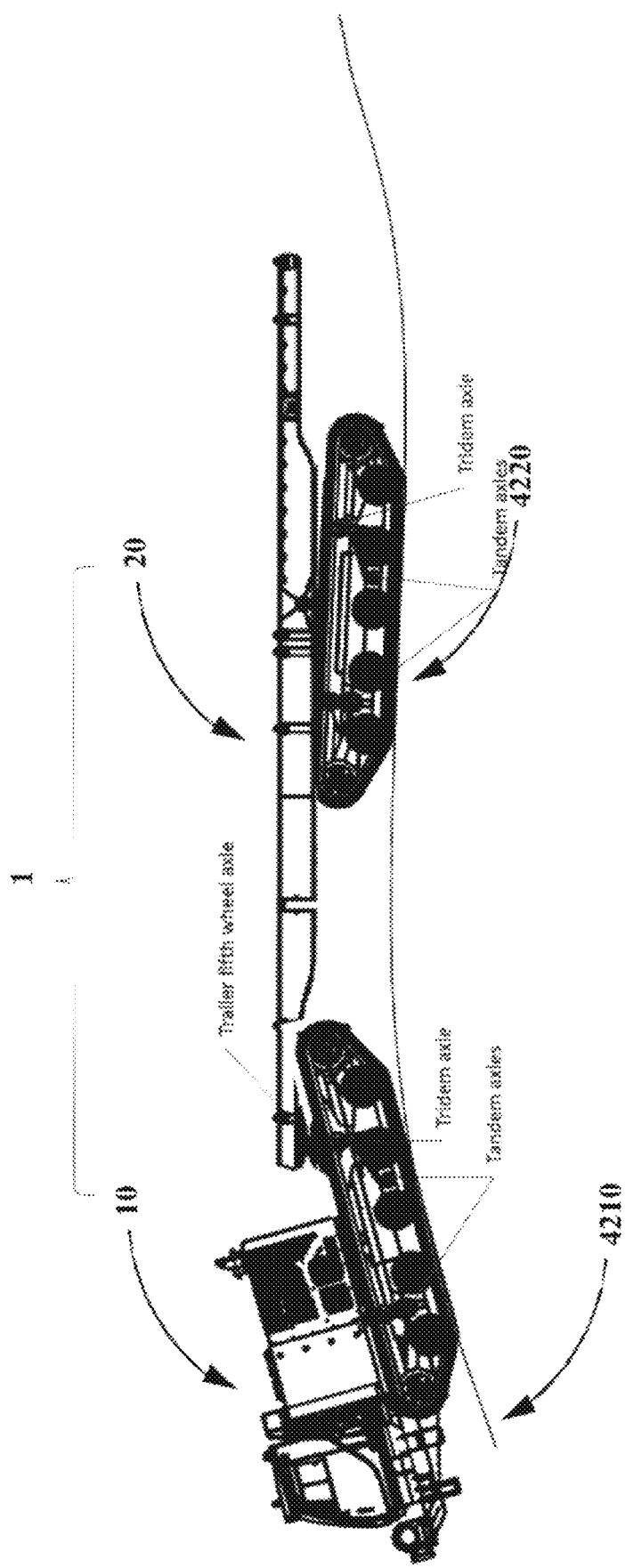
Figure 43:
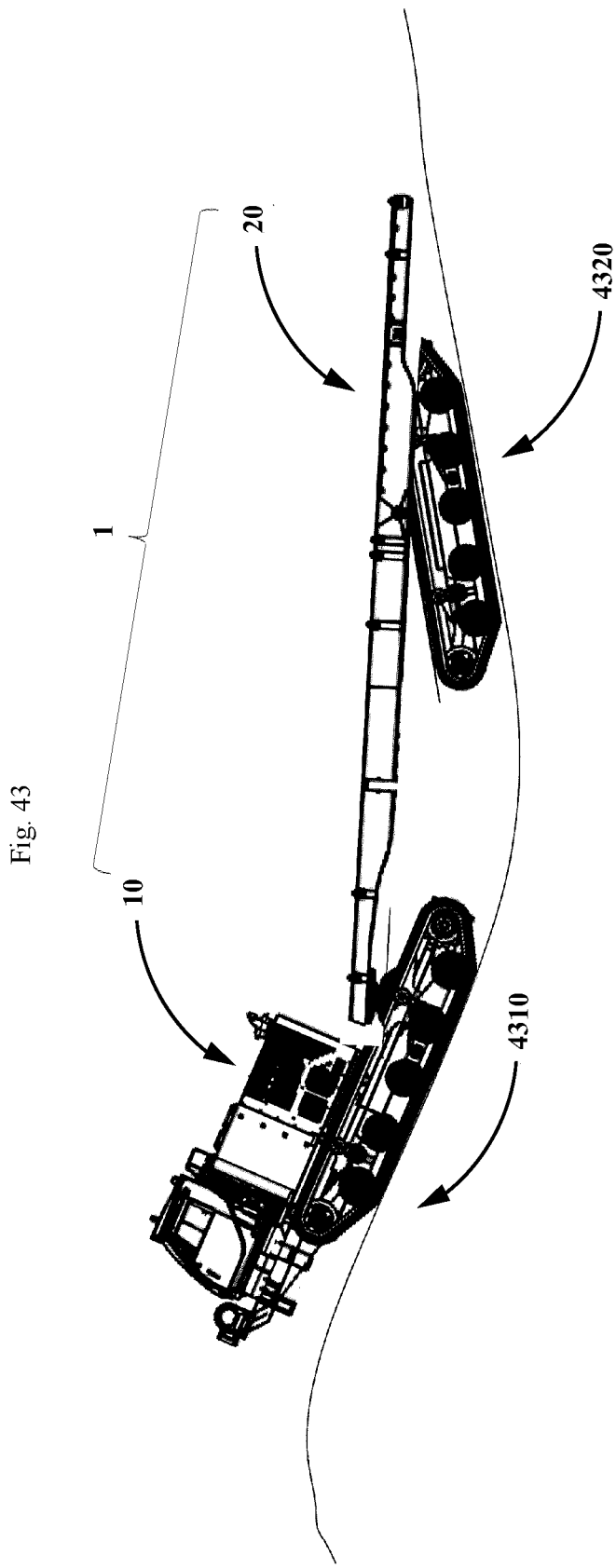

This is conceptually illustrated in FIG. 42, where the main vehicle 10 is advancing on a moderate downhill slope 4210 while the trailer 20 is following a slight uphill slope 4220. Similarly, in FIG. 43, the main vehicle 10 is on a moderate uphill slope 4310 while the trailer 20 is following a slightly downhill slope 4320. In both cases, it is seen that this unevenness of terrain between the main vehicle 10 and the trailer 20 does not impede travel of the tracked vehicle arrangement 1. The overall angular distance that may be traveled (swung) by the platform 2410 may thus be substantial, for example, up to 2 degrees in either direction from a horizontal "natural" position (for a total range of 4 degrees) or up to 3 degrees in either direction from a horizontal natural position (for a total range of 6 degrees) or up to 8 degrees in either direction from a horizontal natural position (for a total range of 16 degrees). In other cases, the total range may be less than, or greater than, 16 degrees.

In order to allow the desired swing (range of pivoting), the platform 2410 may have a variable thickness X, Y (in the height direction) along the longitudinal direction. Specifically, the platform 2410 may have a thickness (in the height direction) of X at the pivotable connection 3310 where it connects to the trailer 20, and a thickness (in the height direction) of Y<X/2 in the region where the platform 2410 lies directly above the edge 2910 of the frame 2400 of the trailer 20, where Y may range from 100 mm to 500 mm in some embodiments. The thickness 4210 of the platform 2410 may taper from X down to Y in either direction, longitudinally, away from the axle 3305. This "thinning out" of the platform 2410 may lead to a greater swing than if the thickness 4210 of the platform 2410 were kept around X all along the length of the platform 2410.

It should be appreciated that, as a result of the pivoting of the platform 2410 about the pivotable connection 3310 (or both of the pivotable connections) during travel of the vehicle arrangement 1, the distance between the trailer 20 and the main vehicle 10 may vary between a minimum and a maximum. Consequently, the hydraulic and electrical connections should be designed to handle the maximum possible distance between the trailer 20 and the main vehicle 10, which would also take into account differences in terrain slope that could lead to significant swing of the platform 2410 about the axle 3305.

Figure 44:
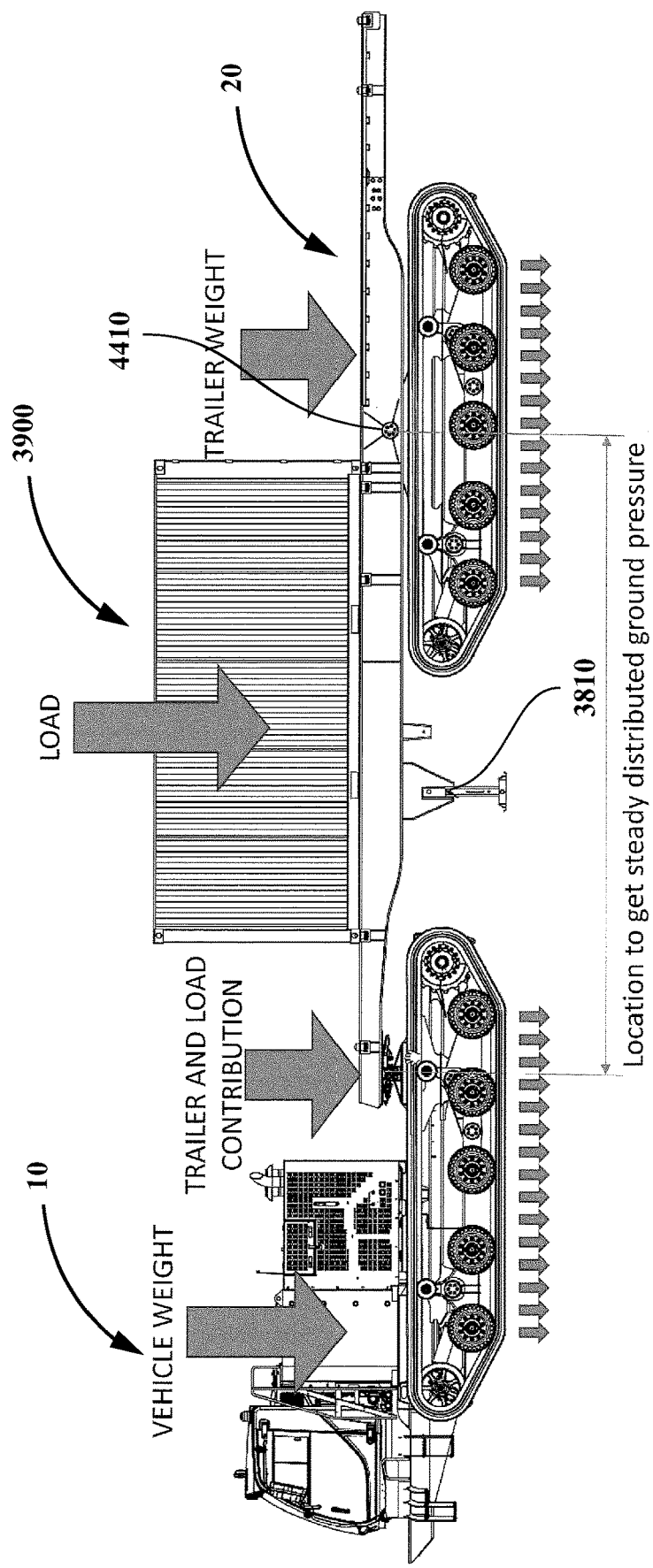
FIG. 44 is a side view showing load distribution onto the tracks of the vehicle arrangement and relative positioning of the first and second pivotable connections, according to an example non-limiting embodiment.

It is also noted that careful design of the point along the longitudinal direction of the frame 2400 where the platform 2410 connects to the main vehicle 10, and careful design of the point along the longitudinal direction of the frame 504 where the platform 2410 connects to the trailer 20 may provide certain advantages. In particular, in FIG. 44, it is noted that the first pivotable connection between the frame 504 of the main vehicle 10 and the platform 2410 (e.g., the interconnection of the fifth wheel hitch 2310 and the kingpin 2710) occurs substantially inline, when viewed from the side of the main vehicle 10, with the pivot point 904 for the second wheel-carrying assembly 902 of the left and right front track assemblies 102, 104 (i.e., the wheel-carrying assembly which, in this case, carries three support wheels). It is also noted that the second pivotable connection 3310 between the frame 2400 of the trailer 20 and the platform 2410 (e.g., the center of the axle 3305) occurs at approximately the midway point 4410, when viewed from the side of the trailer 20, between the pivot points of the first and second wheel-carrying assemblies 3110, 3120 of the left and right rear track assemblies 2502, 2504. One benefit of this positioning of the two pivotable connections may be a more even load distribution along the ground-contacting portions of the main vehicle 10 and the trailer 20, taking into consideration the position and weight of the cab 506, the fuel tank 510, the prime mover 508, the load carried by the platform 2410 and the platform 2410 itself.

Those skilled in the art will appreciate that there could be tolerances in the aforementioned positioning while still providing benefits. For example, two positions on a vehicle may be considered substantially above one another, when viewed from the side of the vehicle, when they are within 10 cm, within 20 cm, within 50 cm or within 100 cm of each other in the longitudinal direction. For example, the position, in the main vehicle's longitudinal direction, of the pivotable connection between the frame 504 of the main vehicle 10 and the platform 2410 and the position, in the main vehicle's longitudinal direction, of the pivot point 904 for the second wheel-carrying assembly 902 of the left and right front track assemblies 102, 104 may be within +/−10 cm, +/−20 cm, +/−50 cm pr+/−100 cm of each other. Similarly, the position, in the trailer's longitudinal direction, of the pivotable connection 3310 between the frame 2400 of the trailer 20 and the platform 2410 and the position, in the trailer's longitudinal direction, of the midway point 4410 between the pivot points 3112, 3122 of the first and second wheel-carrying assemblies 2502, 2504 of the left and right rear track assemblies may be within +/−10 cm, +/−20 cm or +/−50 cm of one another.

In an alternative embodiment, the platform 2410 is mounted to the frame 2400 of the trailer 20 using a pivotable connection with a greater capability of articulation than the axle 3305, such as a second fifth wheel hitch, for example. This would allow pivoting of the platform 2410 about both a horizontal axis and a vertical axis, thus allowing the platform 2410 to fully rotate about the frame 2400 of the trailer 20. In this case, due to the independent control of the tracks of the trailer 20, the trailer 20 could be driven almost as an independent vehicle (even side-by-side with the main vehicle 10), with the conditions being that (1) the distance between the two articulated connections (e.g., fifth wheel hitches) must be maintained constant, as this distance is fixed by the platform 2410; and (2) the hydraulic and electric cables are sufficiently long to allow the maximum separation of the main vehicle 10 and the trailer 20 when traveling alongside one another rather than in tow. In order to prevent damage to the two articulated connections, pressure sensors may be provided on one or both of the articulated connections. The pressure sensors are configured to sense whether the main vehicle and the trailer 20 are in tension or in compression (and from which direction) and can send a signal to the steering controller 1640. The steering controller 1640 in turn processes the received signal and adjusts the speed of the front tracks and/or the rear tracks to reduce the compression or tension. The adjustment may be made based on the direction of rotation of the tracks and the speed of rotation of the tracks. As such, the adjustment may be calculated based on a control algorithm and/or lookup table that maps different values of tension and compression to different track speed adjustments for different track directions and speeds of rotation. By reducing the compression or tension sensed by the sensors of the fifth wheel hitches, this could prevent damage that could otherwise arise if the main vehicle 10 and the trailer 20 were to start moving towards or away from one another.

Figure 45:
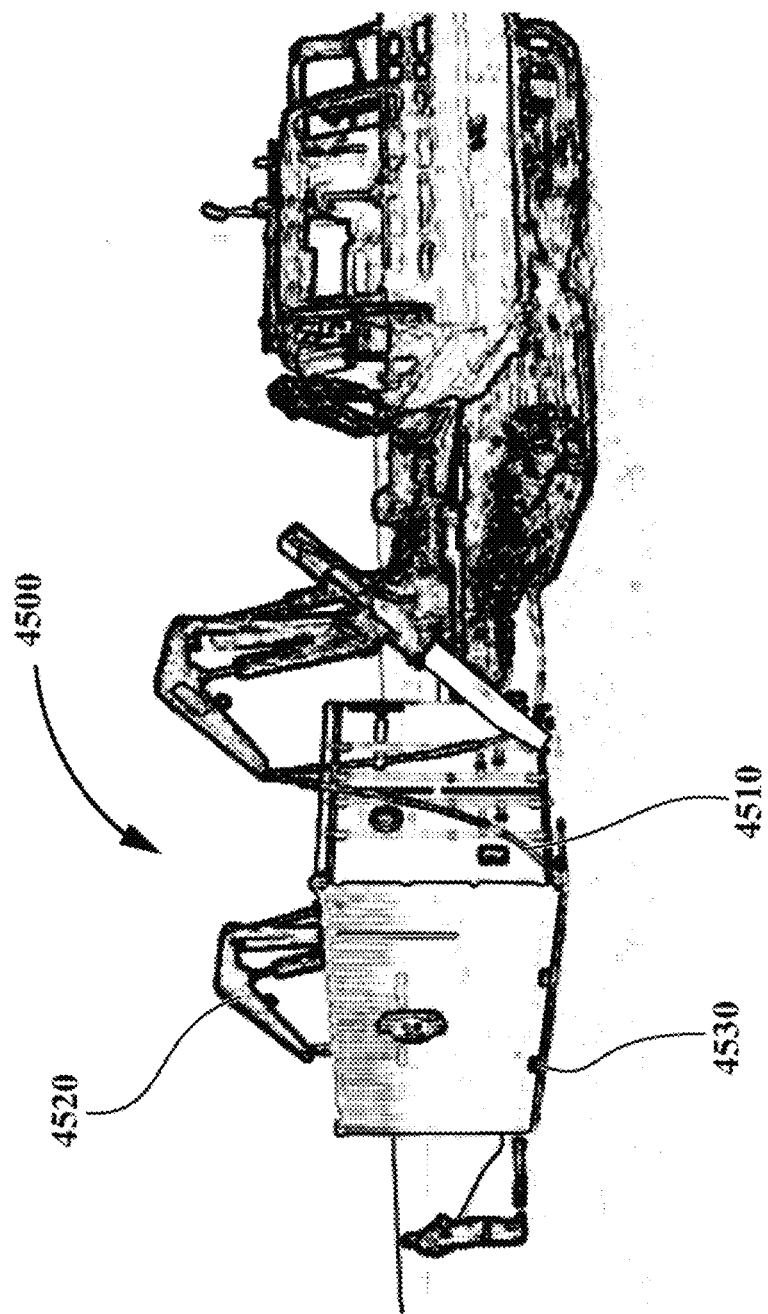
FIGS. 45 and 46 are perspective views showing a self-loading crane affixed to the platform of a trailer, according to example non-limiting embodiments.
Figure 46:
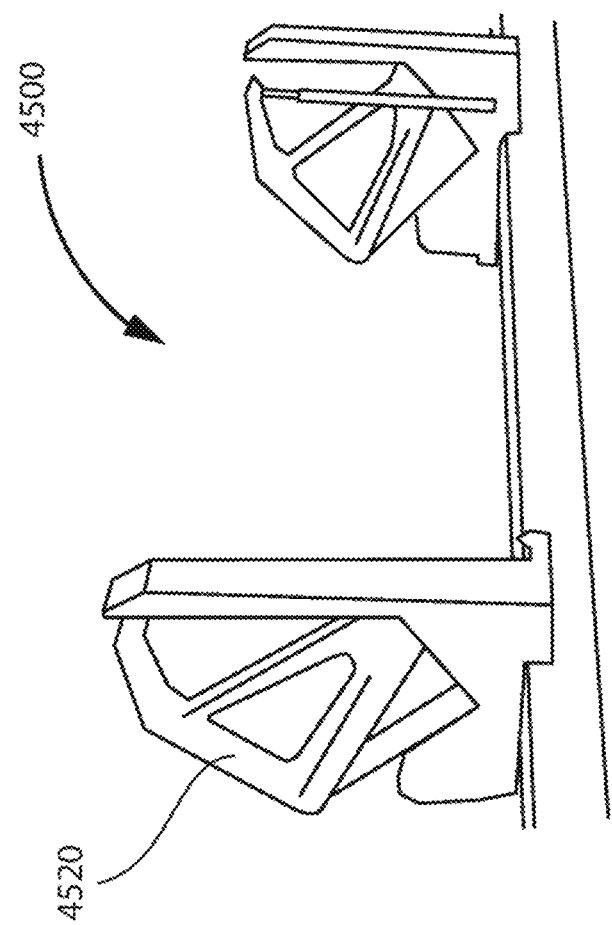
Figure 47:
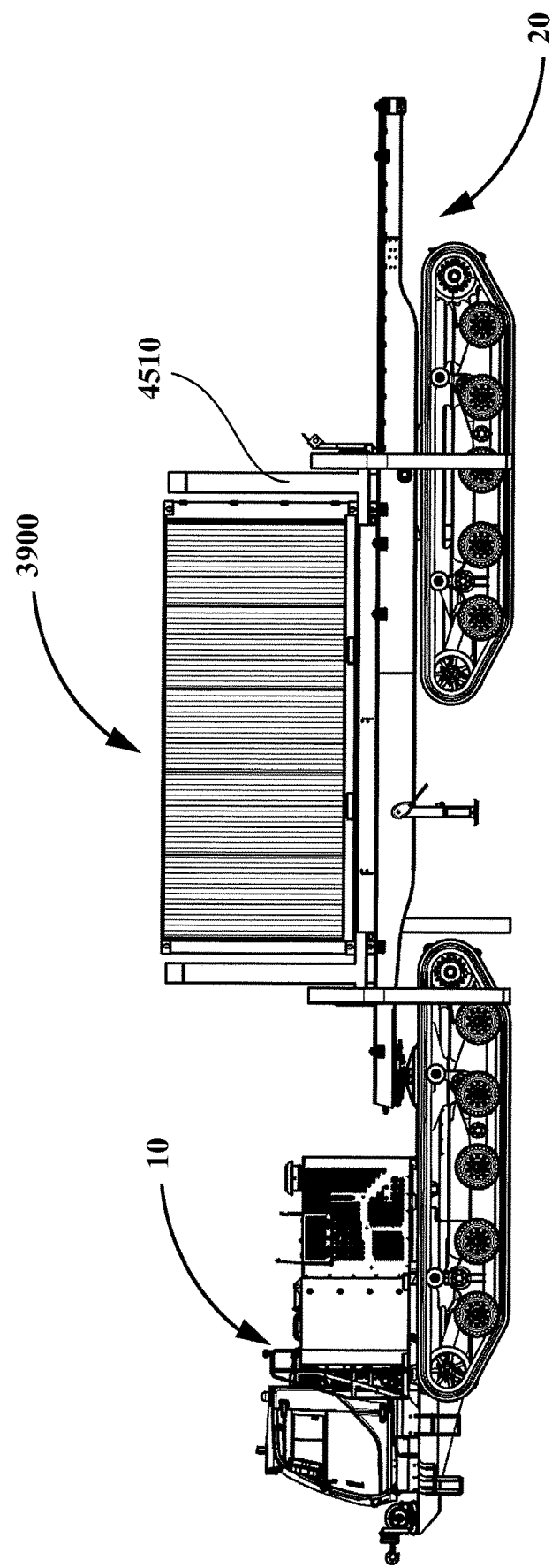
FIG. 47 is a side view showing side portions of the self-loading crane connected to a container placed on the platform, according to an example non-limiting embodiment.

With reference to FIGS. 45-47, a self-loading crane 4500 may also be affixed to the platform 2410. A self-loading crane 4500 is a folding crane configured to load, e.g., a 20-ft container 3900 onto the trailer 20 and to unload it from the trailer 20. Other sizes may also be possible. A non-limiting example of a self-loading crane 4500 that can be used with certain embodiments is the Hammar 160 sideloader, available from Hammar Maskin AB, Sweden. Power, including hydraulic power and/or electric power, to supply the self-loading crane 4500 may come from the prime mover 508 of the main vehicle 10. The self-loading crane 4500 can be operated from a set of controls on the self-loading crane 4500 or from a wireless remote control unit. The self-loading crane 4500 includes two side portions 4510 that can be set atop and connected to the locking members on the extended cross-members 3225. In addition, the side portions 4510 are configured to provide locking members that emerge directly above where the side portions 4510 engage with the locking members of the extended cross-members 3225. As such, a container 3900 can be placed onto, and interlocked with, these locking members of the side portions 4510, as if the container 3900 had been placed on corresponding locking members of the extended cross-members 3225, except that the container 3900 now rests somewhat higher (i.e., further from the ground). Each of the side portions 4510 of the self-loading crane 4500 comprises at least one controllable arm 4520. The at least one arm 4520 is configured to lift a container 3900 (weighing up to, e.g., 20,000 kg) from the ground and place it onto the locking members of the side portions 4510 or to remove a container 3900 that is already placed on the locking members of the side portions 4510.

D. Turning

Figure 48:
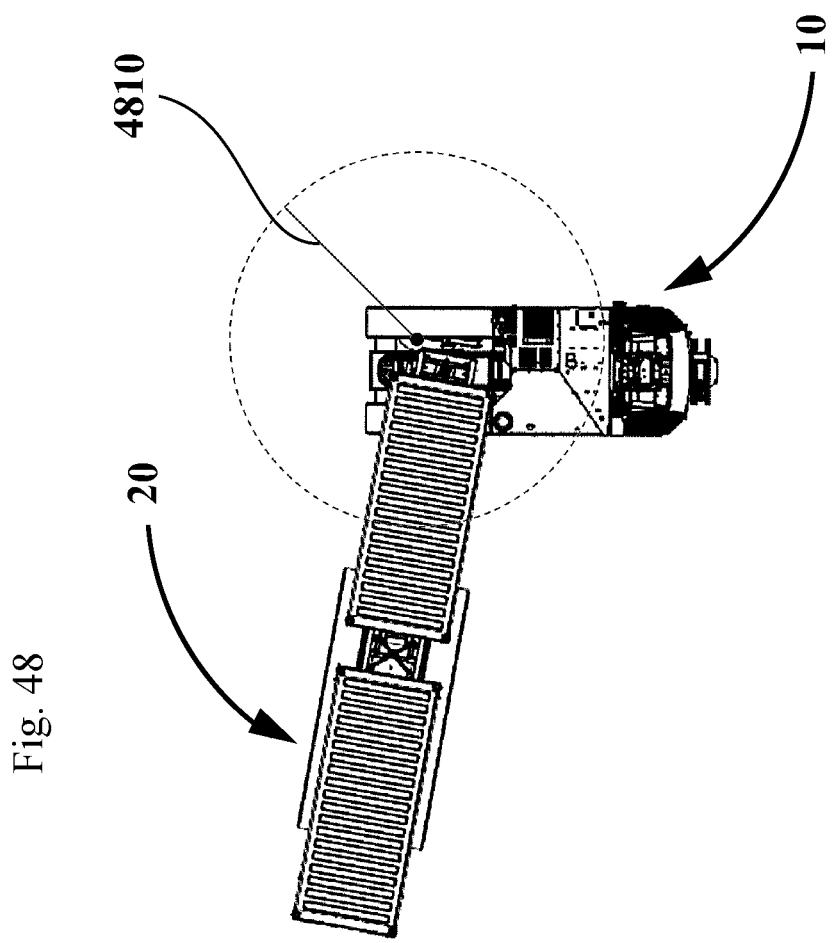
FIG. 48 is a top view showing a turning radius achieved between the main vehicle and the trailer and centered at the first pivotable connection, according to an example non-limiting embodiment.

One possible advantage of implementing separately controllable motorized tracks on both the main vehicle 10 and the articulated trailer 20 as described herein is that there can be a certain degree of freedom in controlling the track speed of the various tracks in order to achieve potentially useful results. One such potentially useful result is turning with a sharper turning radius 4810 (see FIG. 48), improved power consumption and reduced negative environmental impact on the ground. This may be achieved by the steering controller 1640 implementing a control algorithm that decides how much power to send to the various track assemblies/drive wheels (and controlling the track speed) as a function of one or more inputs, such as a steering command input (including the magnitude and direction, i.e., left or right) and whether the direction of travel is forward or reverse. This information may be collected by the steering controller 1640 based on electronic signals received from, for example, the steering device angle sensor 1620 and the transmission state switch 1510.

The steering controller 1640 carries out the control algorithm and outputs a plurality of "track commands" to the hydraulic drive system. Each track command is associated with a given one of the four tracks (front left, front right, rear left, rear right). In some embodiments, the track command associated with a given track may refer to the magnitude of a control signal representing the power to be supplied to the given track by the corresponding hydraulic motor. In other embodiments, the track command associated with a given track may refer to the magnitude of a control signal representing a multiplier of a baseline power to be supplied to the given track, where such baseline power may be determined by the powertrain controller 1540 as a function of how much acceleration is desired, e.g., based on the extent to which the accelerator pedal 1420 has been pressed. In still other embodiments, the track command associated with a given track may refer to the absolute or relative speed of the given track, or may be related thereto by a proportionality constant. One way or another, there is a track speed associated with each track command.

It is noted that in the foregoing, track speed may refer to a measure of the linear distance (in the longitudinal direction) of track moved per unit time under by rotation of the drive wheel, but does not necessarily refer to the resulting ground speed of the track. For example, a track may skid on the ground while the drive wheel turns the track; this could result in a difference between the linear distance traveled by the track and the actual displacement of the track relative to the ground.

Figure 49:
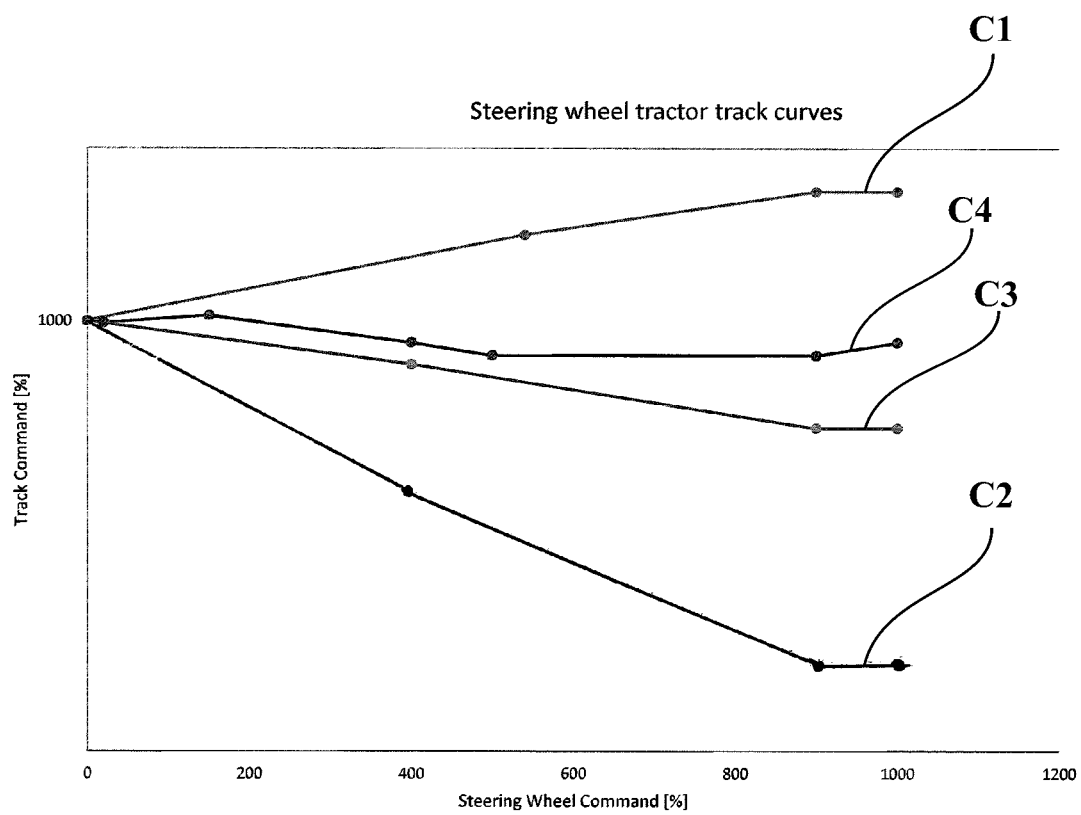
FIG. 49 is a graph illustrating a plurality of curves used to by a control algorithm to determine track commands for controlling speed of the four tracks of the vehicle arrangement, according to an example non-limiting embodiment.

FIG. 49 illustrates a plurality of curves C1, C2, C3, C4 used to determine the track commands for the four tracks. These curves show progression of a Y-axis variable against a steering angle on the X axis. The steering angle may represent a value between 0 and a maximum angle, either in terms of degrees or percentage. In the illustrated diagram, the maximum steering angle has a value of 1000 units and therefore a steering angle of 500 represents half of the maximum steering angle, for example. In this example of implementation, the initial value (on the Y axis) of the four curves C1, C2, C3, C4 is a common baseline value (benchmarked at 1000) based on a zero steering angle (i.e, driving straight ahead) and may be a function of the speed requested by the operator. As such, in this example of implementation, the curves C1, C2, C3, C4 may be considered as representing relative values rather than absolute values. For example, a track command of 800 means 80% of the baseline value and a track command of 1100 means 110% of the baseline value.

Figure 50:
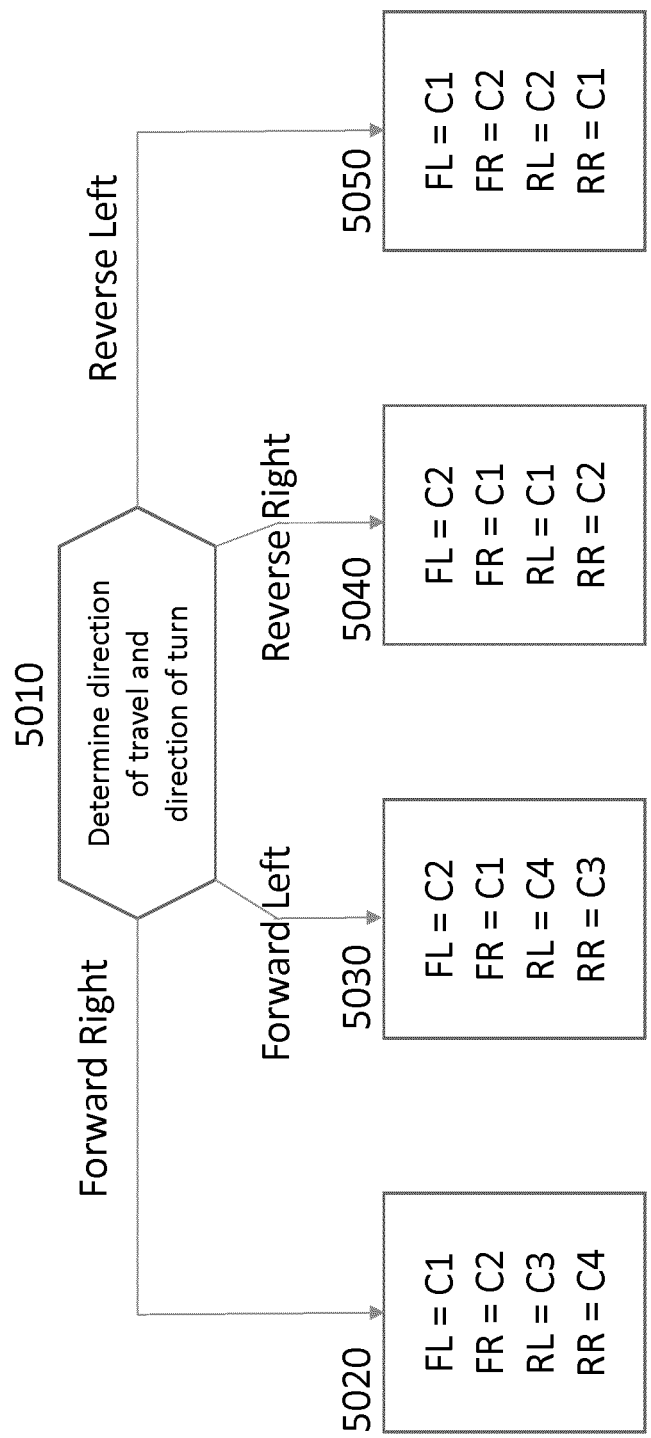
FIG. 50 is a flowchart showing various instantiations of the control algorithm with reference to the curves of FIG. 49, according to an example non-limiting embodiment.

The curves C1, C2, C3, C4 shown in FIG. 49 may be encoded analytically or as one or more lookup tables stored in a non-transitory memory medium, such as ROM or RAM memory. The steering controller 1640 may thus be configured to run a control algorithm that determines the steering angle (from the steering device angle sensor 1620) and the direction of travel (from the transmission state switch 1510) and, based on this information, obtains the track commands FL, FR, RL, RR for the four tracks/track assemblies by consulting the one or more lookup tables storing curves C1, C2, C3 and C4. To simplify notation, FL ("forward left") refers to the track command for the left track of the main vehicle 10, FR ("forward right") refers to the track command for the right track of the main vehicle 10, RL ("rear left") refers to the track command for the right track of the trailer 20, and RR ("rear right") refers to the track command for the right track of the trailer 20. Various instantiations of the control algorithm are now described with reference to the flowchart in FIG. 50.

Firstly, at step 5010, the direction of travel of the main vehicle 10 (i.e., forward or reverse) and the direction of turning (i.e., left or right) is determined. Then, step 5020 shows the relationship between the track commands FL, FR, RL, RR and the curves C1, C2, C3, C4 in the case where the main vehicle 10 is advancing (going forward) and turning right. In this specific case, track command FL corresponds to curve C1, track command FR corresponds to curve C2, track command RL corresponds to curve C3 and track command RR corresponds to curve C4.

From curves C1 and C2 corresponding to track commands FL and FR in the forward right turn scenario, it can be seen that the left track of the main vehicle 10 is "faster" than the right track of the main vehicle 10 during a forward right turn. For its part, curve C3 (corresponding to track command RL for the left track of the trailer 20) is between curves C1 and C2. In fact, in a non-limiting embodiment, curve C3 is the mean of curves C1 and C2. Finally, curve C4 (corresponding to track command RR in a forward right turn scenario) is slightly above curve C3 corresponding to track command RL. In other words, during a forward right turn, a compensatory gain, denoted G, is added to track command RL to obtain track command RR for the right track of the trailer 20 (which is the "inner" track during this turn). The right track of the trailer 20 is therefore slightly faster than the left track of the trailer 20 during a forward right turn.

In accordance with a non-limiting embodiment, curve C4 is constrained to be below curve C1. In other words, the compensatory gain G is constrained such as to be less than C1-C3, meaning that in a forward right turn scenario, although track command RR is greater than track command RL by the amount of the compensatory gain G, track command RR is still constrained to be less than track command FL (which represents the track command for the outer track of the main vehicle 10).

The compensatory gain G applied to the trailer's inner (right) track means that the trailer's outer (left) track is made to move slightly slower than its inner (right) track at the beginning of a forward right turn, which is the opposite of what is happening to the tracks of the main vehicle 10, which provide the actual vehicle steering trajectory. In fact, one could interpret the trailer 20 as attempting to turn left (or applying a counter-clockwise force) left while the applied steering command is indicative of a forward right turn. This will now be explained in greater detail.

Figure 57:
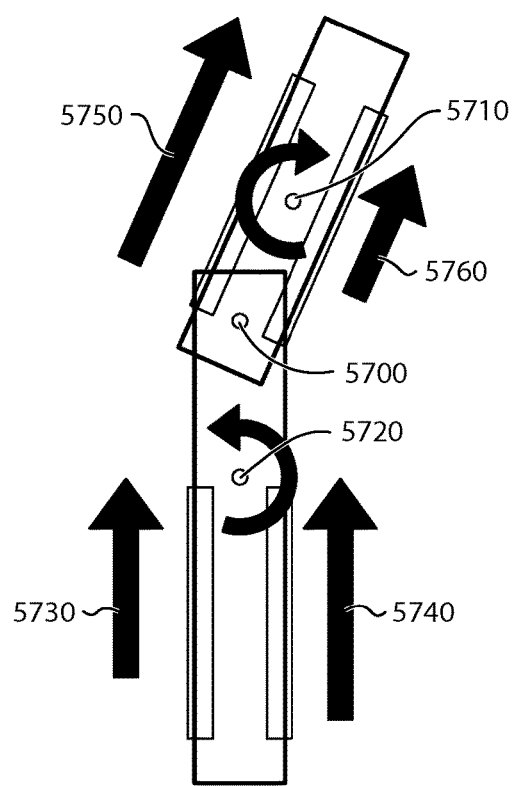
FIG. 57 is plan view of a tracked vehicle arrangement engaged in a right turn maneuver, in accordance with a non-limiting embodiment.
Figure 58:
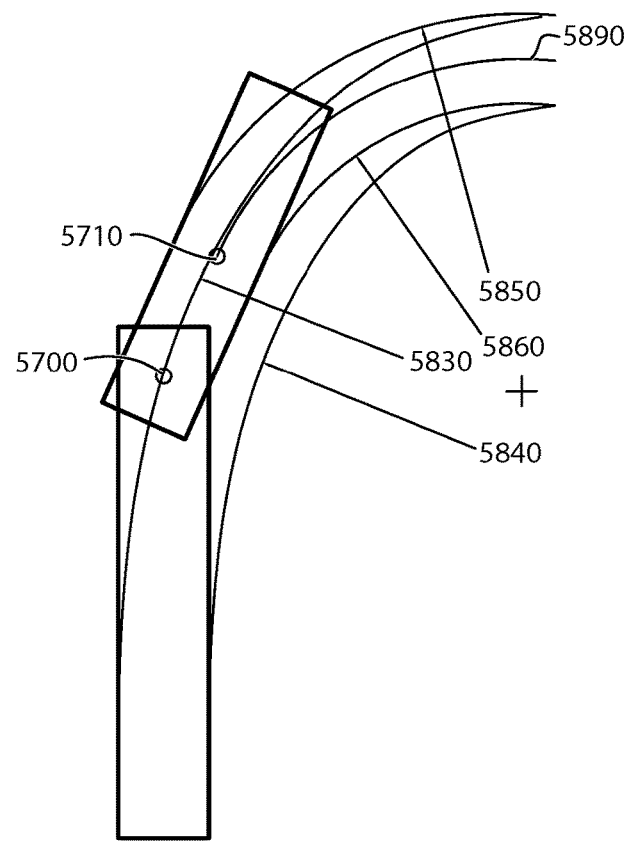
FIG. 58 is a plan view that schematically illustrates the trajectory of the tracks of the tracked vehicle arrangement of FIG. 57, in accordance with a non-limiting embodiment.

FIG. 57 is a top view of the main vehicle 10 and the trailer 20 illustrating the pivotable connection 5700 between the main vehicle 10 and the trailer 20, a yaw axis 5710 for the main vehicle 10 and a yaw axis 5720 for the trailer 20. Force vectors are shown in the form of arrows 5730, 5740, 5750, 5760, illustrating generally the relative applied track speeds of the various tracks of the vehicle arrangement. FIG. 58 shows a top (bird's eye) view of the trajectory 5830, 5840, 5850, 5860 of each track and indicates which of the various curves C1-C4 was used to derive the track command for each track. In addition, FIG. 58 shows at 5890 the trajectory of the yaw axis 5710 of the main vehicle 10, which is indicative of the path of the main vehicle 10 during the turn in terms of forward and rightward translational displacements.

It is seen that the main vehicle 10 turns clockwise about its yaw axis 5710 as a result of the speed differential applied to the left and right tracks of the main vehicle 10, resulting in "skid steering" of the main vehicle 10 towards the right. However, some points to the rear of the main vehicle 10 (specifically, behind the yaw axis 5710) actually have a tendency to first move to the left at the beginning of a right turn. When combined with the fact that the main vehicle 10 is actually in forward motion while turning, the net effect, from a directional standpoint, is that some of these points of the main vehicle 10 behind yaw axis 5710 (namely those in the vicinity of the pivotable connection 5700) actually have a natural tendency to move (translate) only slightly to the right (less than the actual linear displacement of the main vehicle), even so far as to want to travel, for a limited time, along the "original" (straight) orientation of the main vehicle and the trailer 20. In fact, if the main vehicle 10 were moving forward very slowly, or not moving forward at all, these points behind the yaw axis 5710 would actually tend to move (translate) to the left at the beginning of a right turn.

In order to reinforce this "natural" trajectory of the pivotable connection 5700 (which is to move less to the right than the yaw axis 5710 of the main vehicle 10), a track speed differential is introduced between the left and right tracks of the trailer 20. This causes the right track of the trailer 20 to move faster than the left track of the trailer 20. By this action, the trailer 20 "attempts" to turn to the left (induces a moment). It is possible that the trailer 20 actually does turn slightly towards the left about its yaw axis 5720. However, because of the fact that the main vehicle 10 is in most cases moving towards the right, and because of the fact that the pivotable connection 5700 is relatively far from the yaw axis 5720 of the trailer 20, one can expect that in most cases, application of the speed differential to the tracks of the trailer simply "reinforces" the natural trajectory of the rear of the main vehicle 10, notably of the pivotable connection 5700. The trailer 20 therefore does not need to actually rotate counter-clockwise about the yaw axis 5720, it only needs "attempt" to do so, thus providing a force and resulting in less rightward translational movement of the pivotable connection than in the absence of applying the compensatory gain G.

This technique has been found to result in less load on the transmission, and may lead to better fuel economy and longer part life, not to mention easier drivability and sharper turns. In particular, those skilled in the art should appreciate that applying the compensatory gain G to the "inner" track of the trailer 20 during a turn may reduce overload on the main vehicle's outer track that otherwise would need to "drag" the trailer 20 during the curve trajectory. It should also be appreciated that by making the inner track of the trailer 20 advance slightly faster than the outer track of the trailer 20 (but still slower than the outer track of the main vehicle 10), steering and maneuverability may be improved, especially with a load on the platform 2410. This may also improve ground speed and reduce power consumption in the curve trajectory.

Of course, if more than four tracks are used, there would correspondingly be more than four curves.

Step 5030 shows the relationship between the track commands FL, FR, RL, RR and the curves C1, C2, C3, C4 in the case where the main vehicle 10 is advancing (going forward) but turning left instead of right. Since a left turn is symmetrical to a right turn, the terms "left" and "right" may be interchanged in the above description. As a result, track command FL corresponds to curve C2, track command FR corresponds to curve C1, track command RL corresponds to curve C4 and track command RR corresponds to curve C3.

Step 5040 shows the relationship between the track commands FL, FR, RL, RR and the curves C1, C2, C3, C4 in the case where the main vehicle 10 is going backwards and turning right. In this non-limiting embodiment, track commands FL and RR correspond to curve C2 and track commands FR and FL correspond to curve C1. It is noted that in this embodiment, only two curves are used across the four tracks.

Finally, step 5050 shows the relationship between the track commands FL, FR, RL, RR and the curves C1, C2, C3, C4 in the case where the main vehicle 10 is going backwards and turning left. In this non-limiting embodiment, track commands FL and RR correspond to curve C1 and track commands FR and RL correspond to curve C2. It is noted that in each of the two reverse driving scenarios, there are two track commands that correspond to the same curve (either C1 or C2), but it should be appreciated that in other implementations, it may be possible to design individualized curves for each of the four tracks.

In the above embodiment, the track commands are computed in a feedforward manner based on the curves C1, C2, C3, C4. As such, it is expected that the main vehicle 10 and trailer 20 will turn in a certain way if the power supplied to the hydraulic motors is modulated in accordance with the computed track commands. That is to say, for a particular direction of travel and steering angle, the main vehicle 10 and the trailer 20 are expected to form a particular angle (this expected angle may be pre-computed and stored in memory, e.g., 5330). However, it is possible that for various reasons, such as terrain artefacts due to weather or debris, load variations, and slight differences in altitude between the main vehicle 10 and the trailer 20, the main vehicle 10 and the trailer 20 will not in reality form the expected angle. To offset the negative effects of such a scenario, it may be beneficial to measure various additional variables and apply a correction factor to the track commands and/or to the baseline power that each of the hydraulic motors is to apply to its respective track.

Figure 53:
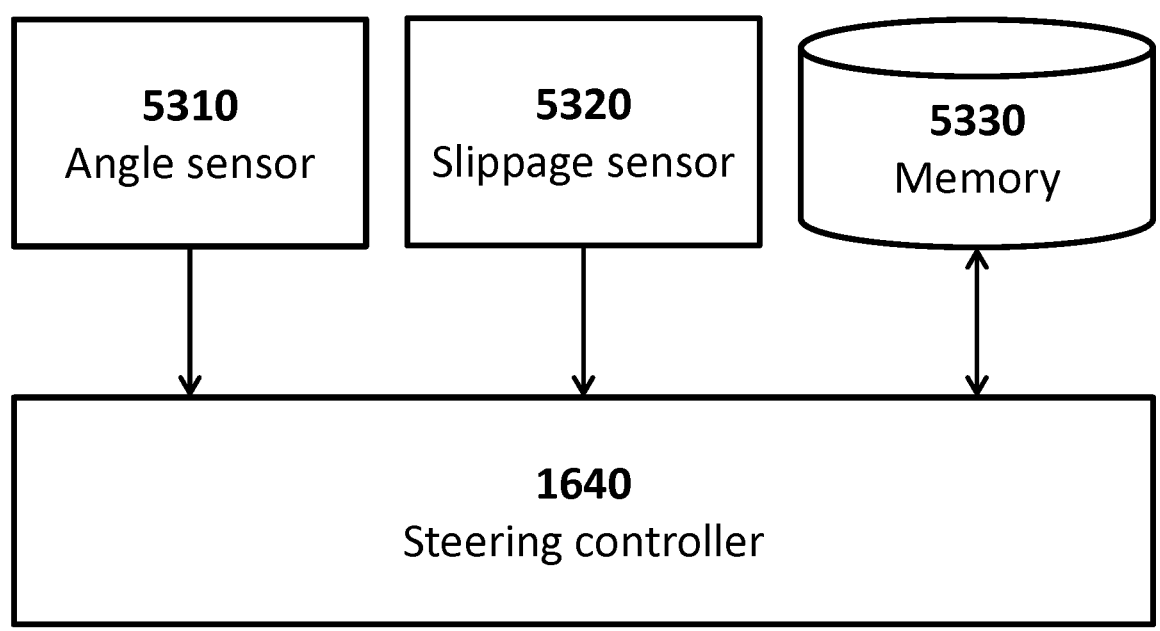
FIG. 53 is a block diagram showing a system for detecting track slippage, according to an example non-limiting embodiment.
Figure 56:
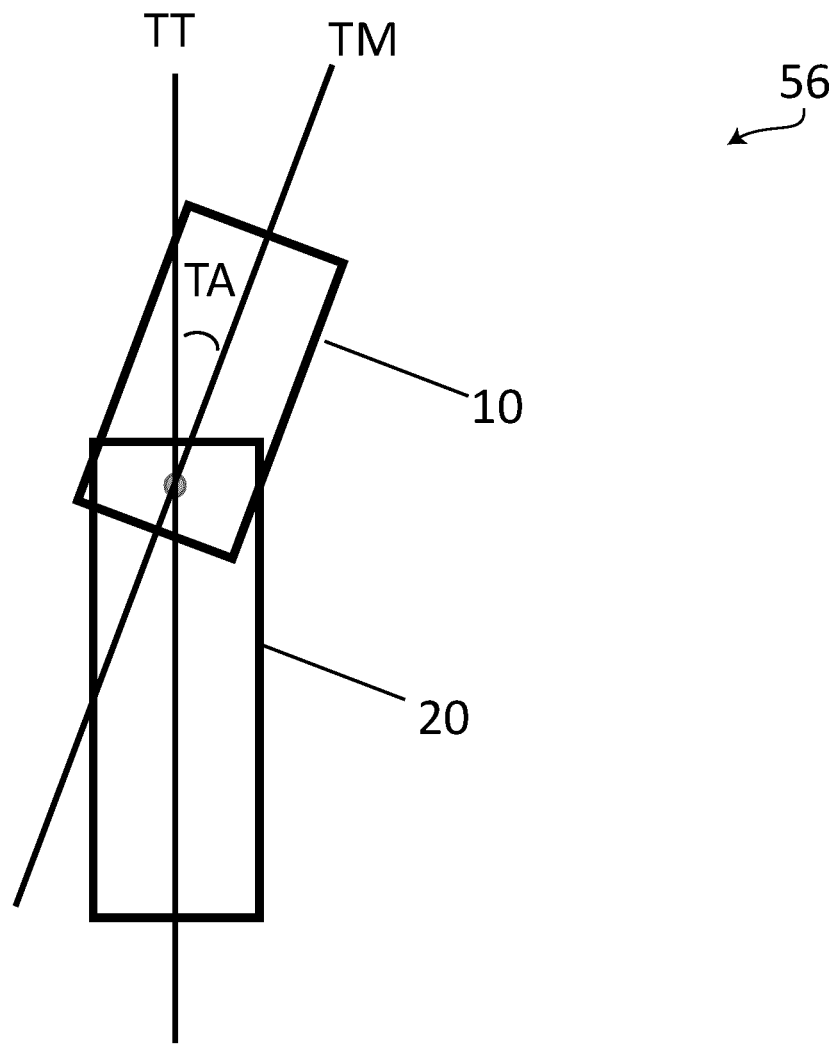
FIG. 56 is a diagram showing measurement of an angle between the main vehicle and the trailer, in accordance with a non-limiting embodiment.

As such and in accordance with FIG. 53, an angle sensor 5310 may be provided to measure the angle between the main vehicle 10 and the trailer 20. In an embodiment, the angle sensor 5310 may be configured to measure the angle that the platform 2410 makes with the fifth wheel hitch 2310. In an embodiment, and as shown in FIG. 56, the angle reported by the angle sensor 5310 represents the angle TA between the trajectory of the main vehicle TM and the trajectory of the trailer TT.

In addition, a slippage sensor 5320 is provided for each track. The slippage sensor 5320 detects a difference between the speed of rotation of the track and the speed of the track relative to the ground. When this difference is greater than zero, there is track slippage.

Figure 51:
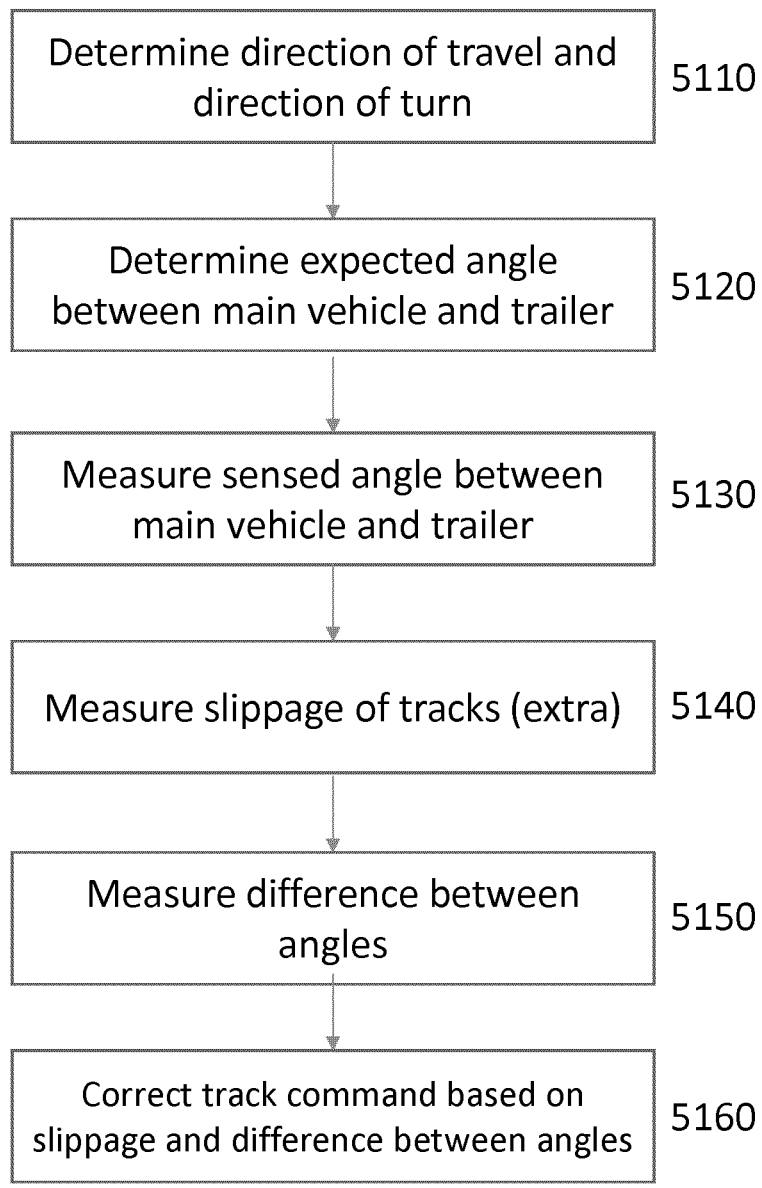
FIG. 51 is a flowchart showing a modified algorithm based on feedback to control the steering controller, according to an example non-limiting embodiment.

The angle sensor 5310 and the slippage sensors 5320 are electrically coupled to the steering controller 1640. As such, the steering controller 1640 can know (i) the angle between the main vehicle 10 and the trailer 20; and (ii) whether any track is experiencing slippage and, if so, the extent of such slippage. Meanwhile, the steering controller 1640 also has access to the computer-readable memory 5330 that provides the expected angle between the main vehicle 10 and the trailer 20 for the current value of the steering command input and the current baseline power. Therefore, the steering controller 1640 can run a modified control algorithm based on feedback, represented by the flowchart in FIG. 51.

Specifically, at step 5110, the steering controller 1640 determines the direction of travel (forward or reverse) and the direction of steering (right or left). At step 5120, the steering controller 1640 determines the expected angle between the main vehicle and the trailer 20 for the determined direction of travel and direction of steering. This may also include consideration of the speed of the main vehicle 10 and/or of the trailer 20. At step 5130, the steering controller 1640 determines the actual angle between the main vehicle 10 and the trailer 20. At step 5150, the steering controller 1640 that determines the difference between the expected and actual angles (i.e., the so-called error signal) and, at step 5160, corrects the amount of power it requests from the various tracks in order to minimize the error signal. In addition, the steering controller 1640 can take into account the amount of slippage detected from one or more tracks (step extra step 5140) so as to reduce the power requested from the tracks that are slipping and increase the power requested from the tracks that are not, all in keeping with certain tolerances that allow the overall turning goal to be achieved. This form of vehicle stability assist for four independently controllable tracks, two of which are on an articulated trailer, may provide advantages in terms of stability, maneuverability, fuel consumption and/or driving experience for the operator.

Another possibility is to use the actual angle between the main vehicle 10 and the trailer 20 to modulate the value of C1-C4 in a feedforward manner. This can be done to better handle certain special cases, for example when the actual angle between the trajectory of the main vehicle 10 and the trajectory of the trailer 20 is already high (e.g., above a certain threshold angle of 30 degrees, 45 degrees, etc.), it could be useful to reduce the baseline value or power for the trailer tracks, as well as the compensatory gain G (the difference between C4 and C3), in order to not "push" the main vehicle 10 with the trailer 20 and thereby cause the actual angle to increase even more. As such, the track command supplied to the tracks of the trailer 20 may be based on C1-C4 but modified as a function of the measured angle between the main vehicle 10 and the trailer 20.

E. Counter-Rotation Prevention

Conversely, another consequence of implementing separately controllable motorized tracks on both the main vehicle 10 and the articulated trailer 20 as described herein is the existence of a constraint that limits the freedom in controlling the track speed of the four tracks in order to prevent potentially dangerous or undesired situations. One non-limiting example pertains to the so-called counter-rotation function (also known as a zero-radius turn), which allows the main vehicle 10 to initiate a rotation about its own center. The counter rotation function may be engaged by turning the steering wheel all the way left or right, or possibly at the touch of a specialized button. The counter-rotation function differs from a mere sharp steering function because rather than advancing while turning, the main vehicle 10 stays in place and the tracks on opposite sides of the frame 504 move in opposite directions at approximately the same speed.

A potentially dangerous or undesired situation might arise if the operator attempts a zero-radius turn while the trailer 20 is connected to the main vehicle 10. As such, a sensor may be provided which detects whether the trailer 20 is connected.

Figure 55:
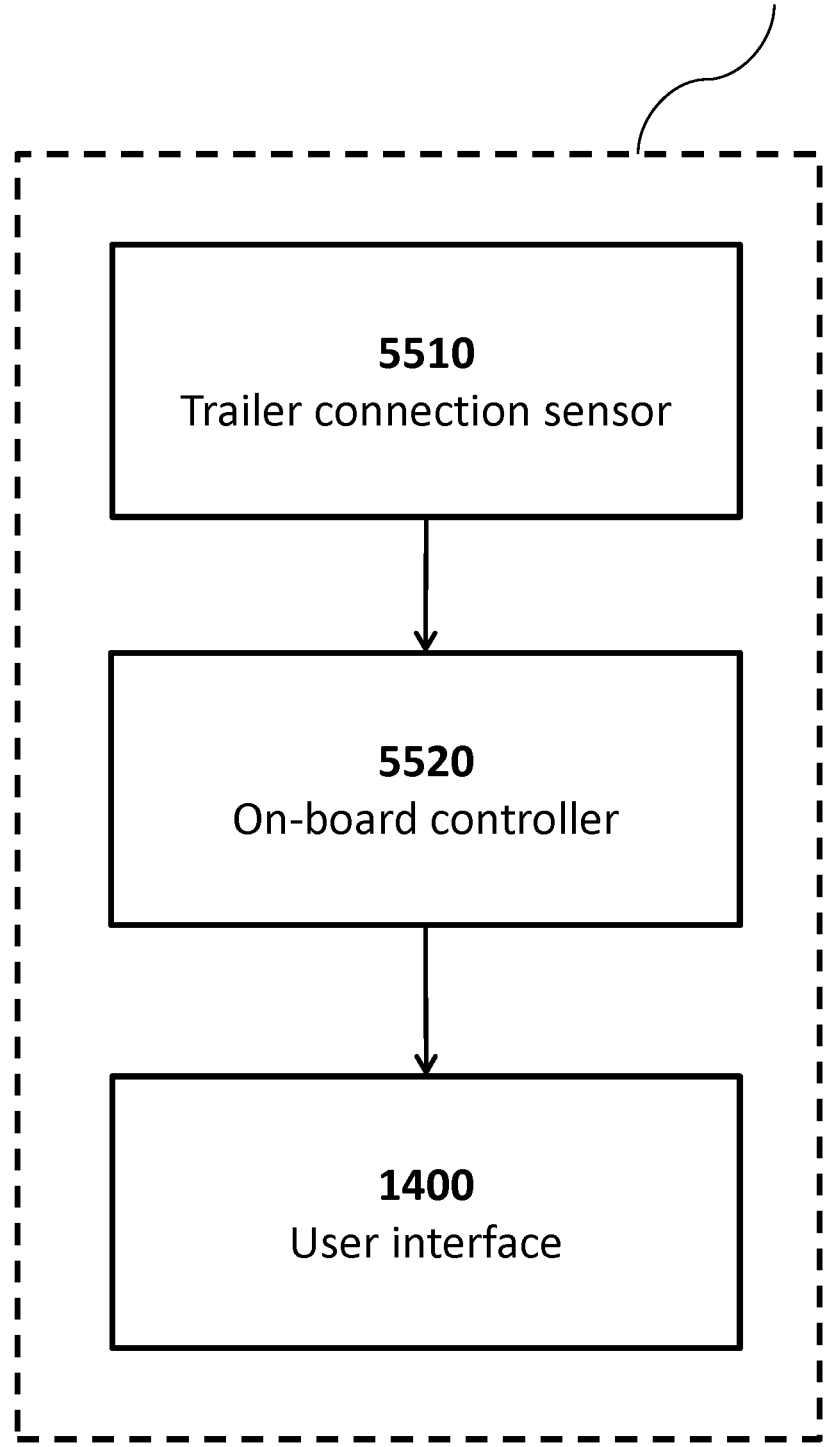
FIG. 55 is a block diagram showing a system for detecting trailer deconnection/connection, according to an example non-limiting embodiment.

This sensor, namely the trailer connection sensor, may be configured detect that the fifth wheel hitch 2310 has been engaged and/or that the hydraulic or electrical lines have been extended via a connection or any other means. With reference to FIG. 55, the trailer connection sensor 5510 is connected to the on-board controller 5520 and provides the on-board controller 5520 with the outcome of its sensing. The on-board controller 5520, upon receipt of a signal from the sensor indicative of presence of the trailer 20, attempts to interact with the operator via the user interface 1400 and may request that the operator confirm the presence of the trailer 20, e.g., via the touch screen 1470. If the operator responds by indicating that there is no trailer present, or if there was no signal from the sensor to indicate that there is a trailer connected to the main vehicle 10, the on-board controller 5520 may be configured to provide via the touch screen 1470 an indication that there is no trailer connected to the main vehicle 10 (e.g., by turning off, or not turning on, the trailer indicator light), and the operator is not prevented from attempting a zero-radius turn.

On the other hand, if the operator confirms that there is a trailer attached to the main vehicle 10, or if this condition is ascertained without the input of the operator, the on-board controller may be configured to provide via the touch screen 1470 an indication that there is a trailer (such as the trailer 20) connected to the main vehicle 10 (e.g., by turning on, or not turning off, the trailer indicator light). In addition, the on-board controller prevents the operator from attempting a zero-radius turn. For example, the on-board controller may send a signal to the steering controller 1640 to indicate that the trailer 20 is attached to the main vehicle. Meanwhile, the steering controller 1640, determines the steering angle and determines whether the operator is requesting a zero-radius turn. If so, and if the steering controller 1640 has been advised by the on-board controller that the trailer 20 is attached to the main vehicle, the steering controller 1640 disables carrying out the requested turn. For example, the steering controller 1640 may send track commands that keep the turning radius 4810 above a certain value. In fact, a similar safety function can be implemented not just in the case of a requested zero-radius turn at the maximum steering angle, but for any steering angle that would produce a turn with a turning radius 4810 below a certain value with the trailer 20 attached.

Figure 54:
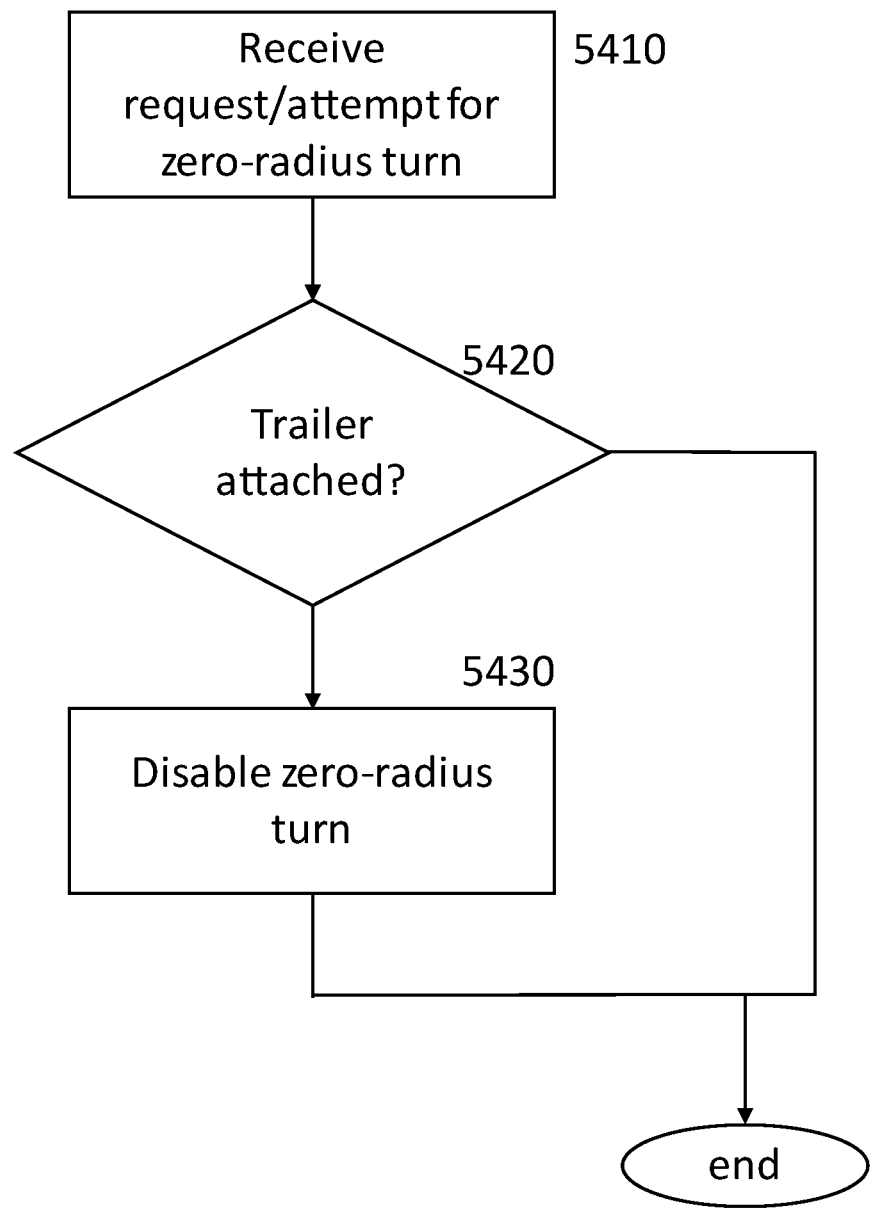
FIG. 54 is a flowchart showing steps of a counter-rotation prevention process, according to an example non-limiting embodiment.

As such, example steps that may be carried out by the on-board controller 5520 as part of the counter-rotation function prevention procedure are shown in FIG. 54. At step 5410, a request is received from an operator of the main vehicle to carry out a zero-radius turn. At step 5420, it is determined whether a trailer is attached to the main vehicle (either through operator confirmation or sensing). If so, then the method proceeds to step 5430 where the zero-radius turn is prevented from being carried out by the operator, either by, e.g., disabling this feature or not responding to an attempt to activate this feature.

The ability, or inability, of the main vehicle 10 to carry out a zero-radius turn or counter-rotation could be signaled to the operator, such as visually, audibly or mechanically, e.g., by an audible alarm or a light on the user interface 1400. Alternatively a signal could be issued only when the ability to carry out a zero-radius turn changes, or only when it is enabled, or only when it is disabled. Such indicator would thus be configured to toggle between on and off depending on whether or not there is a trailer connected to the main vehicle 10.

In still other cases, the fact that the trailer 20 is connected to the main vehicle 10 could influence other aspects of functionality, such as the baseline power to be supplied to a given track (e.g., by the corresponding hydraulic motor). Specifically, in the absence of a trailer, the baseline power (i.e., the power to be supplied to the front tracks) could be relatively higher, whereas with the trailer 20 present, the baseline power (i.e., the power to be supplied to front and rear tracks) could be relatively lower as it needs to be shared amongst four tracks.

Those skilled in the art will appreciate that any feature of any embodiment discussed herein may be combined with any feature of any other embodiment discussed herein in some examples of implementation. Also, although various embodiments have been illustrated, this was for the purpose of describing, but not limiting, the invention. Various modifications will become apparent to those skilled in the art and are within the scope of this invention, which is defined by the following claims.

What is claimed is:

1. A method of steering a vehicle arrangement comprising a main vehicle having right and left tracks and an articulated trailer having right and left tracks, comprising:
   receiving a steering command input;
   determining a track command for each of the tracks based on the steering command input; and
   regulating power to each of the tracks in accordance with the determined track command to steer the vehicle arrangement;
   wherein in case of the steering command input being indicative of a right turn in a forward direction;
   a track speed associated with the determined track command for the left track of the main vehicle is greater than a track speed associated with the determined track command for the right track of the main vehicle;
   a track speed associated with the determined track command for the right track of the trailer is greater than a track speed associated with the determined track command for the left track of the trailer;
   the track speed associated with the determined track command for the right track of the trailer is less than the track speed associated with the determined track command for the left track of the main vehicle;
   wherein:
   the track speed associated with the determined track command for the left track of the trailer is between the track speed associated with the determined track command for the right track of the main vehicle and the track speed associated with the determined track command for the left track of the main vehicle.

2. The method defined in claim 1, wherein also in case of the steering command input being indicative of a right turn in a forward direction, the track speed associated with the determined track command for the left track of the trailer is the mean of the track speed associated with the determined track command for the right track of the main vehicle and the track speed associated with the determined track command for the left track of the main vehicle.

3. The method defined in claim 2, wherein in case of the steering command input being indicative of a left turn in a forward direction, the track speed associated with the determined track command for the right track of the main vehicle is greater than the track speed associated with the determined track command for the left track of the main vehicle and wherein the track speed associated with the determined track command for the left track of the trailer is greater than the track speed associated with the determined track command for the right track of the trailer.

4. The method defined in claim 3, wherein also in case of the steering command input being indicative of a left turn in a forward direction, the track speed associated with the determined track command for the left track of the trailer is less than the track speed associated with the determined track command for the right track of the main vehicle.

5. The method defined in claim 4, wherein also in case of the steering command input being indicative of a forward direction, the track speed associated with the determined track command for the right track of the trailer is the mean of the track speed associated with the determined track command for the right track of the main vehicle and the track speed associated with the determined track command for the left track of the main vehicle.

6. The method defined in claim 5, wherein in case of the steering command input being indicative of a right turn in a reverse direction, the track speed associated with the determined track command for the right track of the main vehicle is greater than the track speed associated with the determined track command for the left track of the main vehicle and wherein the track speed associated with the determined track command for the left track of the trailer is greater than the track speed associated with the determined track command for the right track of the trailer.

7. The method defined in claim 6, wherein also in case of the steering command input being indicative of a right turn in the reverse direction, the track speed associated with the determined track command for the left track of the main vehicle is the same as the track speed associated with the determined track command for the right track of the trailer and wherein the track speed associated with the determined track command for the right track of the main vehicle is the same as the track speed associated with the determined track command for the left track of the trailer.

8. The method defined in claim 7, wherein in case of the steering command input being indicative of a left turn in a reverse direction, the track speed associated with the determined track command for the left track of the main vehicle is greater than the track speed associated with the determined track command for the right track of the main vehicle and wherein the track speed associated with the determined track command for the right track of the trailer is greater than the track speed associated with the determined track command for the left track of the trailer.

9. The method defined in claim 8, wherein also in case of the steering command input being indicative of a left turn in the reverse direction, the track speed associated with the determined track command for the left track of the main vehicle is the same as the track speed associated with the determined track command for the right track of the trailer and wherein the track speed associated with the determined track command for the right track of the main vehicle is the same as the track speed associated with the determined track command for the left track of the trailer.

10. The method defined in claim 1, wherein determining a track command for each of the tracks based on the steering command input comprises consulting a lookup table in memory based on the steering command input to determine at least the determined track command for the right track of the main vehicle and the determined track command for the left track of the main vehicle.

11. The method defined in claim 1, wherein the determined track command for each of the tracks is a function of the steering command input.

12. The method defined in claim 1, wherein the steering command input is indicative of a steering angle, wherein in case of the steering command input being indicative of a right turn in the forward direction, the track speed associated with the determined track command for the left track of the main vehicle monotonically increases as the steering angle increases and wherein the track speed associated with the determined track command for the right track of the main vehicle monotonically decreases as the steering angle increases.

13. The method defined in claim 12, wherein also in case of the steering command input being indicative of a right turn in the forward direction, the track speed associated with the determined track command for the left track of the trailer monotonically decreases as the steering angle increases and wherein the track speed associated with the determined track command for the right track of the trailer increases, then decreases and then increases again as the steering angle increases.

14. The method defined in claim 1, wherein the steering command input comprises an input indicative of a steering angle and an input indicative of a direction of movement requested by an operator of the main vehicle.

15. A non-transitory computer-readable medium comprising instructions which, when read and executed by a processor on board a vehicle arrangement comprising a main vehicle with right and left tracks and an articulated trailer with right and left tracks, configure the processor to implement a method that comprises:
  receiving a steering command input;
  determining a track command for each of the tracks based on the steering command input; and
  regulating power to each of the tracks in accordance with the determined track command to steer the vehicle arrangement;
  wherein in case of the steering command input being indicative of a right turn in a forward direction;
  a track speed associated with the determined track command for the left track of the main vehicle is greater than a track speed associated with the determined track command for the right track of the main vehicle;
  a track speed associated with the determined track command for the right track of the trailer is greater than a track speed associated with the determined track command for the left track of the trailer;
  the track speed associated with the determined track command for the right track of the trailer is less than the track speed associated with the determined track command for the left track of the main vehicle;
  wherein:
  the track speed associated with the determined track command for the left track of the trailer is between the track speed associated with the determined track command for the right track of the main vehicle and the track speed associated with the determined track command for the left track of the main vehicle.

* * * * *